United States Patent
Lee et al.

(10) Patent No.: US 11,934,015 B2
(45) Date of Patent: Mar. 19, 2024

(54) MULTIPORT ASSEMBLY AND ASSOCIATED COMPONENTS

(71) Applicant: Senko Advanced Components, Inc., Hudson, MA (US)

(72) Inventors: Benjamin Lee, Wayland, MA (US); Jeffrey Gniadek, Oxford, ME (US)

(73) Assignee: Senko Advanced Components, Inc., Hudson, MA (US)

( * ) Notice: Subject to any disclaimer, the term of this patent is extended or adjusted under 35 U.S.C. 154(b) by 125 days.

(21) Appl. No.: 17/343,488

(22) Filed: Jun. 9, 2021

(65) Prior Publication Data

US 2021/0382241 A1  Dec. 9, 2021

Related U.S. Application Data

(60) Provisional application No. 63/036,950, filed on Jun. 9, 2020, provisional application No. 63/086,909, filed
(Continued)

(51) Int. Cl.
*G02B 6/38* (2006.01)
*G02B 6/40* (2006.01)
(Continued)

(52) U.S. Cl.
CPC .......... *G02B 6/3825* (2013.01); *G02B 6/3831* (2013.01); *G02B 6/387* (2013.01);
(Continued)

(58) Field of Classification Search
CPC ........................................................ G02B 6/38
(Continued)

(56) References Cited

U.S. PATENT DOCUMENTS 6,504,726 B1    1/2003  Grabinger et al.
6,526,210 B1 *  2/2003  Harrison .............. G02B 6/3825
                                                    385/134
(Continued)

FOREIGN PATENT DOCUMENTS

WO    2016195750 A1    12/2016
WO    2017046185 A2     3/2017
(Continued)

OTHER PUBLICATIONS

International Search Report and Written Opinion from PCT/US2021/036674, dated Aug. 31, 2021, 16 pages.
International Search Report and Written Opinion, Application No. PCT/US21/36674, dated Aug. 31, 2021, pp. 7.

*Primary Examiner* — Kaveh C Kianni

(57) ABSTRACT

Systems and methods of using a multiport assembly and associated components are disclosed. The multiport assembly can include a multiport device that communicatively couples multiple sets or pairs of connectors, such as optical connectors or electrical connectors, together. The multiport assembly can also include an auxiliary port device that couples to the multiport device to expand the capacity of the multiport assembly. Both the multiport and auxiliary port devices can be selectively configured to receive specific types of connectors by selectively coupling to different types of adapters, where the types of adapters correspond to the types of connectors. When coupled to the multiport or auxiliary port devices, the adapters facilitate the formation of the communication between its corresponding set of connectors.

14 Claims, 50 Drawing Sheets

Related U.S. Application Data on Oct. 2, 2020, provisional application No. 63/191,073, filed on May 20, 2021, provisional application No. 63/191,074, filed on May 20, 2021, provisional application No. 63/191,077, filed on May 20, 2021.

(51) Int. Cl.

| | | |
|---|---|---|
| *H01R 13/518* | (2006.01) | |
| *H01R 13/52* | (2006.01) | |
| *H01R 13/627* | (2006.01) | |
| *H01R 13/641* | (2006.01) | |
| *H01R 13/645* | (2006.01) | |
| *H01R 24/54* | (2011.01) | |
| *H01R 27/02* | (2006.01) | |

(52) U.S. Cl.
CPC ......... *G02B 6/3879* (2013.01); *G02B 6/3893* (2013.01); *G02B 6/3895* (2013.01); *G02B 6/3897* (2013.01); *G02B 6/406* (2013.01); *H01R 13/518* (2013.01); *H01R 13/5219* (2013.01); *H01R 13/6272* (2013.01); *H01R 13/641* (2013.01); *H01R 13/6456* (2013.01); *H01R 24/542* (2013.01); *H01R 27/02* (2013.01)

(58) Field of Classification Search
USPC .......................................................... 385/59
See application file for complete search history.

(56) References Cited

U.S. PATENT DOCUMENTS

| | | | |
|---|---|---|---|
| 6,856,747 B2 | 2/2005 | Cloud et al. | |
| 7,120,347 B2 | 10/2006 | Blackwell, Jr. et al. | |
| 7,281,856 B2 | 10/2007 | Grzegorzewska et al. | |
| 7,333,708 B2 | 2/2008 | Blackwell, Jr. et al. | |
| 7,397,997 B2 | 7/2008 | Ferris et al. | |
| 7,400,815 B2 | 7/2008 | Mertesdorf et al. | |
| 7,477,824 B2 | 1/2009 | Reagan et al. | |
| 7,480,437 B2 | 1/2009 | Ferris et al. | |
| 7,572,065 B2 | 1/2009 | Lu et al. | |
| 7,489,849 B2 | 2/2009 | Reagan et al. | |
| 7,512,304 B2 | 3/2009 | Gronvall et al. | |
| 7,539,387 B2 | 5/2009 | Mertesdorf et al. | |
| 7,539,388 B2 | 5/2009 | Mertesdorf et al. | |
| 7,558,458 B2 | 7/2009 | Gronvall et al. | |
| 7,568,943 B2 | 8/2009 | Harrison et al. | |
| 7,627,222 B2 | 12/2009 | Reagan et al. | |
| 7,653,282 B2 | 1/2010 | Blackwell, Jr. et al. | |
| 7,680,388 B2 | 3/2010 | Reagan et al. | |
| 7,740,409 B2 | 6/2010 | Bolton et al. | |
| 7,805,044 B2 | 9/2010 | Reagan et al. | |
| 7,844,160 B2 | 11/2010 | Reagan et al. | |
| 7,941,027 B2 | 5/2011 | Mertesdorf et al. | |
| 8,152,386 B2 | 4/2012 | Luther et al. | |
| 8,218,935 B2 | 7/2012 | Reagan et al. | |
| 8,254,740 B2 | 8/2012 | Smith et al. | |
| RE43,762 E | 10/2012 | Smith et al. | |
| 8,363,999 B2 | 1/2013 | Mertesdorf et al. | |
| 8,770,862 B2 | 7/2014 | Lu et al. | |
| 8,805,152 B2 | 8/2014 | Smith et al. | |
| 8,876,405 B2 | 11/2014 | Larson et al. | |
| 8,939,654 B2 | 1/2015 | Lu et al. | |
| 9,039,293 B2 | 5/2015 | Hill et al. | |
| 9,057,858 B2 | 6/2015 | Alston et al. | |
| 9,106,981 B2 | 8/2015 | Vastmans et al. | |
| 9,279,951 B2 | 3/2016 | Mcgranahan et al. | |
| 9,310,578 B2 | 4/2016 | Vastmans et al. | |
| 9,377,599 B2 | 6/2016 | Smith et al. | |
| 9,400,364 B2 | 7/2016 | Hill et al. | |
| 9,426,923 B2 | 8/2016 | Le Gall et al. | |
| 9,459,424 B2 | 10/2016 | Smith et al. | |
| 9,535,230 B2 | 1/2017 | Newbury et al. | |
| 9,684,138 B2 | 1/2017 | Lu | |
| 9,606,297 B2 | 3/2017 | Korczak | |
| 9,632,273 B2 | 4/2017 | Smith et al. | |
| 9,660,397 B2 | 5/2017 | Islam et al. | |
| 9,664,862 B2 | 5/2017 | Lu et al. | |
| 9,684,139 B2 | 6/2017 | Chang et al. | |
| 9,696,511 B2 | 7/2017 | Michiels et al. | |
| 9,728,909 B2 | 8/2017 | Islam et al. | |
| 9,733,436 B2 | 8/2017 | Van Baelen et al. | |
| 9,739,969 B2 | 8/2017 | Vastmans et al. | |
| 9,804,343 B2 | 10/2017 | Hill et al. | |
| 9,823,427 B2 | 11/2017 | Smith et al. | |
| 9,851,522 B2 | 12/2017 | Reagan et al. | |
| 9,939,589 B2 | 4/2018 | Takano et al. | |
| 9,977,199 B2 | 5/2018 | Chang et al. | |
| 10,012,802 B2 | 7/2018 | Newbury et al. | |
| 10,042,136 B2 | 8/2018 | Reagan et al. | |
| 10,061,091 B2 | 8/2018 | Kempeneers et al. | |
| 10,146,012 B2 | 12/2018 | Takano et al. | |
| 10,146,017 B2 | 12/2018 | Smith et al. | |
| 10,162,142 B2 | 12/2018 | Alston et al. | |
| 10,180,541 B2 | 1/2019 | Coenegracht et al. | |
| 10,197,739 B2 | 2/2019 | Ohtsuka et al. | |
| 10,209,473 B2 | 2/2019 | Bishop et al. | |
| 10,217,703 B2 | 2/2019 | Upadhyaya et al. | |
| 10,234,641 B2 | 3/2019 | Hill | |
| 10,288,820 B2 | 5/2019 | Coenegracht | |
| 10,317,628 B2 | 6/2019 | Van Baelen et al. | |
| 10,317,636 B2 | 6/2019 | Vastmans et al. | |
| 10,338,323 B2 | 7/2019 | Lu et al. | |
| 10,359,577 B2 | 7/2019 | Dannoux et al. | |
| 10,371,912 B2 | 8/2019 | Coenegracht et al. | |
| 10,371,913 B2 | 8/2019 | Claessens et al. | |
| 10,379,298 B2 | 8/2019 | Dannoux et al. | |
| 10,386,584 B2 | 8/2019 | Rosson | |
| 10,393,969 B2 | 8/2019 | Takano et al. | |
| 10,401,578 B2 | 9/2019 | Coenegracht | |
| 10,409,009 B2 | 9/2019 | Chang et al. | |
| 10,429,593 B2 | 10/2019 | Baca et al. | |
| 10,429,594 B2 | 10/2019 | Dannoux et al. | |
| 10,451,811 B2 | 10/2019 | Coenegracht et al. | |
| 10,451,818 B2 | 10/2019 | Smith et al. | |
| 10,473,866 B2 | 11/2019 | Newbury et al. | |
| D868,694 S | 12/2019 | Rosson | |
| 10,502,903 B1 | 12/2019 | Wang et al. | |
| 10,502,907 B2 | 12/2019 | Wang | |
| 10,502,920 B2 | 12/2019 | Coenegracht et al. | |
| 10,509,191 B2 | 12/2019 | Bishop et al. | |
| 10,585,257 B1 * | 3/2020 | Smith | G02B 6/4482 |
| 10,605,998 B2 | 3/2020 | Rosson | |
| 10,606,006 B2 | 3/2020 | Hill et al. | |
| 10,627,585 B2 | 4/2020 | Kadar-Kallen et al. | |
| 10,705,307 B2 | 7/2020 | Takeuchi et al. | |
| 10,725,247 B2 | 7/2020 | Takano et al. | |
| 10,802,228 B2 | 10/2020 | Dannoux et al. | |
| 10,809,463 B2 | 10/2020 | Dannoux et al. | |
| 10,852,498 B2 | 12/2020 | Hill et al. | |
| 10,859,781 B2 | 12/2020 | Hill et al. | |
| 10,877,234 B2 | 12/2020 | Coaxum et al. | |
| 10,914,899 B2 | 2/2021 | Otomitsu | |
| 10,955,363 B2 | 3/2021 | Zhou et al. | |
| 10,983,286 B2 * | 4/2021 | Takano | G02B 6/4292 |
| 11,262,520 B2 * | 3/2022 | Geens | G02B 6/4471 |
| 2002/0081076 A1 * | 6/2002 | Lampert | G02B 6/3895 385/72 |
| 2002/0197018 A1 * | 12/2002 | Lampert | G02B 6/3895 385/76 |
| 2003/0002808 A1 * | 1/2003 | Lampert | G02B 6/3895 385/70 |
| 2006/0057896 A1 | 11/2006 | Karir et al. | |
| 2009/0068881 A1 | 3/2009 | Patchett | |
| 2011/0085774 A1 | 4/2011 | Murphy et al. | |
| 2012/0064760 A1 | 3/2012 | Dietz et al. | |
| 2014/0219615 A1 | 8/2014 | Petersen et al. | |
| 2014/0219621 A1 | 8/2014 | Barnette, Jr. et al. | |
| 2016/0274311 A1 * | 9/2016 | Verheyden | G02B 6/3825 |
| 2018/0217338 A1 * | 8/2018 | Takano | G02B 6/3879 |
| 2018/0217339 A1 * | 8/2018 | Ma | G02B 6/3893 |
| 2018/0224610 A1 * | 8/2018 | Pimentel | G02B 6/3897 |
| 2019/0041597 A1 | 2/2019 | Marcouiller et al. | |

(56) References Cited

U.S. PATENT DOCUMENTS

| | | | |
|---|---|---|---|
| 2019/0079260 A1* | 3/2019 | Coaxum | G02B 6/4472 |
| 2019/0101716 A1 | 4/2019 | Claessens et al. | |
| 2019/0265429 A1 | 8/2019 | Thigpen | |
| 2019/0302389 A1 | 10/2019 | Newbury et al. | |
| 2019/0324217 A1 | 10/2019 | Lu et al. | |
| 2019/0324218 A1 | 10/2019 | Chang et al. | |
| 2019/0339460 A1 | 11/2019 | Dannoux et al. | |
| 2019/0339461 A1 | 11/2019 | Dannoux et al. | |
| 2019/0369336 A1 | 12/2019 | Van Baelen et al. | |
| 2019/0369345 A1 | 12/2019 | Reagan et al. | |
| 2019/0391351 A1 | 12/2019 | Claessens et al. | |
| 2020/0003965 A1 | 1/2020 | Coenegracht | |
| 2020/0012051 A1 | 1/2020 | Coenegracht et al. | |
| 2020/0049896 A1 | 2/2020 | Dannoux et al. | |
| 2020/0049921 A1 | 2/2020 | Coenegracht et al. | |
| 2020/0049922 A1 | 2/2020 | Rosson | |
| 2020/0057205 A1 | 2/2020 | Dannoux et al. | |
| 2020/0057222 A1 | 2/2020 | Dannoux et al. | |
| 2020/0057223 A1 | 2/2020 | Dannoux et al. | |
| 2020/0057224 A1 | 2/2020 | Dannoux et al. | |
| 2020/0096705 A1 | 3/2020 | Rosson | |
| 2020/0096709 A1 | 3/2020 | Rosson | |
| 2020/0096710 A1 | 3/2020 | Rosson | |
| 2020/0103599 A1 | 4/2020 | Rosson | |
| 2020/0103608 A1 | 4/2020 | Hill et al. | |
| 2020/0174200 A1 | 6/2020 | Chang et al. | |
| 2020/0257064 A1 | 8/2020 | Otomitsu | |
| 2020/0348476 A1 | 11/2020 | Hill et al. | |
| 2021/0011235 A1* | 1/2021 | Wimmer | G02B 6/3895 |
| 2021/0018707 A1 | 1/2021 | Hill et al. | |
| 2021/0364721 A1* | 11/2021 | Van Baelen | G02B 6/4454 |
| 2021/0373254 A1* | 12/2021 | Wong | G02B 6/3878 |

FOREIGN PATENT DOCUMENTS

| | | | |
|---|---|---|---|
| WO | 2017046190 A2 | 3/2017 | |
| WO | WO-2017046190 A2 * | 3/2017 | ........... G02B 6/4444 |
| WO | 2018009426 A1 | 1/2018 | |
| WO | 2018151824 A1 | 8/2018 | |
| WO | 2019005190 A2 | 1/2019 | |
| WO | 2019005191 A1 | 1/2019 | |
| WO | 2019005192 A1 | 1/2019 | |
| WO | 2019005193 A1 | 1/2019 | |
| WO | 2019005194 A1 | 1/2019 | |
| WO | 2019005195 A1 | 1/2019 | |
| WO | 2019005196 A1 | 1/2019 | |
| WO | 2019005197 A1 | 1/2019 | |
| WO | 2019005198 A1 | 1/2019 | |
| WO | 2019005199 A1 | 1/2019 | |
| WO | 2019005200 A1 | 1/2019 | |
| WO | 2019005201 A1 | 1/2019 | |
| WO | 2019005202 A1 | 1/2019 | |
| WO | 2019005203 A1 | 1/2019 | |
| WO | 2019005204 A1 | 1/2019 | |
| WO | 2019005782 A1 | 1/2019 | |
| WO | 2019005783 A1 | 1/2019 | |
| WO | 2019005786 A1 | 1/2019 | |
| WO | 2019005789 A1 | 1/2019 | |
| WO | 2019006121 A1 | 1/2019 | |
| WO | 2019006176 A1 | 1/2019 | |
| WO | 2019006191 A1 | 1/2019 | |
| WO | 2019006195 A1 | 1/2019 | |
| WO | 2019106870 A1 | 6/2019 | |
| WO | 2019108259 A1 | 6/2019 | |
| WO | 2019245582 A1 | 12/2019 | |

* cited by examiner

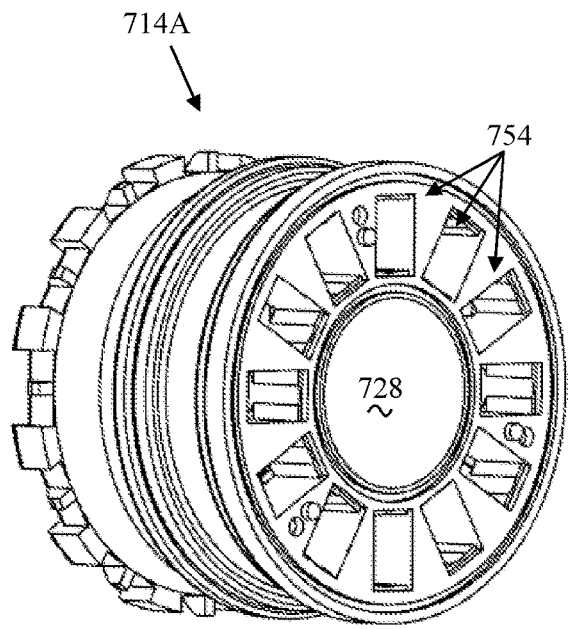
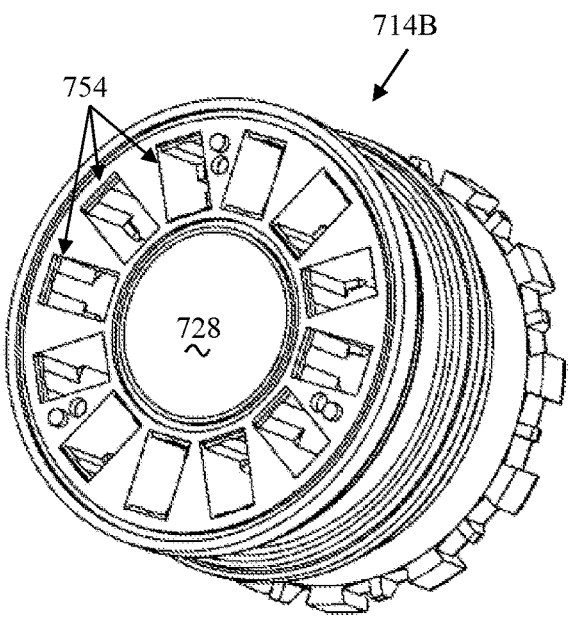
FIG. 42A  FIG. 42B
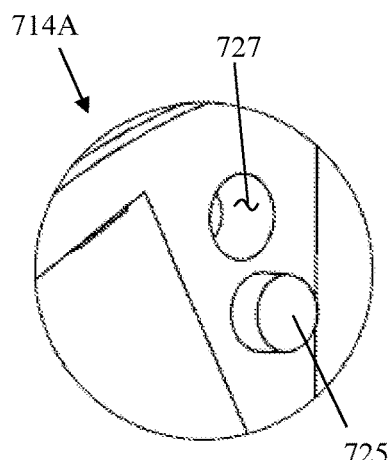
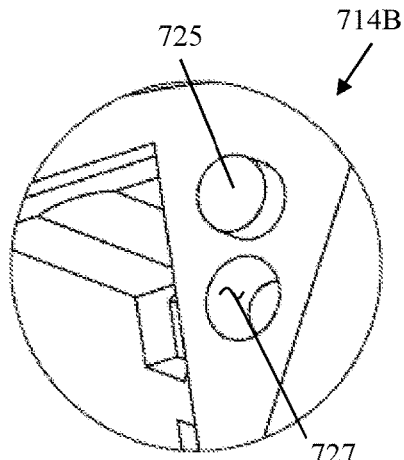
FIG. 43A  FIG. 43B

MULTIPORT ASSEMBLY AND ASSOCIATED COMPONENTS

CROSS-REFERENCE TO RELATED APPLICATIONS

This application claims priority to U.S. Provisional App. No. 63/036,950, filed Jun. 9, 2020, and to U.S. Provisional App. No. 63/086,909, filed Oct. 2, 2020, and to U.S. Provisional App. No. 63/191,073, filed May 20, 2021, and to U.S. Provisional App. No. 63/191,074, filed on May 20, 2021, and to U.S. Provisional App. No. 63/191,077, filed on May 20, 2021, the entireties of which are hereby incorporated by reference.

FIELD

The present disclosure generally relates to connections for optical and/or electrical transmission and distribution, and, more specifically, to a multiport assembly for making multiple connections, and components associated with the multiport assembly.

BACKGROUND

Connectors are used within electromagnetic transmission networks to interconnect optical and/or electrical cables to optical and/or electrical devices or other optical or electrical cables. Electromagnetic connections of this type typically involve two connectors coupled together either directly or with the assistance of an adapter.

SUMMARY

In one aspect, a multiport device for connecting connectors capable of transmitting electricity and/or optical waves comprises a first port housing including a plurality of first ports. Each first port is configured to receive and couple to one of the connectors. A second port housing includes a plurality of second ports. Each second port is configured to receive and couple to one of the connectors. The first and second port housings are releasably coupled together. When the first and second port housings are coupled together, the first and second ports are aligned with each other such that a communication connection is formed between first and second connectors when the first connector is coupled to one of the first ports and the second connector is coupled to one of the second ports corresponding to said one of the first ports.

In another aspect, a multiport device for connecting connectors capable of transmitting electricity and/or optical waves is disclosed. Each connector includes a ferrule assembly. The multiport device comprises a port housing including a port configured to receive and couple to a first connector of the connectors and a receptacle receiver sized and shaped for selectively receiving at least a portion of an adapter therein. The port and receptacle receiver are arranged such that when the first connector is coupled to the port and the adapter is received in the receptacle receiver, the ferrule assembly of the first connector is received by the adapter.

In another aspect, a multiport device kit for connecting connectors capable of transmitting electricity and/or optical waves comprises a first adapter configured for connectors of a first type. A second adapter is configured for connectors of a second type. A first port housing includes a first port configured to receive and couple to a first connector and a first receptacle receiver sized and shaped for selectively receiving a portion of either the first or second adapter therein. A second port housing is configured to couple to the first port housing. The second port housing includes a second port configured to receive and couple to a second connector and a second receptacle receiver sized and shaped for selectively receiving a portion of either the first or second adapter therein. The first and second receptacle receivers align with each other when the first and second port housings are coupled together such that only one of the first or second adapters can be received by the aligned first and second receptacle receivers.

In another aspect, a port device for connecting to a connector capable of transmitting electricity and/or optical waves has a movable latch yieldably biased in a latching position and movable to an unlatching position comprises a port housing including a port configured to receive and couple to the connector. The port includes a latch retainer configured to be engaged by the latch of the connector to secure the connector to the port. The latch retainer is configured to engage and deflect the latch toward the unlatching position as the connector is inserted in an insertion direction into the port.

In another aspect, a connector for being plugged into a port of a port device comprises a ferrule assembly defining a connection end of the connector. A port engagement portion is spaced apart from the connection end of the connector along a longitudinal axis of the connector toward an opposite cable end of the connector. The port engagement portion includes a port insert body sized and shaped for being received in the port of the port device when the connector is plugged into the port. A deflectable latch is coupled to the port insert body and is configured for latching engagement with the port device to releasably retain the connector in the port.

In another aspect, a multiport device for connecting connectors of different types capable of transmitting electricity and/or optical waves is disclosed. Each connector includes a ferrule assembly. The multiport device comprises a port housing including a plurality of ports. Each port is configured to receive and couple to one of the connectors. The port housing includes a plurality of identification insert mounts. Each identification insert mount is disposed on an exterior of the port housing to align with and visually correspond to one of the plurality of ports. A plurality of identification inserts are included. Each identification insert includes indicia identifying one type of the connector. Each identification insert includes an identification insert coupler configured to couple to one of the identification insert mounts corresponding to one of the plurality of ports to attach said identification insert to the port housing such that said identification insert provides a visual indication of the type of connector to be received by said one port of the plurality of ports.

In another aspect, an auxiliary port device for a multiport device comprises a first port housing including a first port. The first port is configured to receive and couple to a first connector. A second port housing includes a second port. The second port is configured to receive and couple to a second connector. The first and second port housings are releasably coupled together. When the first and second port housings are coupled together, the first and second ports are aligned with each other such that a communication connection is formed between the first and second connectors when the first connector is coupled to the first port and the second connector is coupled to the second port. A mounting structure of the auxiliary port device is configured to facilitate mounting the auxiliary port on the multiport device.

Other objects and features of the present disclosure will be in part apparent and in part pointed out hereinafter.

BRIEF DESCRIPTION OF THE DRAWINGS

FIG. 42A is a rear perspective of the first port housing of the multiport device of FIG. 40;

FIG. 42B is a rear perspective of the second port housing of the multiport device of FIG. 40;

FIG. 43A is an enlarged view of the first port housing of the multiport device of FIG. 40;

FIG. 43B is an enlarged, fragmentary perspective of the second port housing of the multiport device of FIG. 40;

Corresponding reference characters indicate corresponding parts throughout the drawings.

DETAILED DESCRIPTION

The present disclosure related to a multiport assembly, and associated components, for forming communication or transmission connections (e.g., optical connections, electrical connections) between communication cables, such as fiber optic cables and electrical cables. Generally, communication cables have connectors (e.g., optical connectors, electrical connectors) at an end thereof that are constructed to form a communication connection with another communication device, such as another connector. When coupled to the communication device (e.g., another connector), the connector and the communication device form a communication connection that enables communication between different communication components (e.g., cables, devices, etc.) in a communications network (e.g., an optical communications network, an electrical communication network). Typically, the connector is attached to an end of a communication cable, although other arrangements are within the scope of the present disclosure. Other configurations of the multiport assembly, and associated components, are within the scope of the present disclosure. For example, the multiport assembly and associated component can be used to make other types of connections.

Figure 1:
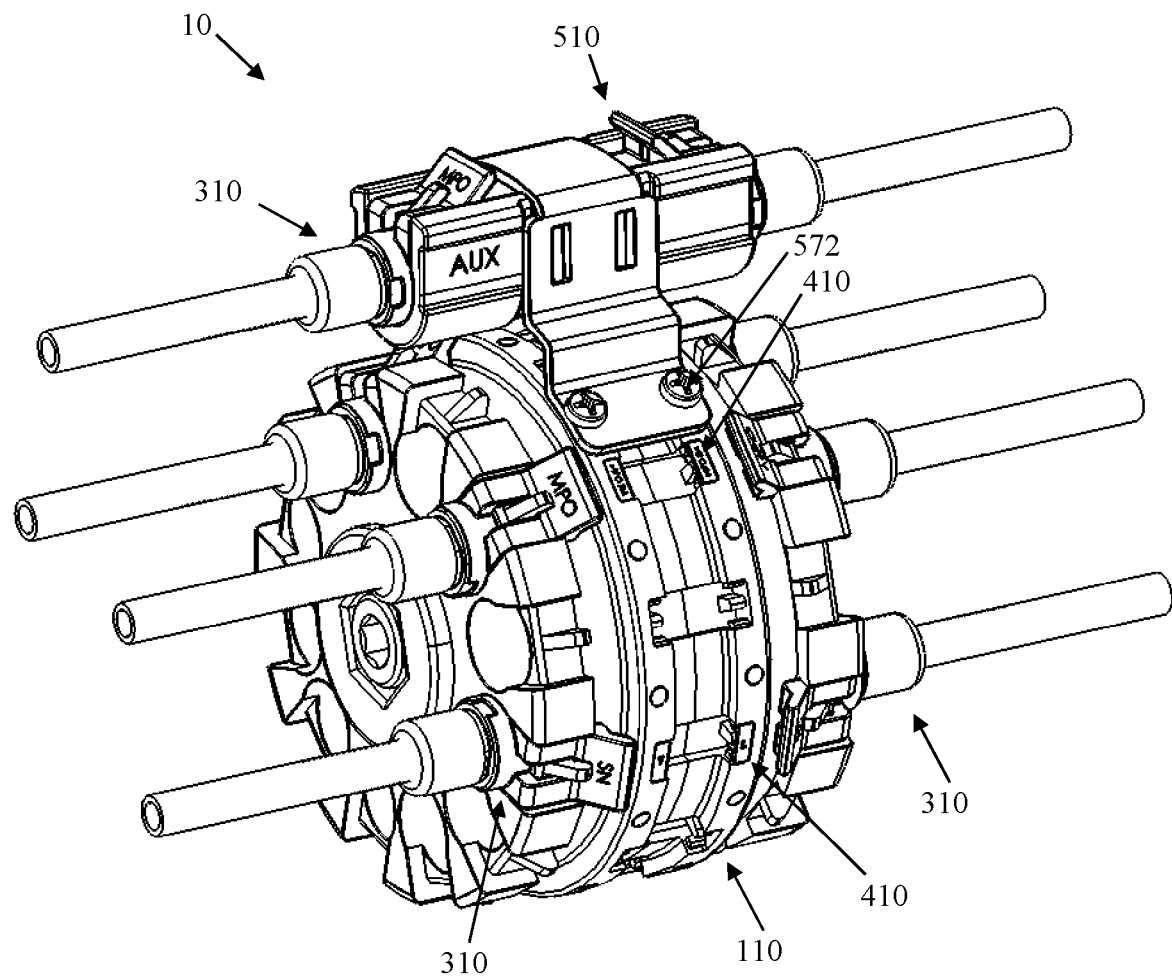
FIG. 1 is a perspective of a multiport assembly according to one embodiment of the present disclosure.
Figure 10:
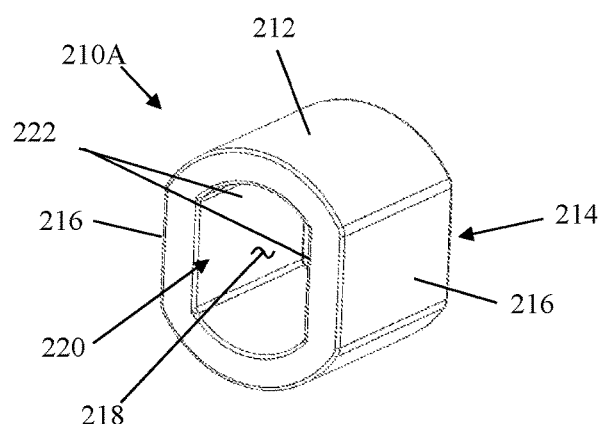
FIG. 10 is a perspective of the adapter of FIG. 9, the adapter useable with the MPO connector of FIG. 8A.
Figure 11:
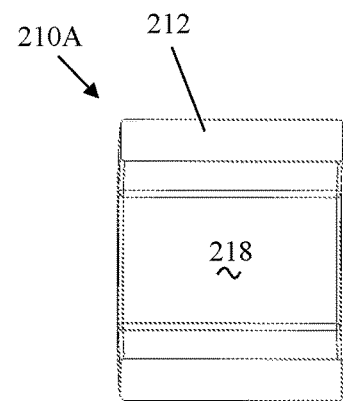
FIG. 11 is a vertical section thereof.
Figure 19:
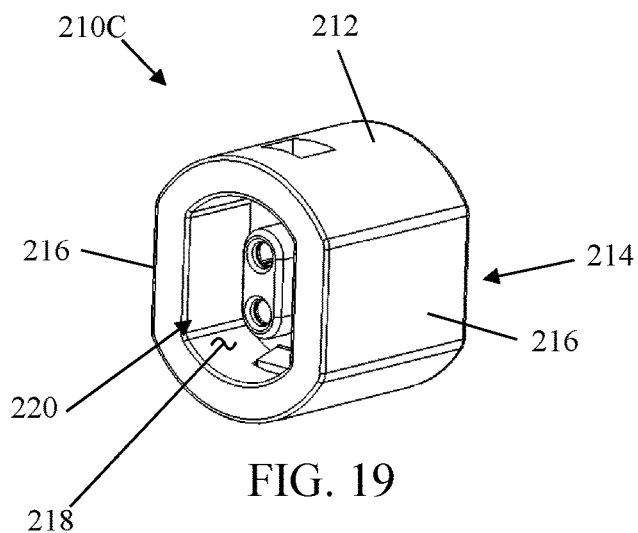
FIG. 19 is a perspective of another embodiment of an adapter useable with the SN connector of FIG. 18.
Figure 20:
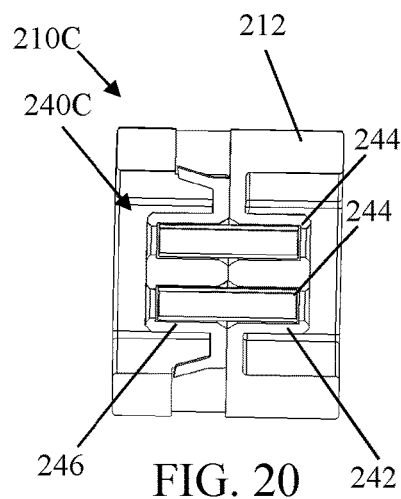
FIG. 20 is a vertical section thereof.

Referring to FIG. 1, a multiport assembly according to one embodiment of the present disclosure is generally indicated at reference numeral 10. The multiport assembly 10 is used to form communication connections between a plurality of communication devices. The multiport assembly 10 includes a multiport device (broadly, a port device), generally indicated at 110, a plurality of connectors, generally indicated at 310, a plurality of adapters, generally indicated at 210 (FIGS. 10, 15, and 19), a plurality of identification inserts, generally indicated at 410, and/or one or more auxiliary port devices, generally indicated at 510. The connectors 310 are adapted for use with both the multiport device 110 and the auxiliary port device 510. The multiport assembly 10, or more particularly a collection of its component parts and/or a sub-set of its component parts, may be referred to as a "kit."

Figure 2:
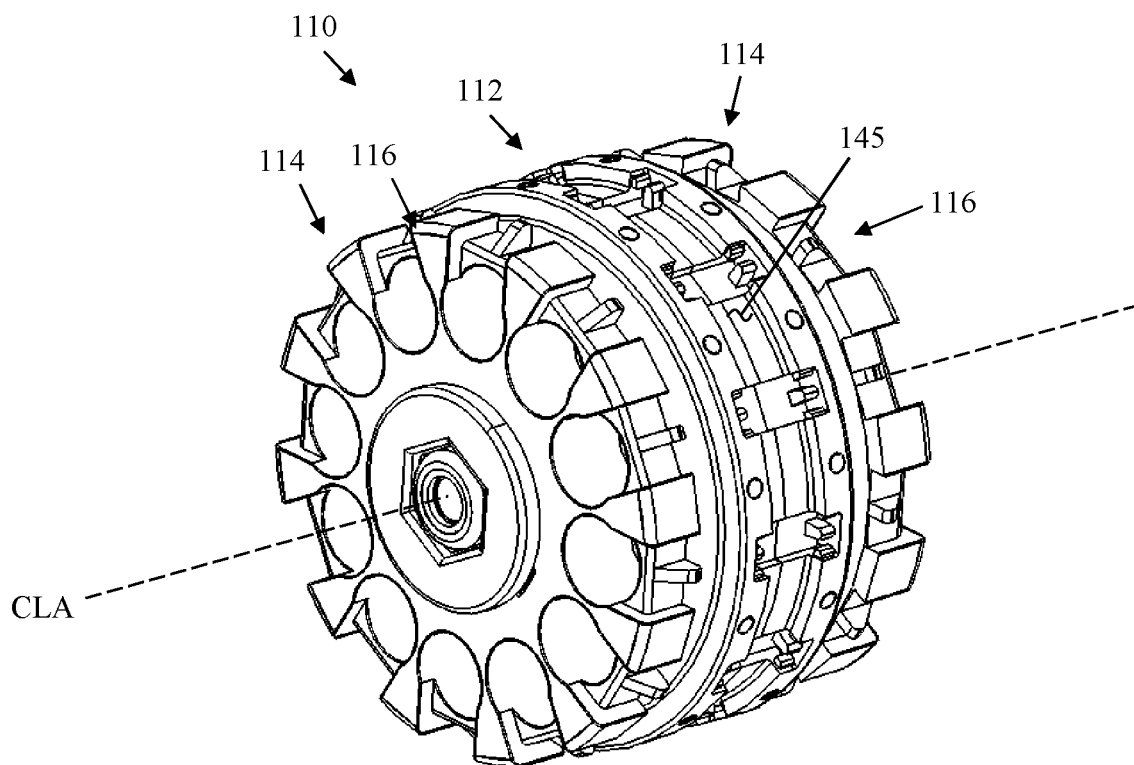
FIG. 2 is a perspective of a multiport device according to one embodiment of the present disclosure, the multiport device being part of the multiport assembly of FIG. 1.
Figure 3:
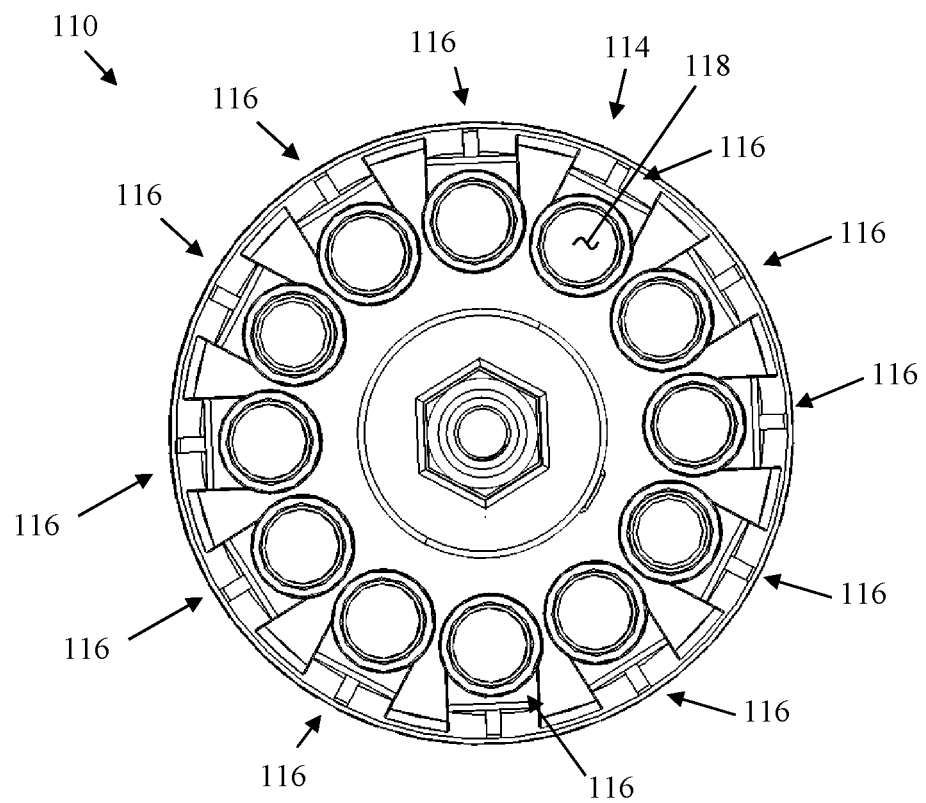
FIG. 3 is a front view of the multiport device, the rear view being identical thereto.
Figure 4:
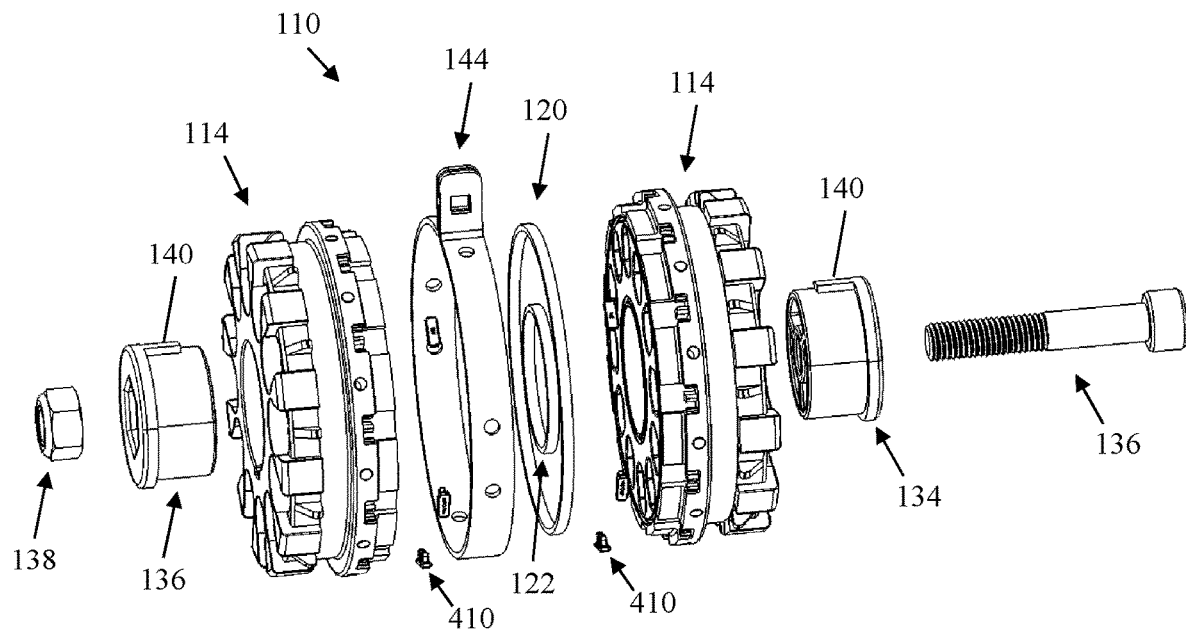
FIG. 4 is an and exploded view of the of multiport device.

Referring to FIGS. 1-7, the multiport device 110 connects connectors 310 together. Specifically, the multiport device 110 is configured to interchangeably mate with a plurality of different types of connectors 310. The multiport device 110 includes a port body 112 having first and second port housings 114. The multiport device 110 has opposite first and second end portions defined by the port body 112 (e.g., defined by the respective first and second port housings 114). The first and second end portions are spaced apart along a central longitudinal axis CLA (FIG. 2). The first and second port housings 114 are generally identical. Accordingly, the first port housing 114 will now be described with the understanding its description also applies to the second port housing.

The first port housing 114 includes a plurality of ports 116 (e.g., first ports with the second port housing including a plurality of second ports). In the illustrated embodiment, the first port housing 114 is generally cylindrical in shape (e.g. disc shaped) and the ports are circumferentially spaced apart about the central longitudinal axis CLA near the perimeter (e.g., circumference) of the first port housing. The first port housing 114 has an inner end portion and an outer end portion spaced apart along the central longitudinal axis CLA. The outer end portion of the first port housing 114 defines one of the first or second end portions of the port body 112. Each port 116 is generally identical. Each port 116 is configured to receive and couple to a connector 310. Each port 116 extends generally longitudinally (e.g. in an insertion or plug-in direction) along the first port housing from the outer end portion toward the inner end portion. Each port 116 has (e.g., defines) an opening (e.g., port opening or outer opening) generally at the outer end portion and a connector socket 118 (FIG. 7) extending (generally longitudinally) toward the inner end portion of the first port housing 114 from the opening. The opening and connector socket 118 are sized and shaped to receive the connector 310 (e.g., a portion or at least a portion of the connector). In the illustrated embodiment, the opening and connector socket 118 are generally circular. The connector 310 is connected to the port 116 by inserting or plugging the connector 310 into the connector socket 118 in the insertion direction. As will become apparent, when the connector 310 mates with one of the ports 116, the connector also mates with a communication device, such as another connector (when the communication device is plugged into a corresponding port 116).

The first port housing 114 includes (e.g., defines) a coupling passage 128 (FIG. 5) that extends longitudinally through the first port housing from the outer end portion through the inner end portion. The coupling passage 128 is generally located in the middle of the first port housing 114 such that the ports 116 are spaced apart radially outward from the coupling passage and circumferentially spaced from one another about the coupling passage. As explained in more detail below, the coupling passage 128 is used to couple the first and second port housings 114 together. The coupling passage 128 is generally circular. The first port housing 114 includes a key element 130 along the coupling passage 128. In the illustrated embodiment, the key element is a longitudinal slot that opens through the outer end portion of the first port housing 114.

The first and second port housings 114 are configured to be selectively and releasably coupled together. The first and second port housings 114 are coupled together inner-end-portion-to-inner-end-portion to form the port body 112. When the first and second port housings 114 are coupled together, the ports 116 of the first and second port housings 114 are aligned with each other (e.g., each port of the first port housing is aligned with a corresponding port of the second port housing) such that a communication connection is formed between two (e.g., first and second) connectors 310 when the first connector is coupled to the port of the first port housing and the second connector is coupled to a port of the second port housing that corresponds to (e.g., aligns with) said port of the first port housing. Specifically, the connector sockets 118 of corresponding ports 116 of the first and second port housings 114 align (e.g., longitudinally align) with each other when the first and second port housings are coupled together. Thus, the first and second port housings 114 are able to hold a plurality of connectors 310 together, such that each set or pair of communications connectors forms a communication connection therebetween through the sockets 118. Accordingly, the multiport device 110 can be used to create a plurality of communication connections for a plurality of connector sets.

The first and second port housings 114 engage each other along an interface when coupled together. Specifically, the inner end portions of the first and second port housings 114 engage each other and form the interface. The interface is generally planar and generally perpendicular to the central longitudinal axis CLA. The multiport device 110 includes a first or outer seal 120 at the interface of the first and second port housings 114. The outer seal 120 forms a fluid tight seal at the interface of the first and second port housings 114. The multiport device 110 also includes a second or inner seal 122 (e.g., compressible seal) at the interface of the first and second port housings 114. The inner seal 122 also forms (e.g., is configured to form) a fluid tight seal at the interface of the first and second port housings 114. The outer and inner seals 120, 122 are concentrically arranged, with the outer seal generally disposed radially outward of the ports 116 and the inner seal generally disposed radially inward of the ports. Specifically, the outer and inner seals 120, 122 are concentrically arranged such that each inner opening (at the inner end portion) that is in communication with one of the ports 116 (e.g., connector socket 118) is disposed between the outer and inner seals (when the first and second port housings 114 are coupled together). In one embodiment, outer and inner seal 120, 122 may comprise compressible O-rings. In the illustrated embodiment, the inner end portion of each port housing 114 includes an annular outer perimeter seal groove 124 (FIG. 5) configured to receive a portion of the outer seal 120 therein and an annular inner perimeter seal groove 126 configured to receive a portion of the inner seal 122 therein. The outer perimeter seal groove 124 is spaced apart radially outward of the inner openings and the inner perimeter seal groove 126 is spaced apart radially inward of the inner openings. When the first and second port housings 114 are secured together, the outer and inner seals 120, 122 seal the interface between the first and second port housings to inhibit ingress of dust or water into the ports through the interface between the first and second port housings.

Figure 5:
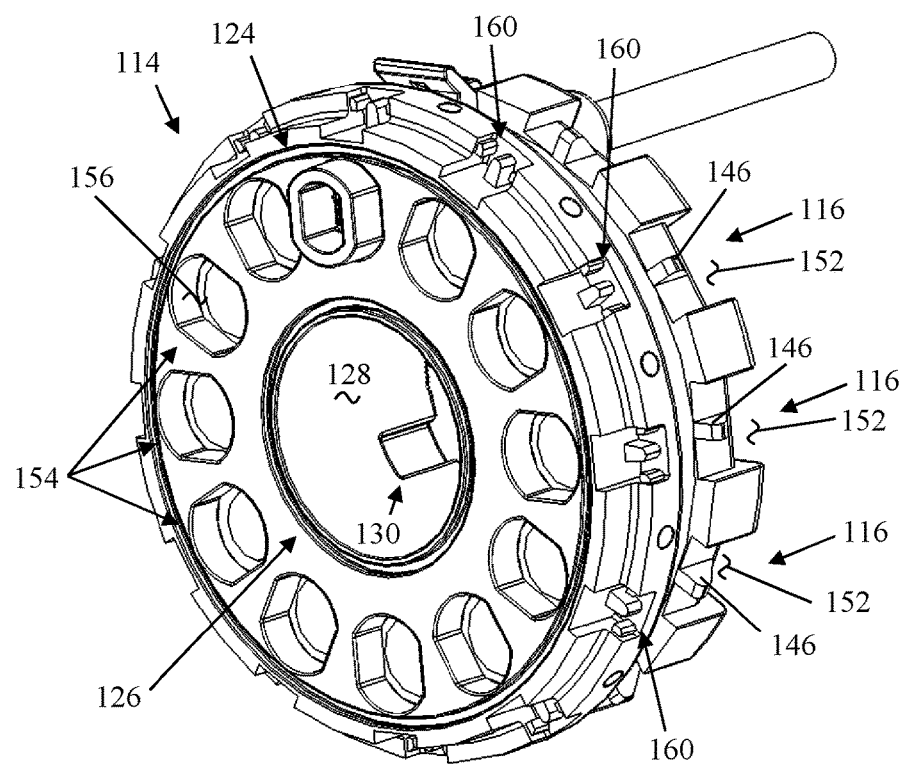
FIG. 5 is a perspective of a port housing of the multiport device, with a connector and an adapter coupled to the port housing.
Figure 6:
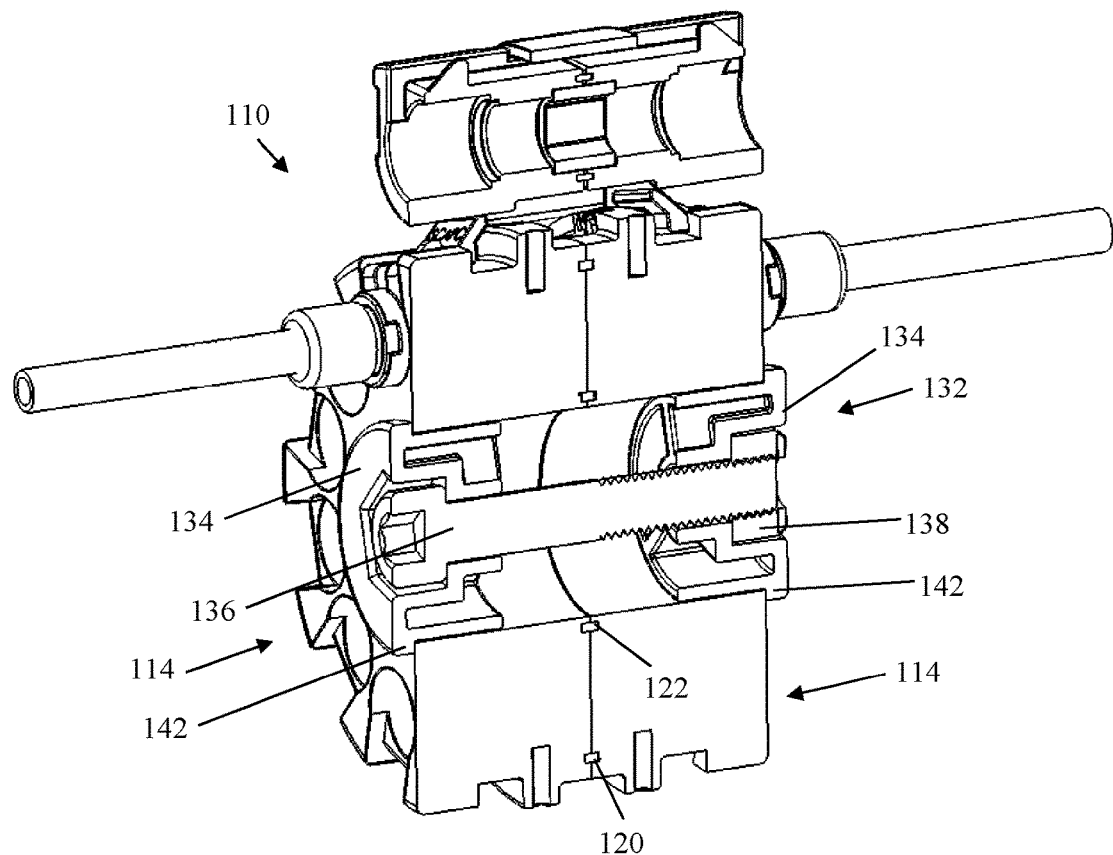
FIG. 6 is a vertical section of the multiport assembly of FIG. 1.

The multiport device 110 includes a coupler 132 (FIG. 6). The coupler 132 is configured to releasably couple the first and second port housings 114 together. The coupler 132 is received in the coupling passages 128 of the first and second port housings 114 to secure the port housings together. The coupler 132 includes first and second hubs 134, each configured to be received in one of the coupling passages 128 of the first or second port housing 114. The coupler 132 includes a suitable fastener such as a bolt 136 and a nut 138. The bolt 136 and nut 138 clamp the first and second hubs 134 (and thereby fasten the first and second port housings 114 together). Each hub 134 is generally cylindrical with a central fastener passage, that receives the bolt 136, extending longitudinally through the middle of the hub. The coupler 132 is configured to engage the first and second port housings 114 to prevent the first and second port housings from rotating relative to each other. Each hub 134 includes a hub key 140 (FIG. 5) configured to engage one of the port housings 114. The hub key 140 is slidably received into the key element 130 to inhibit rotation of the hub 134 with respect to the port housing 114. Each hub 134 also includes a lip 142 along the outer perimeter of the outboard end portion thereof that is configured to engage the outer end face of the outer end portion of the port housing 114. To secure the first and second port housings 114 together, the port housings are arranged inner-end-portion-to-inner-end-portion, the hubs 134 are inserted into the coupling passages 128 so that the hub keys 140 slide into and are received in the key element 130 and the lips 142 engage the outer end faces of the respective first and second port housings. After, the bolt 136 is inserted through the hubs 134 and the nut 138 is threaded thereon to draw the hubs together thereby securing the first and second port housings 114 together. It will be understood that other ways of connecting the port housings 114 to each other may be employed.

In one embodiment, the multiport device 110 includes a mounting bracket 144 (FIG. 4) for mounting the multiport device (broadly, the multiport assembly 10) to a support structure (not shown), such as a beam or post. The mounting bracket 144 extends circumferentially around the port body 112 when the first and second port housings 114 are coupled together. Each port housing 114 includes a radially outwardly extending flange adjacent the inner end portion. When the two port housings 114 are coupled together, the radially outwardly extending flanges of each port housing define a mounting bracket channel 145 (FIG. 2) for receiving the mounting bracket 144.

Figure 8A:
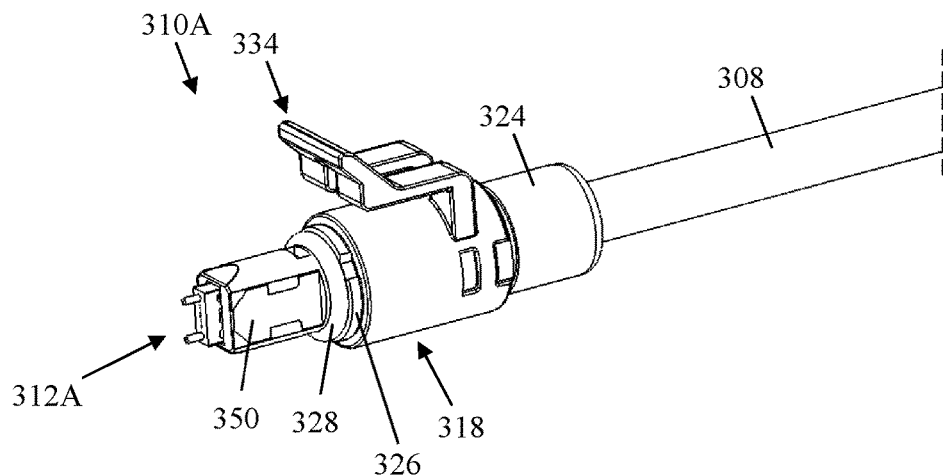
FIG. 8A is a perspective of one embodiment of an MPO optical connector according to the present disclosure.
Figure 8B:
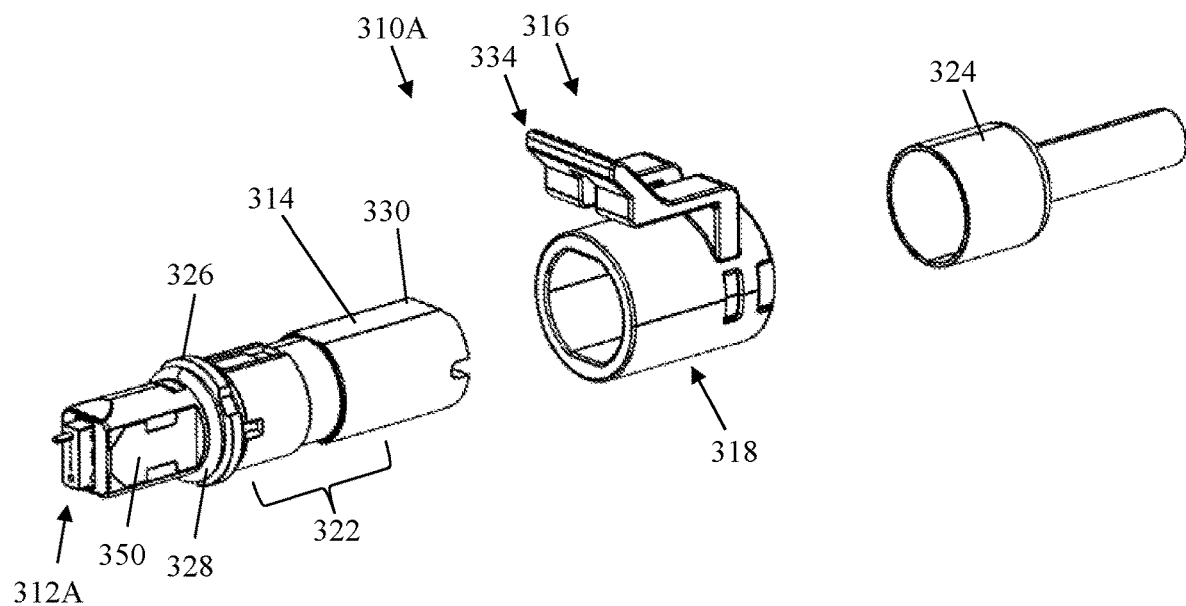
FIG. 8B is an exploded perspective of the MPO connector of FIG. 8A.
Figure 8C:
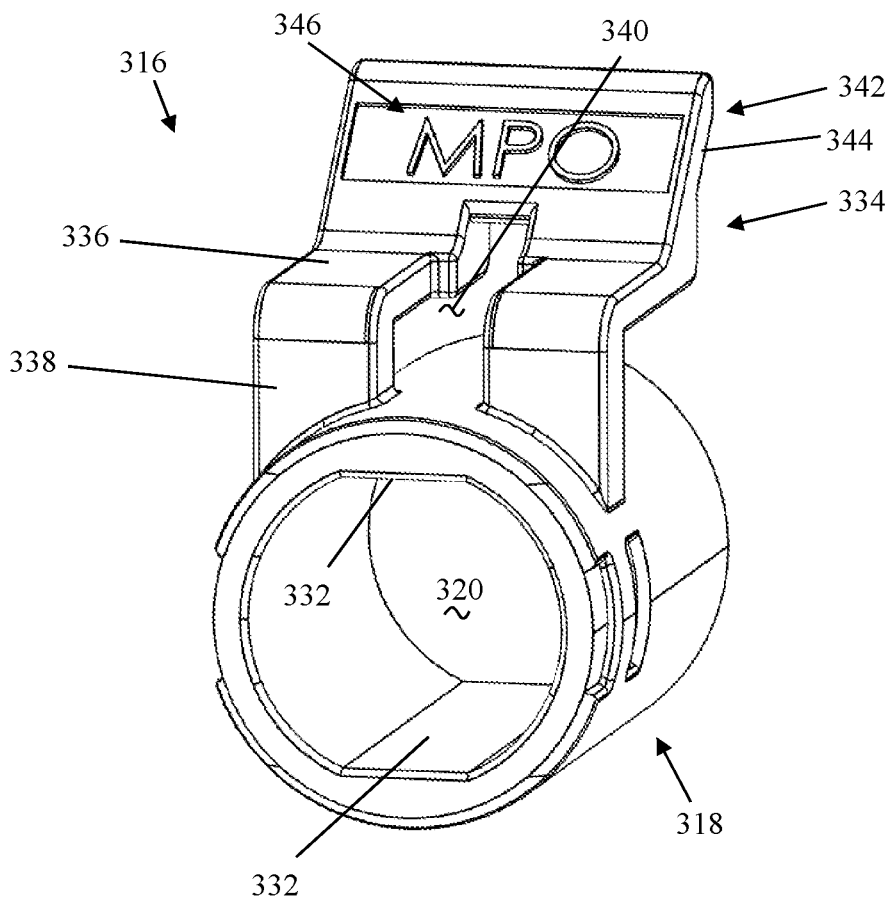
FIG. 8C is a perspective of a port engagement portion of the MPO connector of FIG. 8A.
Figure 9:
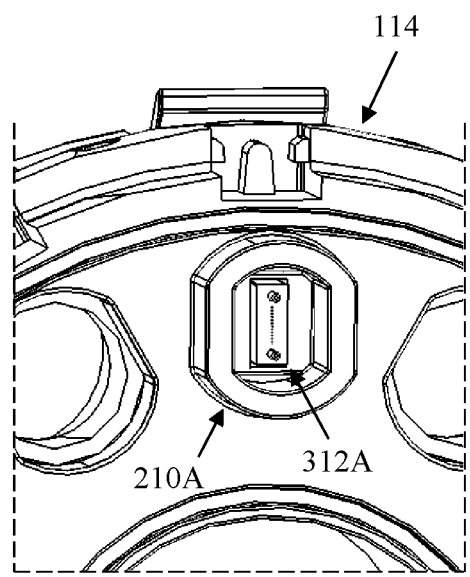
FIG. 9 an enlarged, fragmentary perspective of the MPO connector of FIG. 8A attached to the port housing, with an adapter attached to the port housing.

Referring to FIGS. 8A-C, one embodiment of a connector is generally indicated at reference numeral 310A. As used herein, when a reference character includes a reference numeral not followed by a letter, such a reference character refers to all elements designated at least in part by the reference numeral. Moreover, when a reference character includes the reference numeral followed by a letter, such as "A," such a reference character refers to a particular type of element from the group of elements. For example, as used herein, the reference character "310" refers to all connectors (e.g., connectors 310A-C) designated at least in part with reference numeral "310" and the reference character "310A" refers to a particular type of connector such as the multi-fiber push on ("MPO") connector (described in more detail below).

The connector 310A plugs into one of the ports 116 of the multiport device 110. The connector 310A includes a ferrule assembly 312A (containing one or more ferrules). The ferrule assembly 312A defines a connection end of the connector 310A. In other words, ferrule assembly 312A is received first into one of the ports 116 of the multiport device 110 to plug or connect the connector to the port. In this embodiment, the ferrule assembly 312A comprises a MPO ferrule assembly. Thus, in this embodiment, the connector 310A may be referred to as a MPO connector (e.g., MPO optical connector). In this embodiment, the connector 310A is attached to an end of a fiber optic cable 308.

The connector 310A includes a connector housing 314 that supports the ferrule assembly 312A. The connector housing 314 extends from a front end portion to a rear end portion. The cable 308 extends rearward from the rear end portion and the ferrule assembly 312A extend forward from the front end portion of the connector housing 314. A strain relief boot 324 is attached to the rear end portion of the connector housing 314 to support and strengthen the interface between the cable 308 and the rear end portion of the connector housing 314. The connector 310A includes a flange 326 that protrudes radially outward from the connector housing 314. The flange 326 is located between the front and rear end portions of the connector housing 314. The connector 310A includes a seal 328 (e.g., an O-ring) configured to engage a port 116 of the multiport device 110 to form a fluid-tight seal with the multiport device to prevent the ingress of moisture and debris. The seal 328 is spaced apart from the connection end (e.g. ferrule assembly 312A) of the connector 310A along a longitudinal axis of the connector toward the opposite cable (e.g., rear) end. The connector housing 314 defines an annular seal groove sized and shaped to receive the seal 328. The annular seal groove is disposed immediately in front of the flange 326, so that flange can brace the seal 328 against the port 116 when the connector 310A is coupled to the port.

The connector 310A also includes a port engagement portion 316 supported by the connector housing 314. The port engagement portion 316 is spaced apart from the connection end (e.g., ferrule assembly 312A) of the connector 310A along the longitudinal axis of the connector toward an opposite cable end of the connector. The port engagement portion 316 includes a port insert body 318. The port insert body 318 (e.g., the exterior thereof) is sized and shaped to be received in one of the ports 116 of the multiport device 110 when the connector 310A is coupled to the port. The exterior of the port insert body 318 is sized and shaped to correspond to (e.g., generally match) the size and shape of the connector socket 118 of the ports 116. Preferably, the fit between the port insert body 318 and the connector socket 118 is relatively tight so as to inhibit lateral movement and twisting of the connector 310A in the multiport device 110, which could otherwise damage and/or impair the communication connection formed by the connector. The port insert body 318 extends out of the opening of the port 116 at the outer end of the port housing 114 when the connector 310A is coupled to the multiport device 110.

The port insert body 318 is also configured to be mounted on the connector housing 314. The port insert body 318 defines a connector housing passageway 320 (FIG. 8C) that receives the connector housing 314. In this embodiment, the port insert body 318 extends circumferentially around the connector housing 314. The port insert body 318 is supported on the connector housing 314 at a locating area 322 (FIG. 8B). The locating area 322 is between the flange 326 and the strain relief boot 324. The flange 326 defines the front end of the latch body locating area 322. The port insert body 318 is longitudinally slidable along the connector housing 314. The flange 326 functions as a stop and engages the port insert body 318 to limit the forward movement of the port insert body along the connector housing 314 toward the connection end. Accordingly, the port insert body 318 is disposed between a front end of the strain relief boot 324 (which may inhibit the port insert body from moving rearward off the connector housing 314) and a rear end of the flange 326. The port insert body 318 forms an enlarged perimeter section of the connector 310A. The front end portion of the connector housing 314 defines a front perimeter section of the connector 310A that has a smaller cross-sectional dimension than the enlarged perimeter section.

In one embodiment, the connector housing 314 and the port insert body 318 each include rotational alignment keys configured to engage each other to inhibit the port insert body from rotating about the connector housing. In the illustrated embodiment, the connector housing 314 includes flats 330 (e.g., planar surfaces) on opposite sides thereof that engage corresponding flats 332 of the port insert body on opposite sides of the connector housing passageway 320 to inhibit rotation of the two components relative to each other.

Figure 13:
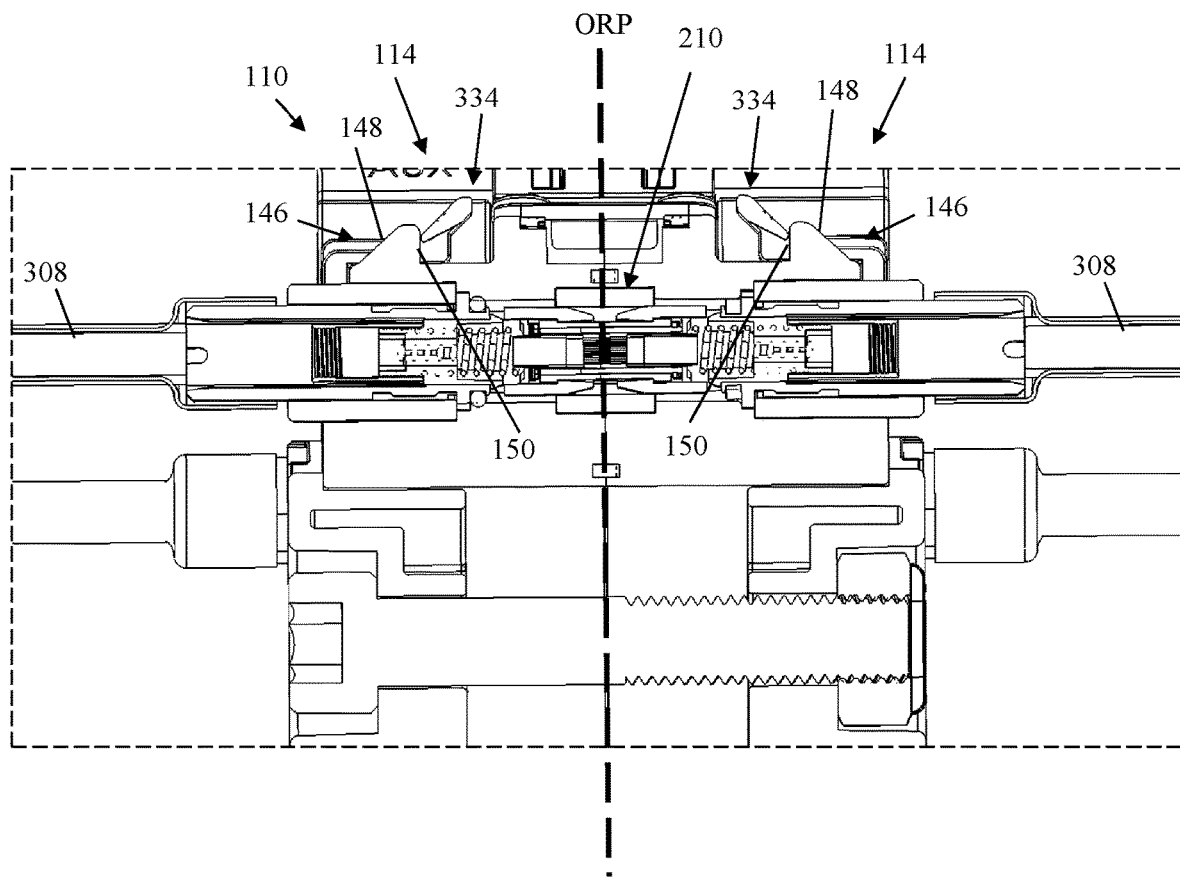
FIG. 13 is a section through the multiport assembly with the adapter of FIG. 9 attached to the multiport device of FIG. 2, the section showing the connection formed within the adapter between two MPO connectors of FIG. 8A.

Still referring to FIGS. 8A-C, the port engagement portion 316 includes a latch 334 (e.g., an overhead latch). The latch 334 is configured to latch onto the multiport device 110 to secure the connector 310A to the multiport device. Referring to FIG. 13 and briefly referring back to FIGS. 5 and 7, each port 116 of the multiport device 110 includes a latch retainer 146. The latch retainer 146 is configured to be engaged by a latch 334 of a connector 310 to secure the connector to a port 116. The latch retainer 146 of each port 116 is disposed on an exterior of port housing 114. The latch retainer 146 is adjacent the outer end of the port housing 114. In the illustrated embodiment, each latch retainer 146 is integrally formed with the port housing 114. Each latch retainer 146 has a generally wedge shape that protrudes radially outward from an outer or exterior surface of the port housing 114. Each latch retainer 146 is aligned (e.g., circumferentially aligned) with a connector socket 118 of its corresponding port 116. Each latch retainer 146 is configured to engage and deflect the latch 334 of a connector 310 toward an unlatching position as the connector is inserted into the port (in the insertion direction). Each latch retainer 146 include a deflection surface 148 (at the outer end of the latch retainer) that slopes outward (e.g., radially outward) as the deflection surface extends longitudinally in an outer-to-inner direction. As the connector 310 is moved in the insertion direction, the deflection surface 148 engages and deflects the latch to the unlatching position. Each latch retainer 148 also includes an end or securement surface 150 (at the inner end of the latch retainer). The end surface 150 is generally perpendicular to the insertion direction (e.g., central longitudinal axis CLA). The end surface 150 is configured to engage the latch 334 of the connector 310 when the latch is in the latching position (FIG. 13) to secure the connector to the port 116. As best seen in FIG. 5, the latch retainers 146 are spaced apart circumferentially between raised separator portions of the port housing 114. The raised separator portions of the port housing 114 define latch channels 152 for each latch retainer 146. Accordingly, each latch channel 152 is disposed on the exterior of the port housing 114. Each latch channel 152 is sized and shaped to receive the latch 334 and permit the latch to move (e.g., slide longitudinally) therein. Adjacent raised separation portions define the sides of the latch channels 152. Each latch retainer 146 is disposed in a latch channel 152. In the illustrated embodiment, each latch retainer 146 is disposed in the middle (e.g., circumferential middle) of each latch channel 152 such that roughly half of each latch channel is located on each side (e.g., circumferential side) of the latch retainer.

Referring back to FIGS. 8A-C, the latch 334 of the connector 310A is yieldably biased in a latching position (FIGS. 8A and 13). The latch 334 is moveable or deflectable (e.g., manually moveable), relative to the rest of the connector 310A, between the latching position and the unlatching position (not shown). In the unlatching position, the latch 334 is clear of the latch retainer 146, thereby permitting the latch to move longitudinally past the latch retainer as the connector 310 is moved in the insertion direction or in an opposite removal direction. The latch 334 is attached to the port insert body 318. The latch 334 is configured for latching engagement with the multiport device 110 (e.g. latch retainer 146) to releasably retain the connector 310A with a port 116 of the multiport device. The latch 334 includes a resiliently bendable, overhang latch arm 336. The latch 334 also includes a latch base 338, which may also be resiliently bendable. The latch base 338 is attached to the port insert body 318. The latch base 338 extends radially outward from the port insert body 318. The overhang latch arm 336 is attached to the latch base 338 (e.g., one end is attach to the latch base). The overhang latch arm 336 extends forward from the latch base 338. The overhang latch arm 336 is spaced apart (e.g., radially spaced apart) from the port insert body 318. The overhang latch arm 336 is configured for latching engagement with the multiport device 110 (e.g., latch retainer 146). The overhang latch arm 336 defines a slot 340 (e.g., central elongate longitudinal slot) sized and shaped to receive a portion of the multiport device 110 (e.g., a portion of the latch retainer 146) to form the latching engagement with the multiport device. The slot 340 has enclosed longitudinal sides and an enclosed front end.

The overhang latch arm 336 includes a wedge engagement tip 342 at the front, free end portion of the overhang latch arm. The wedge engagement tip 342 is in front of the slot 340. The wedge engagement tip 342 includes a sloped surface 344. The sloped surface 344 is configured to engage the multiport device 110 (e.g., the deflection surface 148) to deflect the latch 344 as the connector 310A is plugged into a port 116. The sloped surface 344 slopes radially outward as it extends forward, away from the slot 340.

The port engagement portion 316 may also include indicia 346 identifying the type of connector 310A. In the illustrated embodiment, the indicia 346 is disposed on the overhang latch arm 336, although other arrangements are within the scope of the present disclosure. In the illustrated embodiment, the indicia 346 comprises "MPO" thereby identifying the connector 310A as a MPO optical connector. In other embodiments, the indicia may indicate other types of connectors. For example, the indicia may comprise "SC" to identify a SC optical connector, or may comprise "SN" to identify a SN optical connector.

Referring to FIG. 13, to mate the connector 310A with the multiport device 110, the connector 310A is aligned with the desired port 116 and then the front end of the connector is inserted into the port (and further into a corresponding adapter 210, described in more detail below). The slot 340 (broadly, the latch 334) forms a rotational alignment element that provides a visual indication of the rotational alignment of the connector 310A with the port 116 (e.g., the latch retainer 146). Accordingly, the rotational alignment element of the connector 310A is aligned with the latch retainer 146 of the port 116 to orient and align the connector relative to the port. As the connector 310A is inserted, the sloped surface 344 of the wedge engagement tip 342 slides along the deflection surface 148 of the latch retainer 146 of the port 116 the connector is being inserted into. This causes the overhang latch arm 336 to deflect or bend outwardly as required for the wedge engagement tip 342 to pass over the latch retainer 146 (e.g., deflect or bend the overhang latch arm to the unlatching position). When the wedge engagement tip 342 passes the end surface 150 of the latch retainer 146, the overhang latch arm 336 resiliently rebounds causing the overhand latch arm (e.g., the portion defining the closed, front end of the slot 340) to engage the end surface. This also causes the portions of the overhang latch arm 336 on the sides of the slot 340 to move radially inward. This latches the connector 310A to the port device 110 to inhibit inadvertent pullout. As illustrated, the rotational alignment element of the connector 310A is located outside the connector socket 118 when the connector is plugged into the port. To withdraw the connector 310A from the multiport device 110, a user lifts the wedge engagement tip 342 to clear the latch retainer 146 (e.g., to the unlatching position). Subsequently the connector 310A can be pulled out of the port 116 without significant resistance.

Figure 23:
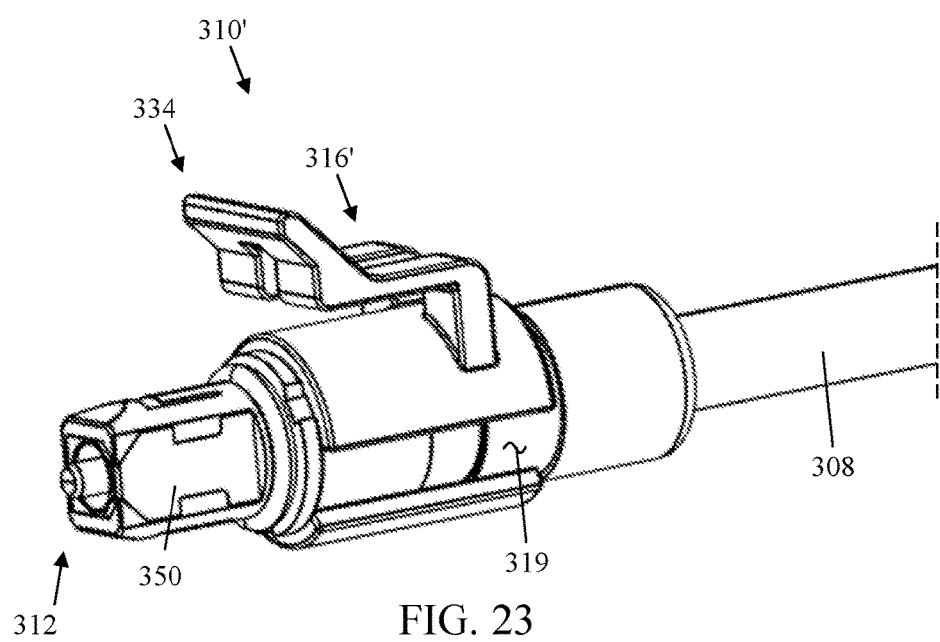
FIG. 23 is a perspective of another embodiment of an SN (simplex) connector according to the present disclosure.
Figure 24:
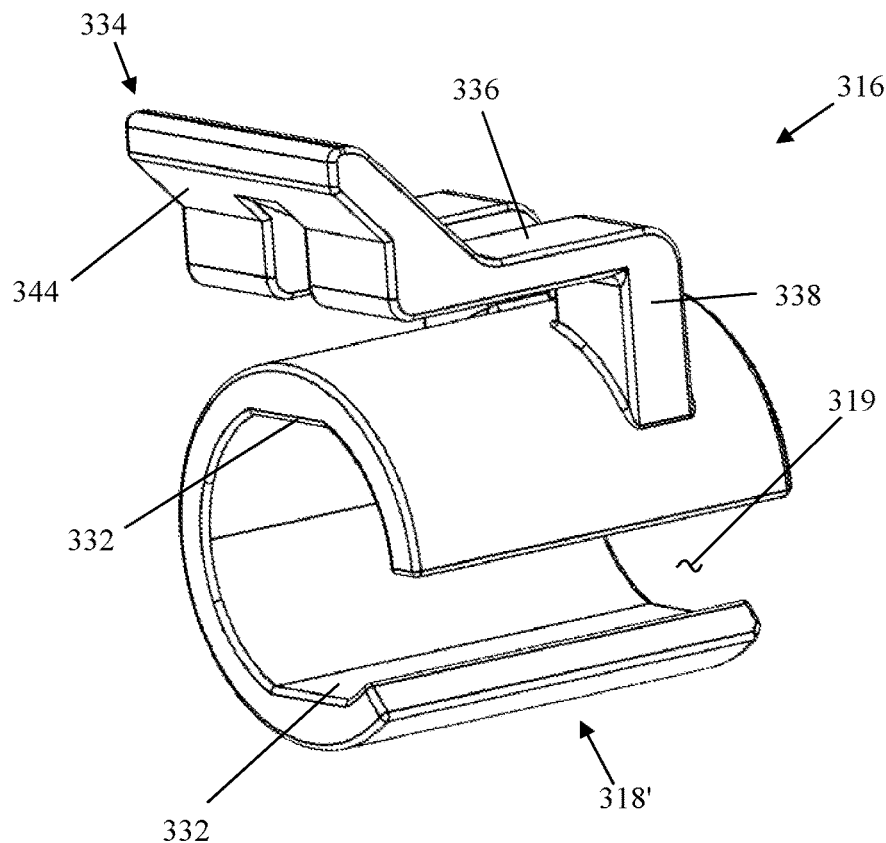
FIG. 24 is a perspective of a port engagement portion of the SN connector of FIG. 23.
Figure 25:
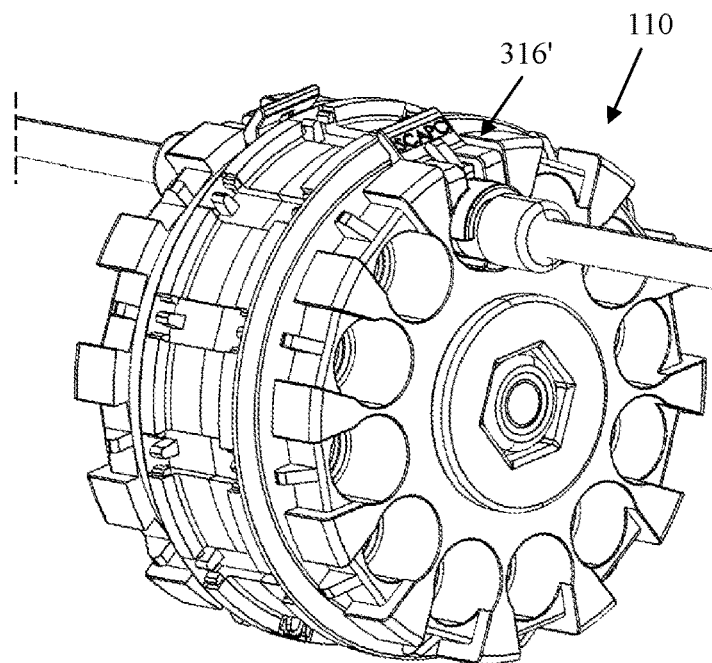
FIG. 25 is a perspective of the SN connector of FIG. 23 attached to the multiport device of FIG. 2.
Figure 26:
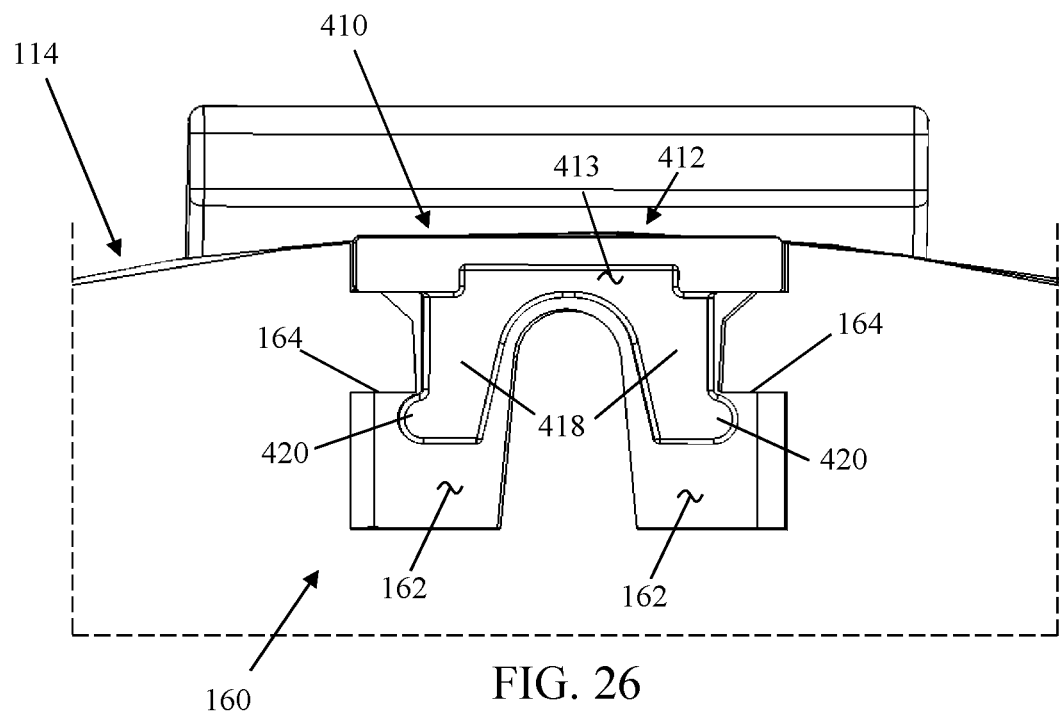
FIG. 26 is an enlarged, fragmentary section of a port housing showing an identification insert coupled to the port housing of the multiport device.

Referring to FIGS. 23-25, another embodiment of a connector according to the present disclosure is generally indicated at 310'. Connector 310' is generally the same as connector 310 and, thus, for ease of comprehension where identical parts are used identical reference numerals are employed and where similar or analogous parts are used, identical reference numerals with a trailing prime are employed. Connector 310' is the same as connector 310, except for the configuration of the port engagement portion 316'. Accordingly, unless clearly stated or indicated otherwise, the descriptions herein regarding connector 310 also apply to connector 310'. In this embodiment, the port insert body 318' is configured to form a snap-fit connection with the connector housing 314 to couple the port engagement portion 316' to the connector housing. The port insert body 318' is resiliently deflectable and defines a mouth or slot 319 (longitudinally extending mouth or slot). The mouth 319 enables the port insert body 318' to be attach to the connector housing 314 by moving the port insert body in a lateral or side-to-side direction relative to the connector housing and cable 308, instead of a longitudinal or end-to-end direction. This makes it easier to attach the port engagement portion 316' to the connector housing 314, especially after the connector 310' is coupled to the cable 308. In one method of attaching the port insert body 318' to the connector housing 314, a user aligns the mouth 319 with the connector housing 314 and pushes the connector housing through the mouth. This causes the port insert body 318' to deflect or bend, enlarging the size of the mouth 319 to permit the connector housing 314 to pass therethrough. Once the connector housing 314 passes through the mouth 319, the port insert body 318' resiliently rebounds to its normal or at rest position (FIG. 24), thereby coupling the port engagement portion 316' to the connector housing. In another method of attaching the port insert body 318' to the connector housing 314, the user aligns the mouth 319 with a portion of the cable 308 and pushes the cable through the mouth. If needed, the port insert body 318' may deflect or bend to permit the cable 308 to pass through the mouth 319 and resiliently rebounding once the cable passes through the mouth, as described above with respect to connector housing 314. After the cable 308 is positioned in the connector housing passageway 320, the user moves (e.g., slides) the port engagement portion 316' forward, onto the connector housing 314 (rotating the port engagement portion to align the flats 330, 332 of the connector housing and port engagement portion). The port engagement portion 316' is moved forward until the port engagement portion engages the flange 326, thereby positioning the port engagement portion at the locating area at the 322.

Figure 14:
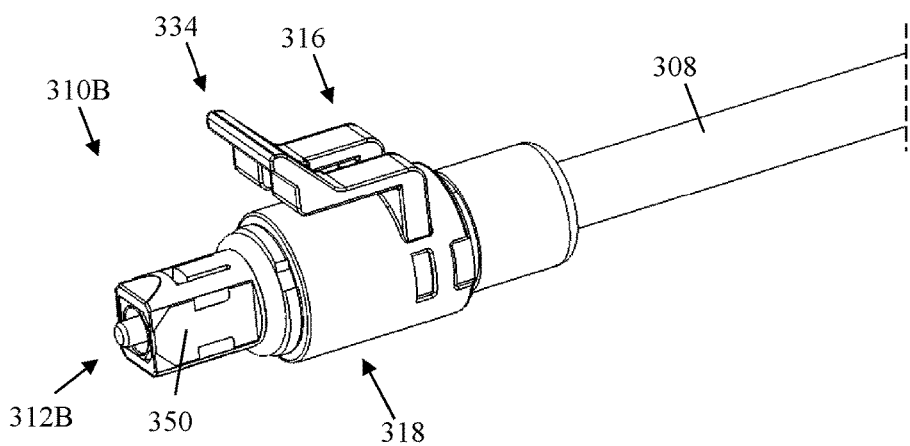
FIG. 14 is a perspective of an SC connector.

Referring to FIG. 14, another embodiment of a connector according to the present disclosure is generally indicated at 310B. Connector 310B is generally analogous to connector 310A and, thus, for ease of comprehension, where similar, analogous or identical parts are used, identical reference numerals are employed. Accordingly, unless clearly stated or indicated otherwise, the descriptions herein regarding connector 310A also apply to connector 310B. In this embodiment, the connector 310B includes a ferrule assembly 312B that comprises a SC ferrule assembly. Thus, in this embodiment, the connector 310B may be referred to as a SC connector (e.g., SC optical connector).

Figure 18:
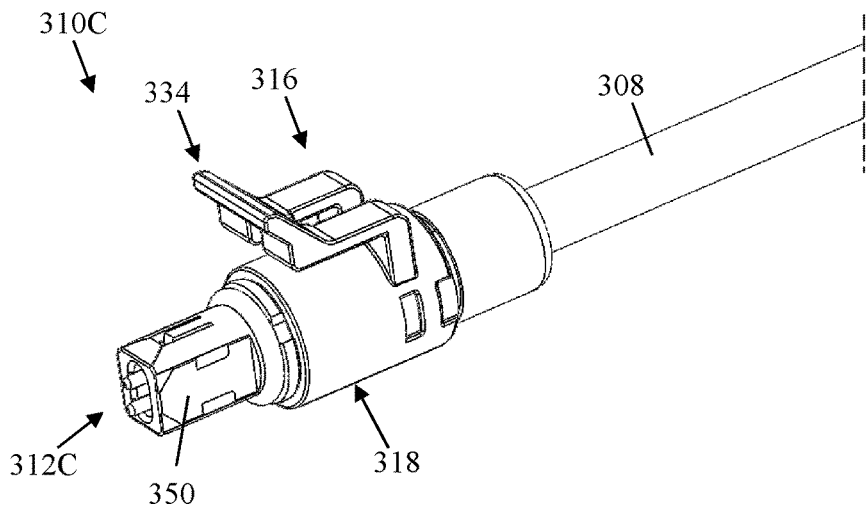
FIG. 18 a perspective of an SN (duplex LC) connector according to the present disclosure.

Referring to FIG. 18, another embodiment of a connector according to the present disclosure is generally indicated at 310C. Connector 310C is generally analogous to connector 310A and, thus, for ease of comprehension, where similar, analogous or identical parts are used, identical reference numerals are employed. Accordingly, unless clearly stated or indicated otherwise, the descriptions herein regarding connector 310A also apply to connector 310C. In this embodiment, the connector 310C includes a ferrule assembly 312C that comprises a SN ferrule assembly (e.g., duplex LC ferrule assembly). Thus, in this embodiment, the connector 310C may be referred to as a SN communication connection (e.g., SN optical connector).

The connectors 310 (e.g., connectors 310A, 310B, 310C) are useable with (e.g. can interchangeably mate with) the multiport device 110. The same port inert body 318, 318' can be used to secure the different types of connectors to the connector housing 314. However, because the connectors 310 can have different ferrule assemblies 312 (e.g., MPO ferrule assembly 312A, SC ferrule assembly 312B, or SN ferrule assembly 312C), the multiport device 110 is selectively configurable to configure each port 116 of the multiport device to receive a connector 310 of a specific type. As mentioned above, the multiport assembly 10 includes adapters 210. Specifically, the multiport assembly 10 (e.g., the multiport device 110) includes types of adapters 210 for each type of connector 310. Accordingly, in the illustrated embodiment, the multiport assembly 10 includes a MPO adapter 210A, a SC adapter 210B and a SN adapter 210C.

Figure 7:
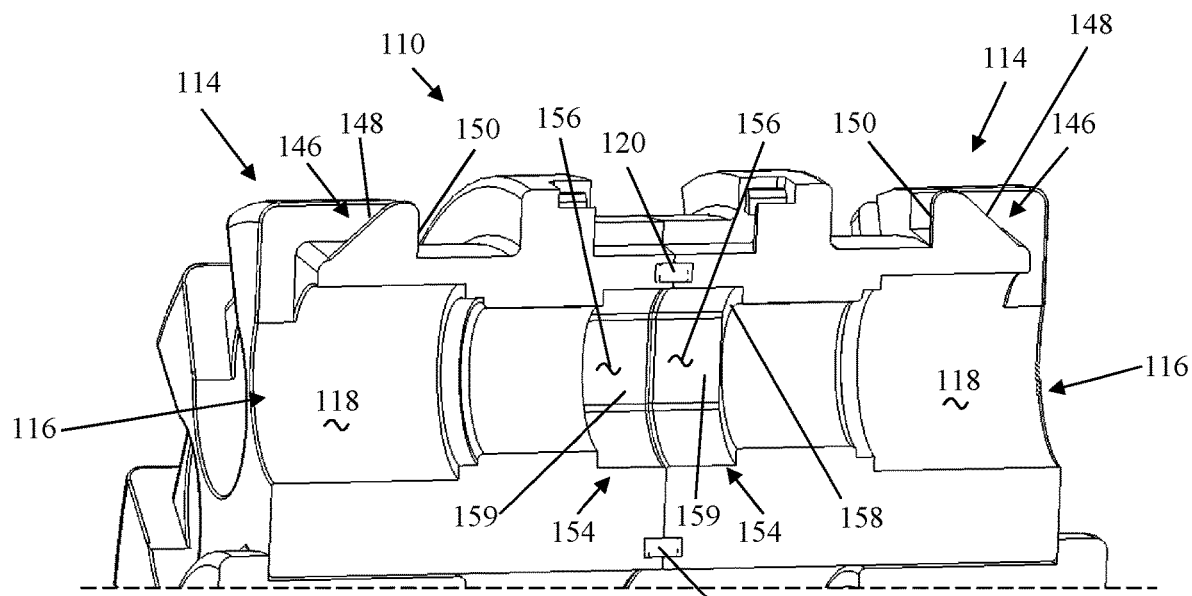
FIG. 7 is an enlarged, fragmentary section in perspective through a port of the multiport device of FIG. 2.

Referring to FIGS. 5 and 7, each port housing 114 of the multiport device 110 includes a plurality of receptacle receivers 154. Each receptacle receiver 154 is aligned (e.g., longitudinally aligned) with one of the ports 116 of the port housing 114. Broadly, each port 116 includes one of the receptacle receivers 154. The receptacle receivers 154 are all generally identical. According, one receptacle receiver 154 will now be described with the understanding the description applies to all receptacle receivers. The receptacle receiver 154 is sized and shaped for selectively receiving a portion (broadly, at least a portion) of an adapter 210 therein. As mentioned above there are different types of adapters 210. Accordingly, selectively receiving an adapter 210 configures the port 116 (broadly, the multiport device 110) associated with the adapter to receive a specific type of connector 310. The port 116 and corresponding receptacle receiver 154 are arranged such that when the connector 310 is coupled to the port and an adapter 210 is received in the receptacle receiver, the ferrule assembly 312 of the connector is received by the adapter. In general, the multiport device 110 (e.g., receptacle receivers 154) can interchangeably receive adapters, such as fiber optic adapters (e.g., adapters 210) and electrical adapters, for selectively enabling communication connections (such as optical connections or electrical connections) between connectors (such as optical connectors or electrical connectors).

The receptacle receiver 154 is disposed at the inner end portion (e.g. inner end) of the port housing 114. The receptacle receiver 154 includes a receptacle socket 156 sized and shaped to receive a portion (broadly, at least a portion) of the adapter 210. The receptacle socket 156 is in communication (e.g., disposed at the inner end of) the connector socket 118. The receptacle socket 156 opens through the inner end of the port housing 114. The inner opening of the port housing 114, mentioned above, is defined by the receptacle receiver 154.

The receptacle socket 156 extends longitudinally outward toward the outer end portion of the port housing 114 from the inner opening. The receptacle receiver 154 includes an axially inner facing shoulder or lip 158 at the outer end of the receptacle socket 156. The connector socket 118 includes a narrow section adjacent the shoulder 158. The receptacle socket 156 has a generally obround shape. The receptacle receiver 154 includes opposite flat or planar slides 159 spaced apart circumferentially about the central longitudinal axis CLA, and two opposing curved ends that connect the opposite planar sides.

When the first and second port housings 114 are coupled together (e.g., positioned end-to-end), the receptacles receivers 154 of the first and second port housings are aligned with each other (e.g., each receptacle receiver of the first port housing is aligned with a corresponding receptacle receiver of the second port housing), as shown in FIG. 7. Specifically, the receptacle sockets 156 of corresponding receptacle receivers 154 of the first and second port housings 114 align with each other when the first and second port housings are coupled together. When the first and second port housings 114 are coupled together, the receptacle sockets 156 of each two corresponding receptacle receivers 154 align to form a receptacle cavity for receiving one of the adapters 210 therein. In other words, the receptacle cavity is configured to receive an adapter 210 such that a first longitudinal section (e.g., a first longitudinal half) of the adapter is received by a first receptacle socket 156 of the first port housing 114 and a second longitudinal section (e.g., a second longitudinal half) of the adapter is received by a second receptacle socket 156 of the second port housing that corresponds to and is aligned with the first receptacle socket. The receptacle cavity captures the adapter 210 longitudinally between the opposing shoulders 158 of the receptacle receivers 154 (FIG. 13).

Figure 12:
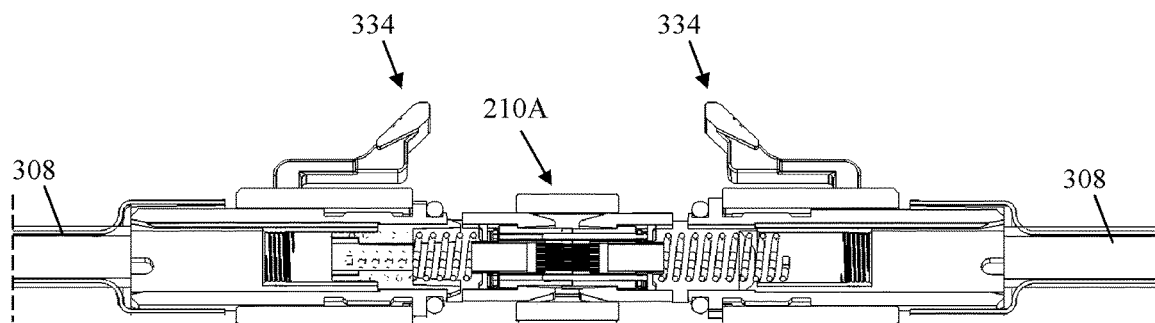
FIG. 12 is a vertical section of an optical connection formed within an adapter of FIG. 9 between two connectors of FIG. 8A.

Referring to FIGS. 9-13, one embodiment of an adapter is generally indicated at reference numeral 210A. In this embodiment, the adapter 210A is configured to receive a MPO ferrule assembly 312A of a connector 310A. Specifically, the adapter 210A is configured to receive two MPO ferrule assemblies 312A of two connectors 310 connected to aligned ports 116 of the respective first and second port housings 114 so that a communication connection forms between the two connectors. In other words, the MPO ferrule assemblies 312A of two connectors 310A engage each other within the adapter 210A (FIG. 12). Thus, in this embodiment, the adapter 210A may be referred to as a MPO adapter (e.g., MPO fiber optic receptacle). As will become apparent, the adapter 210 can be configured to receive other types of connectors (e.g., ferrule assemblies 312), such as the SC ferrule assembly 312B or the SN ferrule assembly 312C. Accordingly, in the illustrated embodiment, the adapter 210 is, broadly, configured to receive one of the MPO ferrule assembly 312A, the SC ferrule assembly 312B or the SN ferrule assembly 312C.

The adapter 210A includes an outer wall 212. The outer wall (e.g., an exterior surface thereof) is sized and shaped to correspond to (e.g., match) the size and shape of the receptacle socket 156 of the receptacle receivers 154. In the illustrated embodiment, the outer wall 212 defines a roughly obround exterior perimeter. The outer wall 212 extends longitudinally along an insert axis, which is generally parallel to the central longitudinal axis CLA when the adapter 210A is coupled to the multiport device 110. The adapter 210A includes a receptacle receiver anti-turning key 214. The receptacle receiver anti-turning key 214 is configured to engage the receptacle receiver 154 to inhibit the adapter from turning relative to (e.g., within) the receptacle receiver. In the illustrated embodiment, the receptacle receiver anti-turning key 214 includes opposite flat exterior sides 216 of the outer wall 212 that engage the opposite flat sides 159 of the receptacle receiver 154. The outer wall 212 also includes two opposite exterior arcuate ends (extending between the flat sides 216) that engage the arcuate ends of the receptacle receiver 154. The adapter 210A defines a ferrule passageway 218 sized and shaped to receive the ferrule assembly 312A of the connector 310A. In this embodiment, the adapter 210A has no internal components within the ferrule passageway 218 to facilitate the connection between two MPO ferrule assemblies 312A disposed therein, since MPO ferrule assemblies 312A are able to engage each other and form a communication connection by themselves (without the aid of additional components). The ferrule passageway 218 has open longitudinal ends such that when the ferrule assemblies 312A of two communications connectors 310A are respectively inserted into each end, the ferrules assemblies engage and form the communication connection within the ferrule passageway (FIG. 12).

The adapter 210A also includes a connector anti-turning key 220. The connector anti-turning key 220 is configured to engage the connector 310A (broadly, a receptacle anti-turning key thereof) to inhibit the connector and the adapter 210A from turning relative to each other. In the illustrated embodiment, the connector anti-turning key 220 includes opposite flat interior sides 222 of the outer wall 212 that engage opposite flat sides 350 (broadly, the receptacle anti-turning key) of the connector housing 314 of the connector 310A. In the illustrated embodiment, the ferrule passageway 218 also has an obround shape, defined by the interior surfaces of the outer wall 212 (e.g., flat sides 222). As will become apparent, each type of adapter 210 has the same exterior size and shape (e.g., outer wall 212). Accordingly, each type of adapter 210 is interchangeable with each other in the multiport device 110.

Referring to FIG. 13, when two connectors 310, such as connectors 310A, are connected to the ports 116 and extend into the adapter 210, such as adapter 210A, the ferrule assemblies 312, such as ferrule assemblies 312A, meet at an optical reference plane ORP to form the communication connection. The optical reference plane ORP is generally co-planar with the interface between first and second port housings 114. The two connectors 310 each extend longitudinally through their respective first or second port housing 114 from the outer end portion through the inner end portion. The distance between the front end (e.g., tip) of the ferrule assembly 312 and the latch 334 (e.g., the front end of the slot 340) is slightly (e.g., 0.5-2 mm) greater than the distance between the inner face (e.g., inner opening) at the inner end portion of the port housing 114 and the latch retainer 146 (e.g., the end surface 150). As a result, the front end of the ferrule assembly 312 sticks out from the inner end portion of the port housing 114 when the connector 310 is coupled to the port 116. This ensures that the ferrule assemblies 312 of the two connectors 310 will engage each other and form the communication connection at the optical reference plane ORP when the connectors are coupled to the ports. Each ferrule assembly 312 resiliently biases its one or more ferrules in a forward direction, such as with a spring, such that the ferrules resiliently deflect rearward when the ferrules of two ferrules assemblies 312 engage each other to account for the slight distance each ferrule assembly sticks out from the inner end portion of each port housing 114. This resilient deflection ensures a secure communication connection (e.g., optical communication connection) forms between the two connectors 310 at the optical reference plane ORP.

Figure 15:
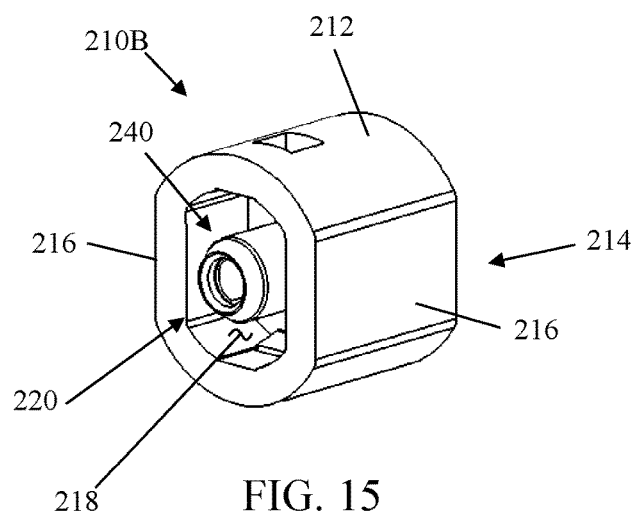
FIG. 15 is a perspective of another embodiment of an adapter useable with the SC connector of FIG. 14.
Figure 16:
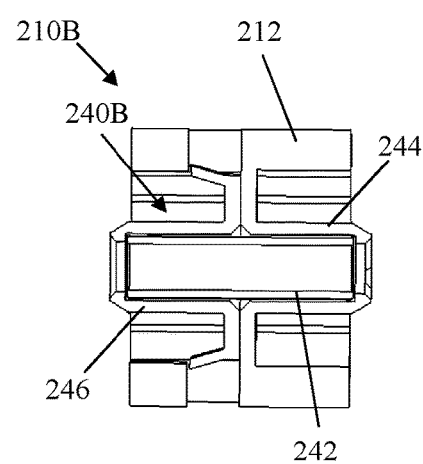
FIG. 16 is a vertical section thereof.
Figure 17:
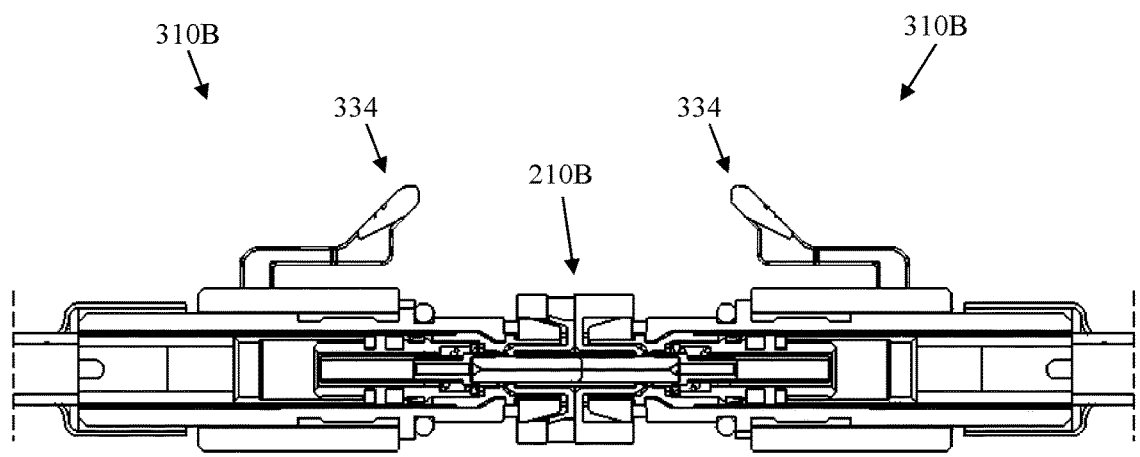
FIG. 17 is a vertical section of a communication connection formed within an adapter of FIG. 15 between two SC connectors of FIG. 14.

Referring to FIGS. 15-17, another embodiment of an adapter according to the present disclosure is generally indicated at 210B. Adapter 210B is generally analogous to connector 210A and, thus, for ease of comprehension, where similar, analogous or identical parts are used, identical reference numerals are employed. Accordingly, unless clearly stated or indicated otherwise, the descriptions herein regarding adapter 210A also apply to adapter 210B. In this embodiment, the adapter 210B is configured to receive a SC ferrule assembly 312B. Thus, in this embodiment, the adapter 210B may be referred to as a SC adapter (e.g., SC fiber optic receptacle).

In this embodiment, the adapter 210B includes an SC insert 240B (broadly, a ferrule assembly insert) in the ferrule passageway 218 for engaging and aligning the SC ferrules of the SC ferrule assemblies 312B of the two connectors 310B inserted into the adapter. The SC insert 240B includes an alignment sleeve 242 for receiving and aligning the SC ferrules of the SC ferrule assemblies 312B. In the illustrated embodiment, the SC insert 240B includes an integral alignment sleeve holder 244 (integral with the outer wall 212) extending along the insert axis from one end toward the other end. The integral alignment sleeve holder 244 has a tube-shaped portion for receiving part of the alignments sleeve 242 and a lip at an end of the tube-shaped portion for holding the alignment sleeve within the tube-shaped portion. The integral alignment sleeve holder 244 includes a transverse wall extending radially and interconnecting and suspending the tube-shaped portion within the ferrule passageway 218. The transverse wall is located at an inner end of the tube-shaped portion and defines an annular cavity between the tube-shaped portion and the outer wall 212. The annular cavity is sized and shaped to receive a portion of the connector 310B. The SC insert 240B also includes a snap-in alignment sleeve holder 246. The outer wall 212 of the adapter 210B includes opposite snap-in recesses configured to make a snap-fit connection with the snap-in alignment sleeve holder 246 to retain the snap-in alignment sleeve holder. The snap-in alignment sleeve holder 246 has a tube-shaped portion for receiving part of the alignment sleeve 242 and a lip at an end of the tube-shaped portion for holding the alignment sleeve within the tube-shaped portion. Thus, the tube-shaped portions of the integral and snap-in alignment sleeve holders 244, 246 are configured to capture the alignment sleeve 242 between the lips. The snap-in alignment sleeve holder 246 includes a transverse wall and a pair of snap-in latches on opposite ends of the transverse wall. The snap-in latches snap into the snap-in recesses of the outer wall 212 to secure the snap-in alignment sleeve holder 246 to the outer wall and thereby retain the snap-in alignment sleeve holder in the adapter 210B. The transverse wall of the snap-in alignment sleeve holder 256 extends radially and is located at an inner end of the tube-shaped portion. The transverse wall supports the tube-shaped portion and defines an annular cavity between the tube-shaped portion and the outer wall 212. The annular cavity is sized and shaped to receive a portion of the connector 310B.

Referring to FIGS. 19-22, another embodiment of an adapter according to the present disclosure is generally indicated at 210C. Adapter 210C is generally analogous to connector 210B and, thus, for ease of comprehension, where similar, analogous or identical parts are used, identical reference numerals are employed. Accordingly, unless clearly stated or indicated otherwise, the descriptions herein regarding adapter 210B also apply to adapter 210C. In this embodiment, the adapter 210C is configured to receive a SN (e.g., duplex-LC) ferrule assembly 312C. Thus, in this embodiment, the adapter 210C may be referred to as a SN adapter (e.g., SN fiber optic receptacle).

In this embodiment, the adapter 210C is generally the same as adapter 210B, except that the adapter 210C includes a SN insert 240C. The SN insert 240C is generally the same as the SC insert 240B, and has essentially the same construction, except that the SN insert includes two alignment sleeves 244, one for reach SN (e.g., LC) ferrule of the SN ferrule assembly 312C. According, the integral and snap-in alignment sleeve holders 244, 246 of the SN insert 240C each include two tube-shaped portions.

Figure 21:
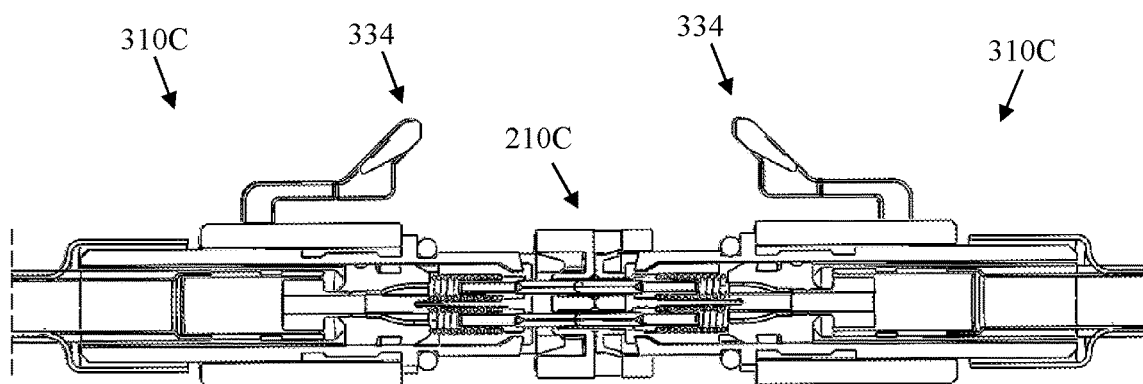
FIG. 21 is a cross-section of a communication connection formed within an adapter of FIG. 19 between two SN connectors of FIG. 18.
Figure 22:
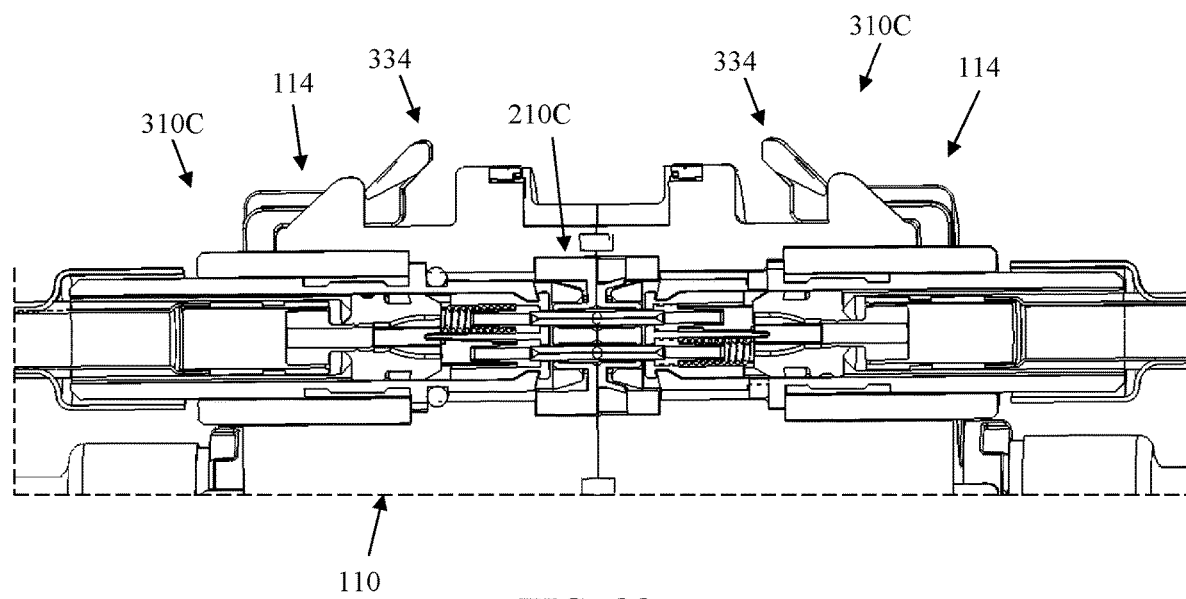
FIG. 22 is a fragmentary section through the multiport assembly with the adapter of FIG. 19 attached to the multiport device of FIG. 2, the section showing the communication connection formed within the adapter between two SN connectors of FIG. 18.

As is now apparent, the adapter 210 facilitates the formation of the communication connection between connectors 310. The communication connection forms between the two connectors 310 within the adapter 210 when the adapter is disposed in the two corresponding receptacle receivers 154, the first and second port housings 114 are coupled together and the two connectors are coupled to their respective ports 116 of the first and second port housings. When the connector 310 is coupled to one of the ports 116, the front end portion of the port insert body 318 is received in the connector socket 118 of the port. The port 116 includes an internal shoulder or lip that engages the seal 318 to form a fluid tight seal that inhibits dust and/or water from entering the multiport device 110 through the interface between the connector 310 and the port. The tip of each ferrule of the ferrule assembly 312 is located at the optical reference plane ORP, to form the optical connection with a corresponding ferrule assembly. For the SC and SN ferrule assemblies 312B, 312C, their ferrules pass into the alignment sleeves 244 of the adapters 210B, 210C and the front end portion of the connector housing 314 is received in the annular cavity around the alignment sleeve(s) (FIGS. 17 and 21).

In view of the above, it can be readily seen that the multiport device 110 is selectively adjustable for different port configurations by inserting select ones of the adapters 210 into the receptacle receivers 154 before coupling the first and second port housings 114 together. The adapters 210 all have the same exterior envelope to be received in the same port housings 114. To identify what type of connectors 310 each port 116 is associated with, the multiport assembly 10 includes the identification inserts 410. Referring to FIGS. 5 and 26-29, each port housing 114 includes a plurality of identification insert mounts 160. Each identification insert mount 160 is associated with one of the ports 116 (broadly, the port includes the identification insert mount). Each identification insert mount 160 is disposed on the exterior of the port housing 114 to align with and visually correspond to one of the ports 116. The identification insert mounts 160 are circumferentially spaced apart along the outer perimeter of the port housing 114. The identification inserts mounts 160 are generally identical. In the illustrated embodiment, each identification insert mount 160 includes snap-in formations for forming a snap-fit connection with one of the identification inserts 410. The identification insert mount 160 includes one or more recesses 162 and one or more lips 164.

Figure 27:
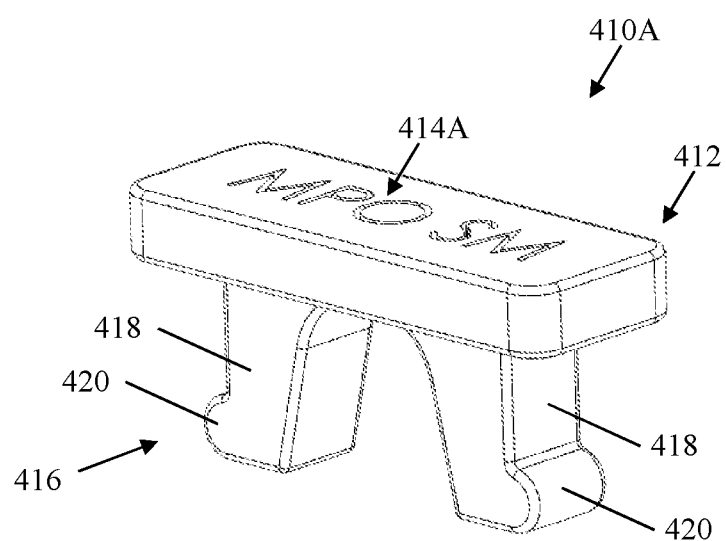
FIG. 27 is a perspective of an identification insert.

Referring to FIG. 27, one embodiment of the identification insert is generally indicated at reference numeral 410A. The identification insert 410A includes a cap 412. The identification insert 410A includes indicia 414A associated with one of the types of the connectors 310 for identifying the type of connector. The indicia 414A is disposed on the cap 412. In the illustrated embodiment, the indicia 414A comprises "MPO SM" thereby identifying the connector 310A to be received by the port 116 as a MPO connector. Accordingly, in this embodiment, the identification insert 410A is a MPO identification insert. In other embodiments, the indicia may indicate other types of connectors. For example, the indicia may comprise "SC APC" to identify a SC optical connector, or may comprise "SN" to identify a SN optical connector.

The identification insert 410A includes an identification insert coupler 416. The identification insert coupler 416 extends from the cap 412. The identification insert coupler 416 is configured to couple to one of the identification insert mounts 160 to attach the identification insert to the port housing 114. When coupled to the port housing 114, the identification insert 410A provides a visual indication of the type of connector 310 to be received by the port 116 corresponding to the identification insert. In the illustrated embodiment, the identification insert coupler 416 is configured to form a snap-fit connection with the identification insert mount 160. The identification insert coupler 416 includes one or more (e.g., first and second) resiliently deflectable latch legs 418. Each latch leg 418 includes a foot or detent 420. Each detent is configured to engage a lip 164 of the identification insert mount 160 to attach the identification insert 410A to the identification insert mount. Each recess 162 of the identification insert mount 160 is sized and shaped to receive one of the detents 420 of the latch leg 418.

To mate the identification insert 410A with the port housing 114, the identification insert coupler 416 is inserted into the desired identification insert mount 160. As the identification insert coupler 416 is inserted, the latch legs 418 engage and are deflected by the port housing 114. When the detent 420 of each latch leg 418 passes the lip 164, the latch leg resiliently rebounds causing the detent 420 to overlap and engage the lip 164, thereby securing the identification insert 410A to the port housing 114. The cap 412 may define a recess 413 sized and shaped to receive an end of a tool, such as a flathead screwdriver, to facilitate disconnecting the identification insert 410A from the identification insert mount 160. For example, the tool (not shown) may be used to pry the identification insert 410A off of the port housing 114. To disconnect the identification insert 410A, the user applies enough force using the tool to defect the latch legs 418 and move the detents 420 past the lips 164.

Figure 28:
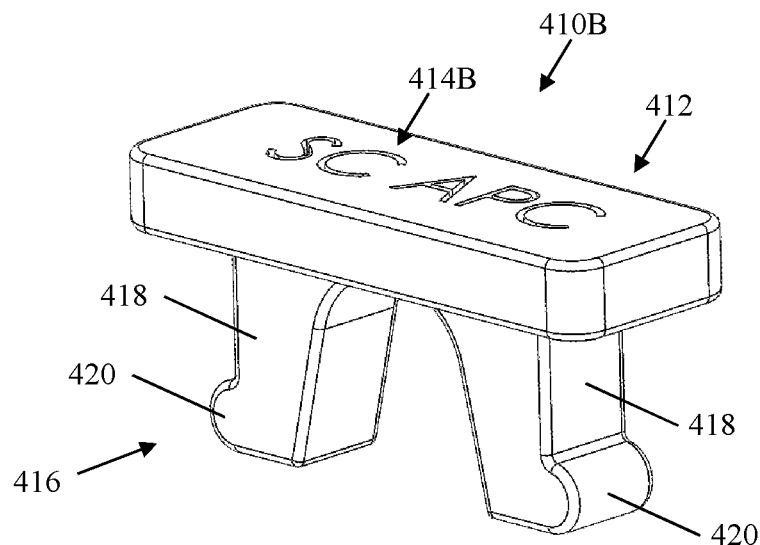
FIG. 28 is a perspective of an identification insert according to another embodiment of the present disclosure.

Referring to FIG. 28, another embodiment of an identification insert according to the present disclosure is generally indicated at 410B. Identification insert 410B is generally analogous to identification insert 410A and, thus, for ease of comprehension, where similar, analogous or identical parts are used, identical reference numerals are employed. Accordingly, unless clearly stated or indicated otherwise, the descriptions herein regarding identification insert 410A also apply to identification insert 410B. In this embodiment, the identification insert 410B includes indicia 412B comprising "SC APC" thereby identifying the connector 310B to be received by the port 116 as a SC connector. Accordingly, in this embodiment, the identification insert 410B is a SC identification insert.

Figure 29:
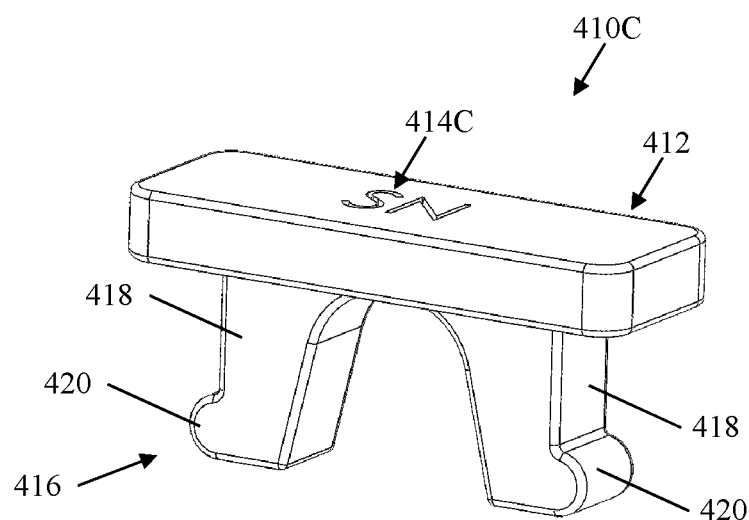
FIG. 29 is a perspective of an identification insert according to yet another embodiment of the present disclosure.
Figure 30:
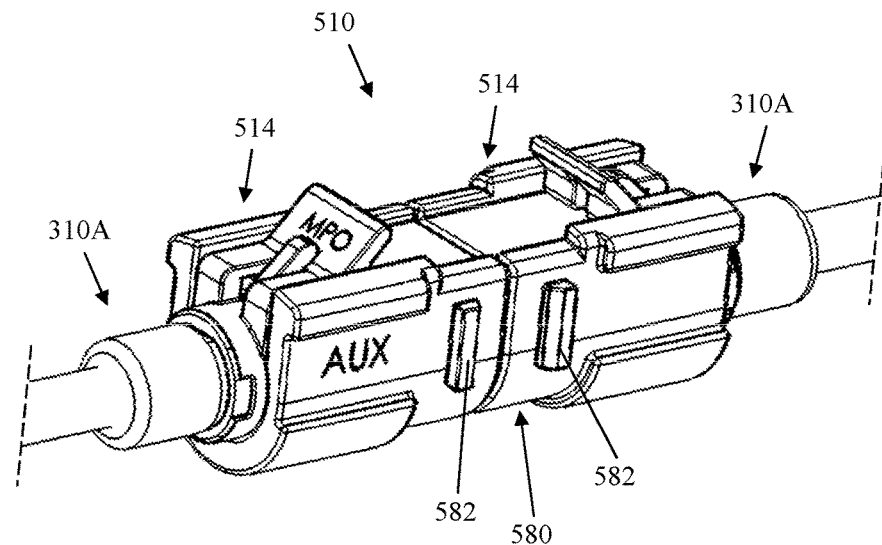
FIG. 30 is a perspective of an auxiliary port device according to one embodiment of the present disclosure, with two connectors coupled to the auxiliary port device.
Figure 31:
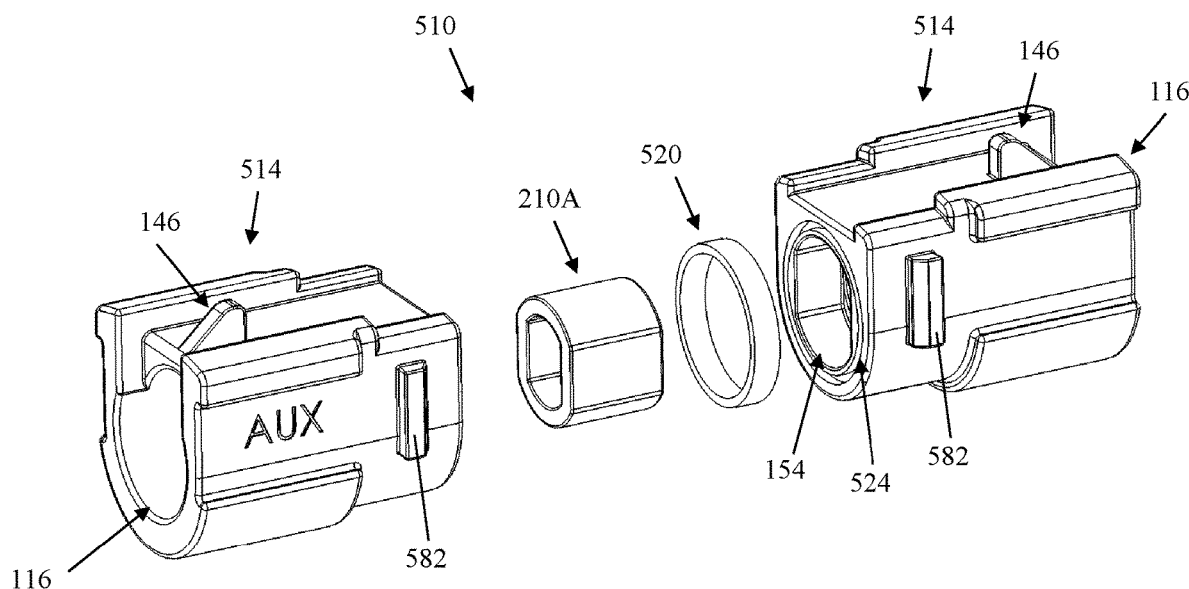
FIG. 31 is an exploded view of the auxiliary port device.
Figure 32:
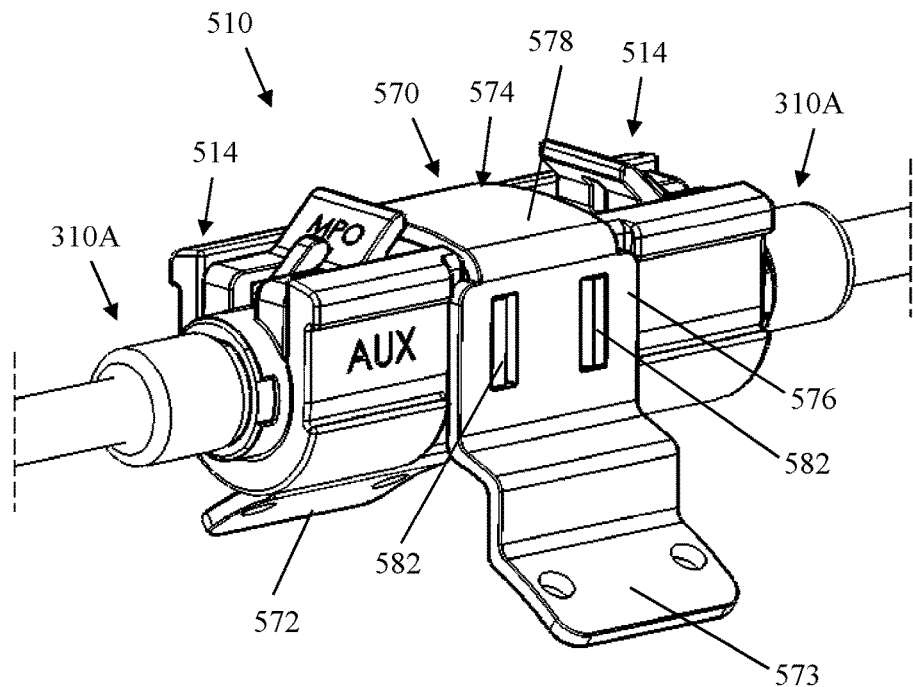
FIG. 32 is perspective similar to FIG. 30, with a mounting bracket attached to the auxiliary port device.
Figure 33:
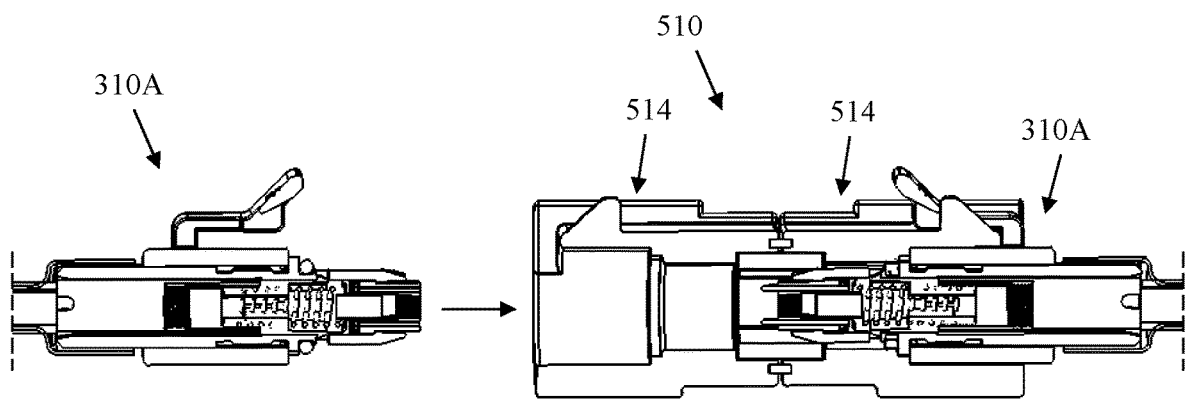
FIG. 33 is a vertical section of the auxiliary port device with one connector attached to the auxiliary port device and another connector being coupled to the auxiliary port device.
Figure 34:
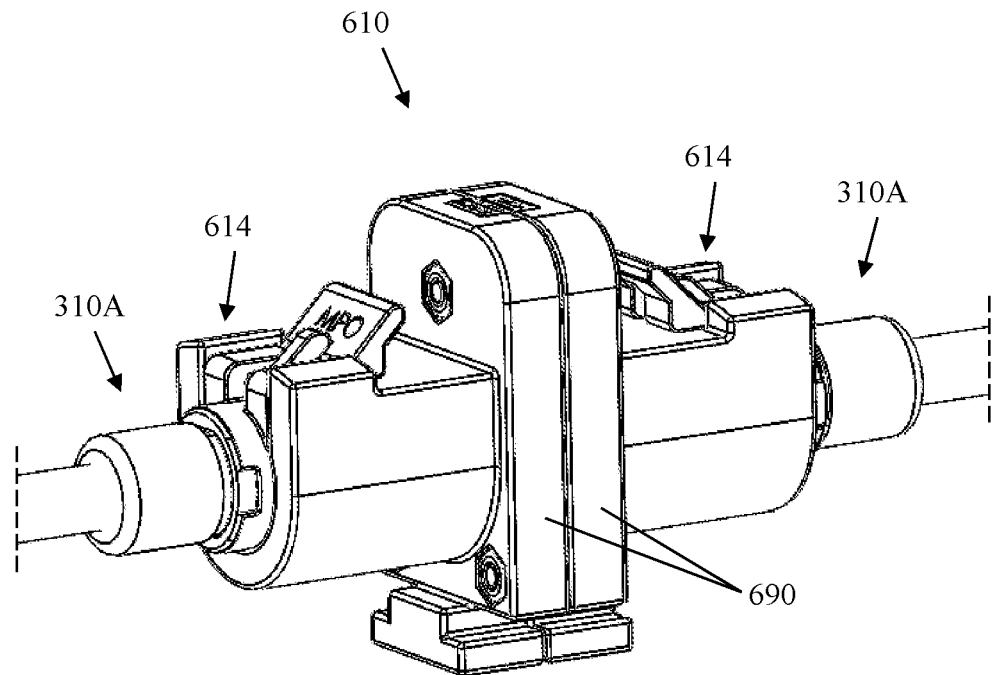
FIG. 34 is perspective of another embodiment of an auxiliary port device according to the present disclosure.
Figure 35:
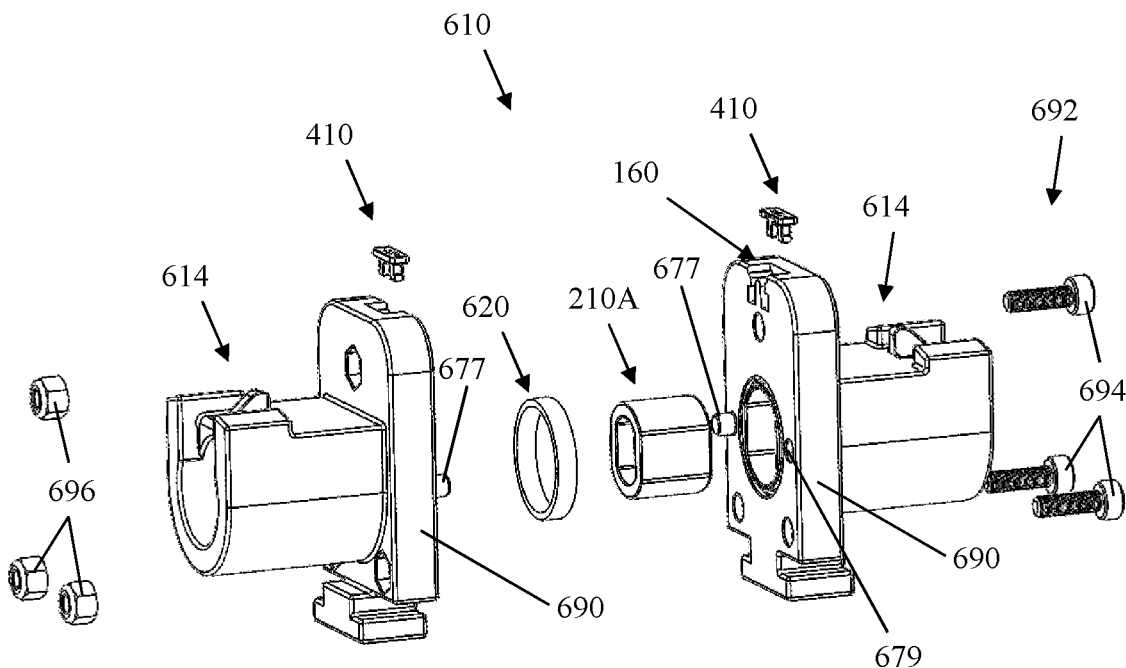
FIG. 35 is an exploded view thereof.
Figure 36:
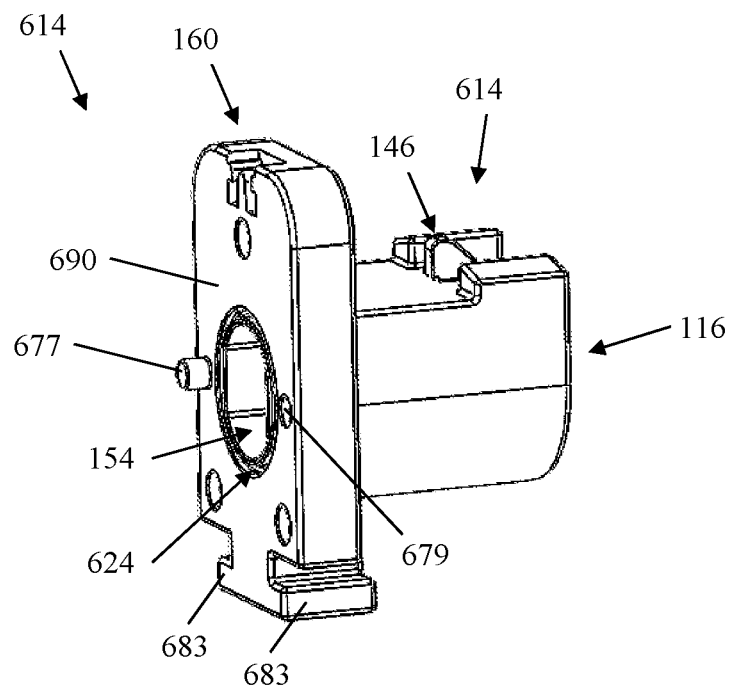
FIG. 36 is perspective of a port housing of the auxiliary port device of FIG. 34.
Figure 37:
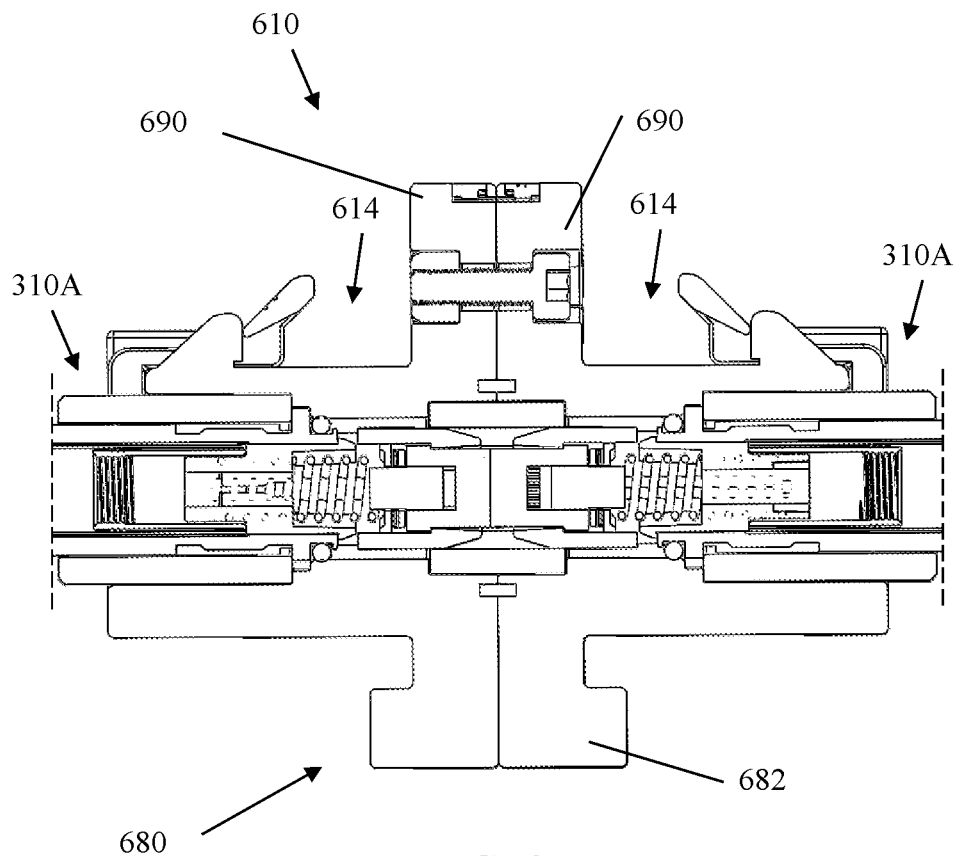
FIG. 37 is a vertical section of the auxiliary port device of FIG. 34.
Figure 38:
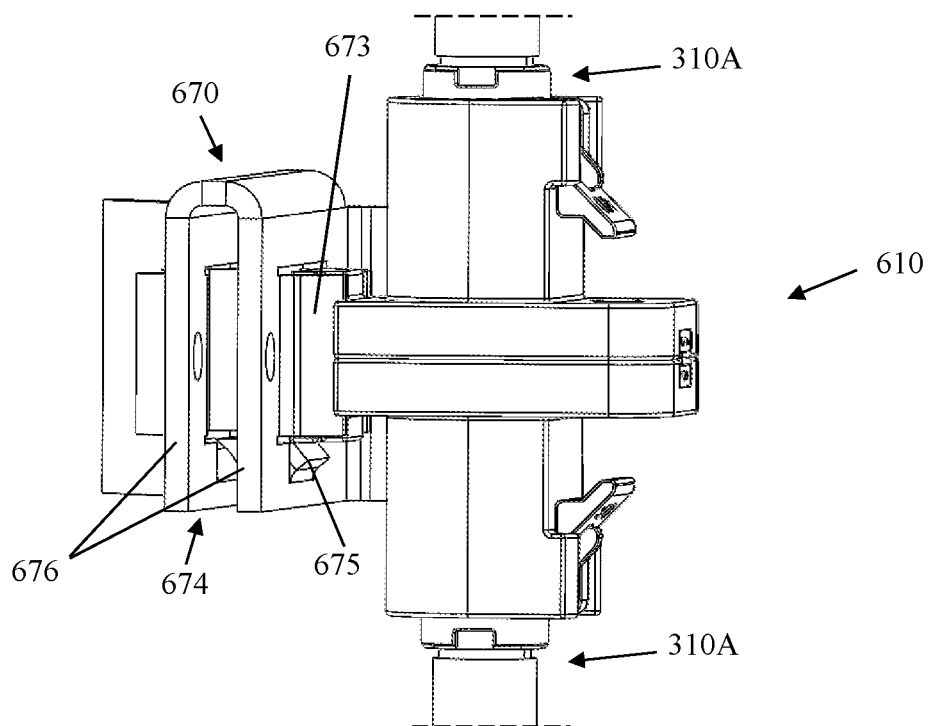
FIG. 38 is a perspective of the auxiliary port device of FIG. 34 attached to a mounting bracket.
Figure 39:
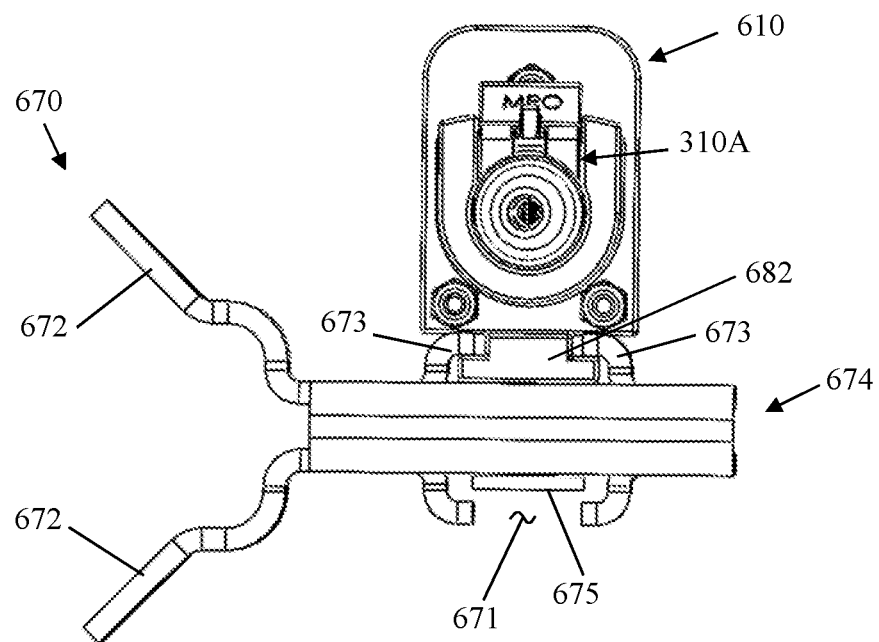
FIG. 39 is a front view thereof.

Referring to FIG. 29, another embodiment of an identification insert according to the present disclosure is generally indicated at 410C. Identification insert 410C is generally analogous to identification insert 410A and, thus, for ease of comprehension, where similar, analogous or identical parts are used, identical reference numerals are employed. Accordingly, unless clearly stated or indicated otherwise, the descriptions herein regarding identification insert 410A also apply to identification insert 410C. In this embodiment, the identification insert 410C includes indicia 412C comprising "SN" thereby identifying the connector 310C to be received by the port 116 as a SN connector. Accordingly, in this embodiment, the identification insert 410C is a SC identification insert.

In view of the above, it can be readily seen that the identification inserts 410 are selectively mountable to the multiport device 110 to identify with what type of connectors 310 each port 116 is associated. In other words, the identification inserts 410 are used to identify what type of adapter 210 has been coupled to the first and second port housings 114.

In one embodiment, the multiport assembly 10 may include a plurality of different adapters 210, such as at least one MPO adapter 210A, at least one SC adapter 210B, and at least one SN adapter 210C. In other words, the plurality of adapters 210 can include sub-sets (e.g., first, second, third, etc.) of adapters, with the adapters of each sub-set (e.g., adapters 210A-C) configured to receive one type of connector 310 (e.g., connector 310A-C). This way, a user can select the types of adapters 210 to install in the multiport device 110 to configured the multiport device to receive the desired types of connectors 310. Likewise, the multiport assembly 10 may include a plurality of different identification inserts 410, such as at least one MPO identification insert 410A, at least one SC identification insert 410B, and at least one SN identification insert 410C. In other words, the plurality of identification inserts 410 can includes sub-sets (e.g., first, second, third, etc.) of identification inserts, with the identification inserts of each sub-set (e.g., identification inserts 410A-C) configured to identify one type of connector 310 (e.g., connector 310A-C). This way, a user can select the types of identification inserts 410 to install on the multiport device 110 to match the identification inserts to the type of connector the port 116 associated with each identification insert is configured to receive.

Referring to FIGS. 30-33, one embodiment of an auxiliary port device (broadly, a port device) of the present disclosure is generally indicated at reference numeral 510. The auxiliary port device 510 is part of the multiport assembly 10 and can be mounted on the multiport device 110 to expand the capacity (e.g., total number of ports) of the multiport assembly. The auxiliary port device 510 is similar in many ways to the multiport device 110, thus, for ease of comprehension, where similar, analogous or identical parts are use, identical reference numerals are employed. Accordingly, unless clearly stated or indicated otherwise, the descriptions herein regarding the multiport device 110 also apply to the auxiliary port device 510.

The auxiliary port device 510 includes first and second port housings 514 (e.g., first and second auxiliary port housings). The first and second port housings 514 are similar to the first and second port housings 114 of the multiport device 110, except each port housing of the auxiliary port device 510 only includes one port 116 and one receptacle receiver 154. Details of the ports 116 and receptacle receivers 154 are described above, and thus the details of these components of the auxiliary port device 510 are not repeated here. Accordingly, like the multiport device 110, the auxiliary port device 510 can also be configured to receive a particular type of connector 310 depending upon the adapter 210 coupled to the auxiliary port device. In the illustrated embodiment, a MPO adapter 210A is coupled to the auxiliary port device 510 to configure the auxiliary port device to receive MPO connectors 310A, as shown. A SC adapter 210B or SN adapter 210C may be coupled to the auxiliary port device 510 in other arrangements (not shown) to receive SC connectors 310B or SN connectors 310C, respectively.

The first and second port housings 514 are releasably coupled together. Like the multiport device 110, the first and second port housings 514 of the auxiliary port device 510 are arranged inner-end-to-inner-end when coupled together. The auxiliary port device 510 includes a seal 520 (e.g., compressible seal) at the interface of the first and second port housings 514. The seal 520 forms a fluid tight seal at the interface of the first and second port housings 514. The seal 520 is arranged to enclose each inner opening (at the inner end portion of each of the first and second port housings 514). In one embodiment, the seal 520 comprises an O-ring. In the illustrated embodiment, the inner end portion of each port housing 514 includes an annular seal groove 524 (FIG. 31) configured to receive a portion of the seal 520 therein. When the first and second port housings 514 are coupled together, the seal 520 is compressed and seals the interface between the first and second port housings to inhibit ingress of dust or water into the ports 116 through the interface between the first and second port housings. In the illustrated embodiment, the first and second port housings 514 are identical.

In the illustrated embedment, the auxiliary port device 510 includes a mounting bracket 570. The mounting bracket 570 is configured to attach the auxiliary port device 510 to the multiport device 110 (e.g., the port body 112). Specifically, the mounting bracket 570 includes one or more fastener openings that align with one or more fastener openings of the multiport device, so that a fastener 572 (e.g., a screw) (FIG. 1) inserted into the aligned fastener openings secures the mounting bracket 570, and thereby the first and second port housings 514, to the multiport device. The auxiliary port device 510 includes mounting structure 580 configured to facilitate the mounting of the auxiliary port device on the multiport device 110. The mounting structure 580 is defined by both the first and second port housings 514. In the illustrated embodiment, the mounting structure 580 comprises projections 582 (e.g., one or more projections on each port housing 514) that are each configured to be inserted into corresponding slots (FIG. 32) in the mounting bracket 570. In this embodiment, the engagement of the projections 582 with the mounting bracket 570 also couples the first and second port housings 514 together.

The mounting bracket 570 includes first and second foot sections 573 configured to be fastened (e.g., screwed) to the multiport device 110 via the fastener openings in the foot sections. The mounting bracket 570 includes an arch-shaped section 574 extending between the first and second foot sections 573. The arch-shaped portion 574 generally extends around the first and second port housings 514. The arch-shaped section 574 includes first and second legs 576 adjacent the first and second foot sections 573 and a top 578 connecting the first and second legs. The first and second legs 576 define the slots that receive the projections 582 of the first and second port housings 514. When the protrusions 582 are all received in a corresponding slots of the legs 576 of the mounting bracket 570, the mounting bracket holds the port housings 514 together. And when the feet sections 573 of the mounting bracket 570 are fastened (e.g., screwed) to the multiport device 110, the mounting bracket mounts the auxiliary port device 510 onto the multiport device.

Together the auxiliary port device 510 and one or more adapters 210 form an auxiliary port assembly (broadly, a port assembly).

Referring to FIGS. 34-39, another embodiment of an auxiliary port device (broadly, a port device) of the present disclosure is generally indicated at reference numeral 610. Auxiliary port device 610 is generally analogous to auxiliary port device 510 and, thus, for ease of comprehension, where similar, analogous or identical parts are used, reference numerals "100" units higher are employed, except when the auxiliary port device 610 includes similar, analogous or identical parts to that of the multiport device 110 in which case identical reference numerals to that of the multiport device are employed. Accordingly, unless clearly stated or indicated otherwise, the descriptions herein regarding the multiport device 110 and auxiliary port device 510 also apply to auxiliary port device 610.

In this embodiment, the first and second port housings 614 of the auxiliary port device 610 each include a coupling flange 690 at the inner end portion (e.g., inner end) of each port housing. The coupling flanges 690 engage each other when the first and second port housings 614 are coupled together. Each coupling flange 690 extends generally radially from the port 116 of the port housing 614. In this embodiment, the auxiliary port device 610 includes a coupler 692. The coupler 692 is configured to releasably coupled the first and second port housings 614 (e.g., coupling flanges 690) together. In the illustrated embodiment, the coupler 692 comprises one or more bolts 694 (e.g., screws, bolts) that extend through aligned openings in the coupling flanges 690 and that are secured with nuts 696. Other configurations of the coupler 692 are within the scope of the present disclosure.

To facilitate the coupling of the first and second port housings 614 together, each port housing includes an alignment projection 677 and an alignment recess 679 (broadly, one of the port housings includes the alignment projection and the other port housing includes the alignment recess). Each alignment recess 679 is sized and shaped to receive an alignment projection 677 of the other port housing 614, when the first and second port housings are coupled together.

In this embodiment, the auxiliary port device 610 includes identification insert mounts 160 for attaching identification inserts 410. Each port housing 614 includes an identification insert mount 160 on the coupling flange 690. Details of the identification inserts 410 and identification insert mounts 160 are described above, and thus the details of these components of the auxiliary port device 610 are not repeated here. Accordingly, like the multiport device 110, the identification inserts 410 can also be attached to the auxiliary port device 610 (e.g., port housings 614) to identify the type of connector 310 the port 116 associated with each identification insert is configured to receive.

In this embodiment, the auxiliary port device 610 includes a mounting bracket 670. The foot sections 672 of the mounting bracket 670 can be configured to attach to the multiport device 110 or another structure, such as a pole. The mounting structure 680 of the auxiliary port device 610 comprises a seat 682. The seat 682 is configured to be received by the mounting bracket 670. In the illustrated embodiment, the seat 682 has a generally T-shape with outwardly extending flanges. The mounting bracket 670 includes a receiving channel 671 defined by securement flanges 673 that receives the seat 682, such that the securement flanges 673 overlap with the flanges of the seat to attach the first and second port housings 614 to the mounting bracket. In the illustrated embodiment the receiving channel 671 and securement flanges 673 are disposed on the legs 676. The mounting bracket 670 may also include a stop 675 at one end of the receiving channel 671 to inhibit the seat 682 from moving out of that end of the receiving channel.

The seat 682 can be slid into the receiving channel 671 from the open end opposite the stop 675.

Referring to FIGS. 40-46, another embodiment of a multiport device according to the present disclosure is generally indicated at 710. Multiport device 710 is generally analogous to multiport device 110 and, thus, for ease of comprehension, where similar, analogous or identical parts are used, reference numerals "600" units higher are used. Accordingly, unless clearly stated or indicated otherwise, the descriptions herein regarding multiport device 110 also apply to multiport device 710. In general, the multiport device 710 is configured to mate with connectors 810 (FIGS. 47-93) and adapters 910 (FIGS. 57, 69, 75, 82, and 94-95) of different configurations than the connectors 310 and adapters 210 described above. Generally, the connectors 810 include conventional connector end assemblies 811 and the adapters 910 comprise conventional adapters. Accordingly, the multiport device 110 is able to be used with connectors and adapters containing conventional or known elements. Other differences between the multiport devices 110, 710 will be in part apparent and in part pointed out hereinafter.

Figure 94:
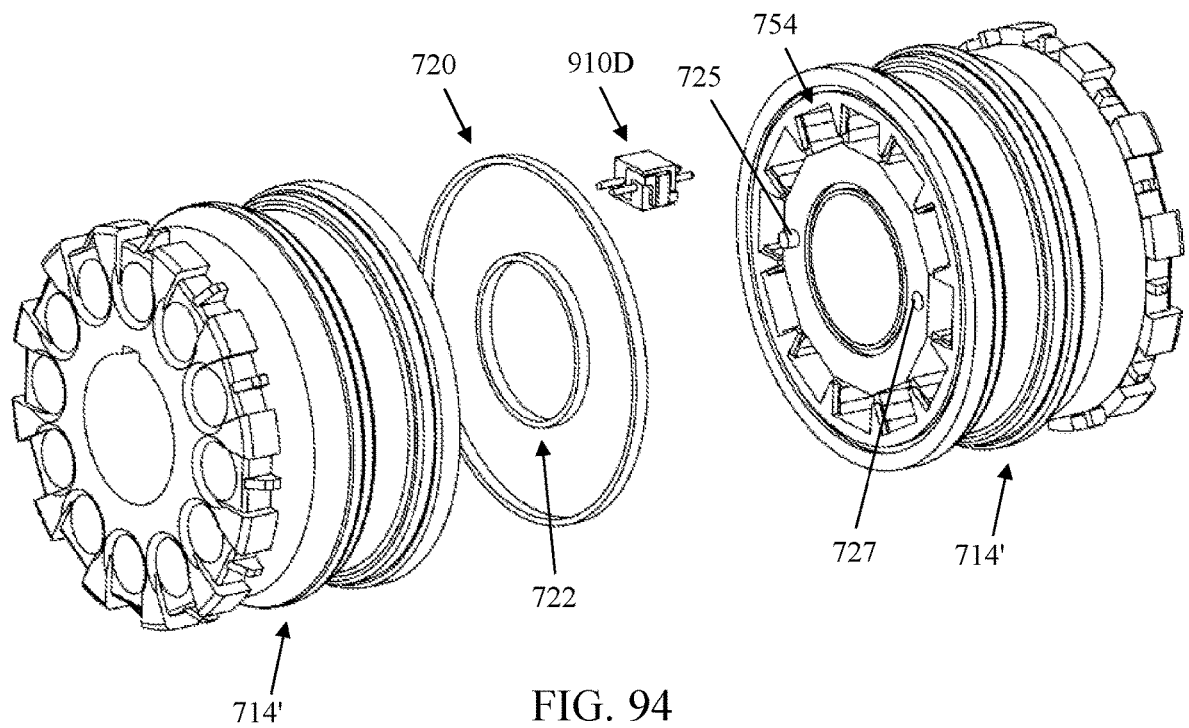
FIG. 94 is an exploded perspective of two port housings of a multiport device according to one embodiment of the present disclosure and an adapter usable with the electrical connector of FIG. 91.
Figure 95:
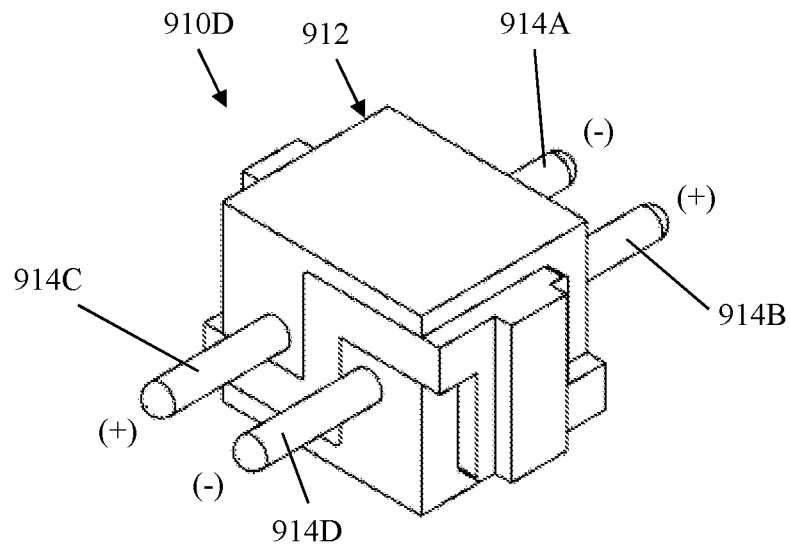
FIG. 95 is a perspective of the adapter of FIG. 94.
Figure 96:
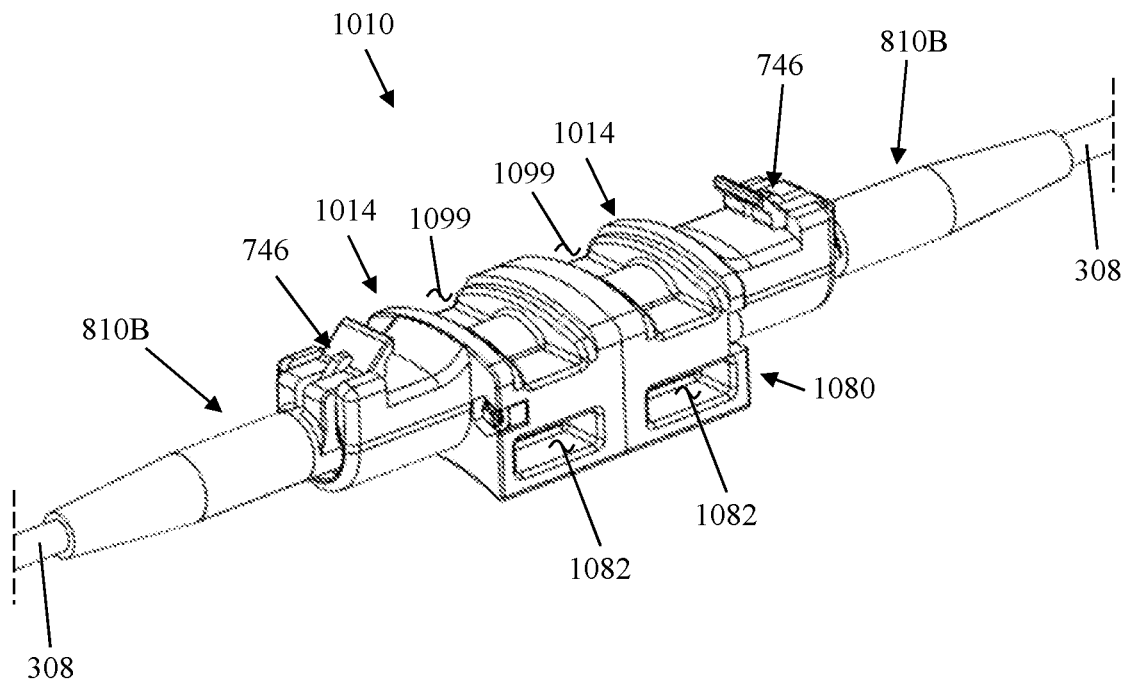
FIG. 96 is a perspective of another embodiment of an auxiliary port device usable with the connectors of FIGS. 47, 64, and 76.
Figure 97:
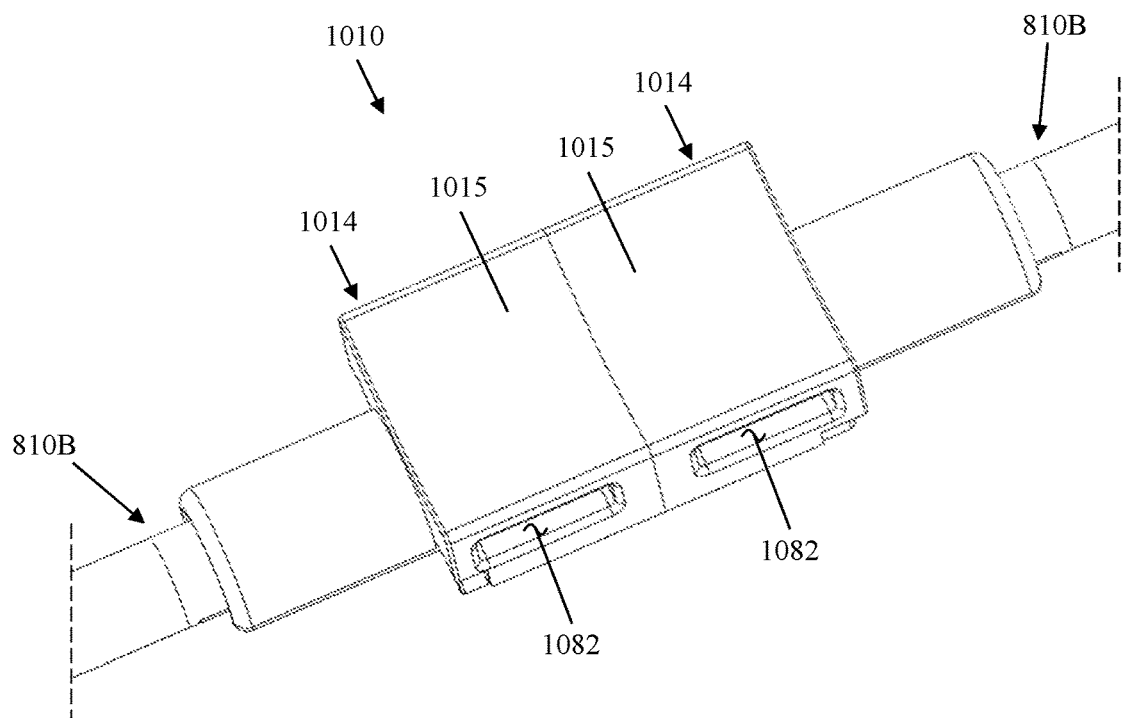
FIG. 97 is a bottom perspective of the auxiliary port device of FIG. 96.
Figure 98:
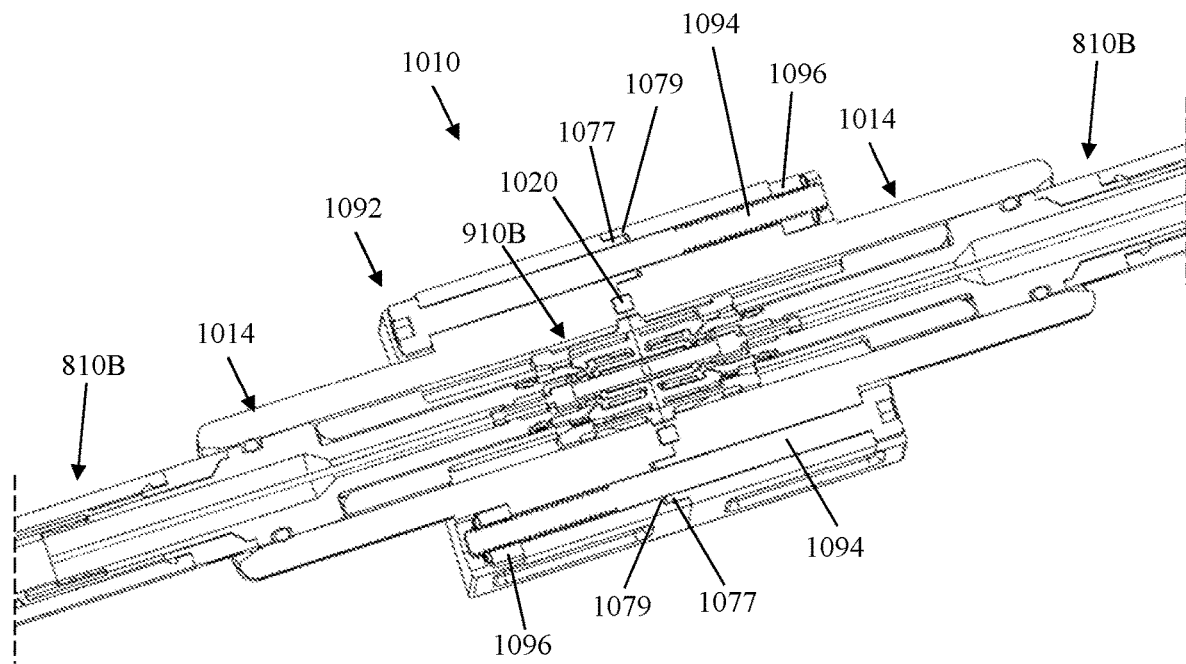
FIG. 98 is a horizontal section of the auxiliary port device of FIG. 96.
Figure 99:
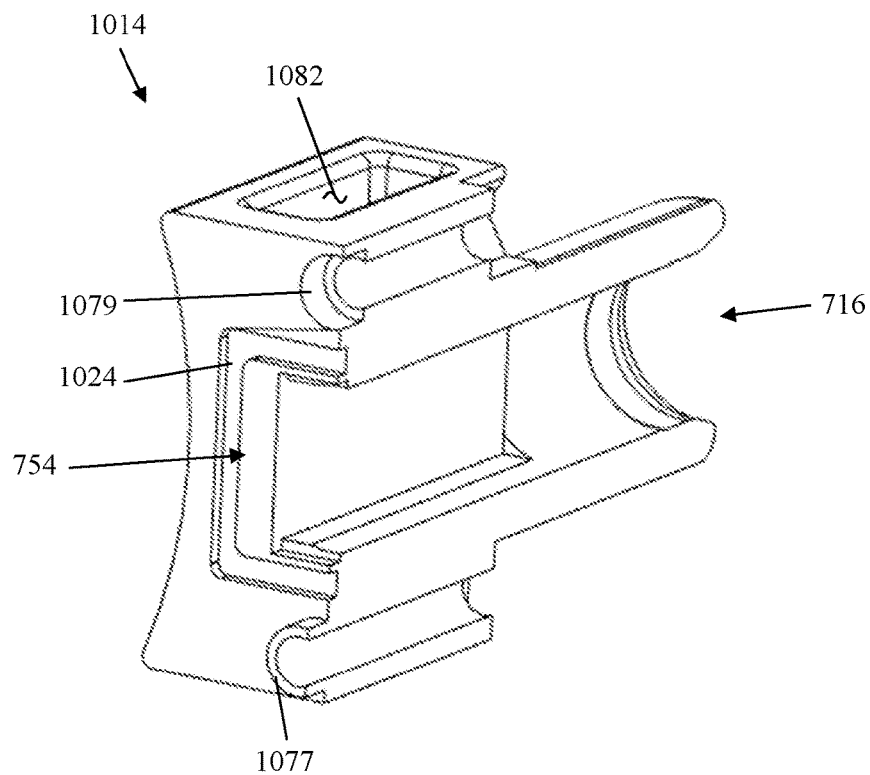
FIG. 99 is a vertical section of a port housing of the auxiliary port device of FIG. 96.
Figure 100:
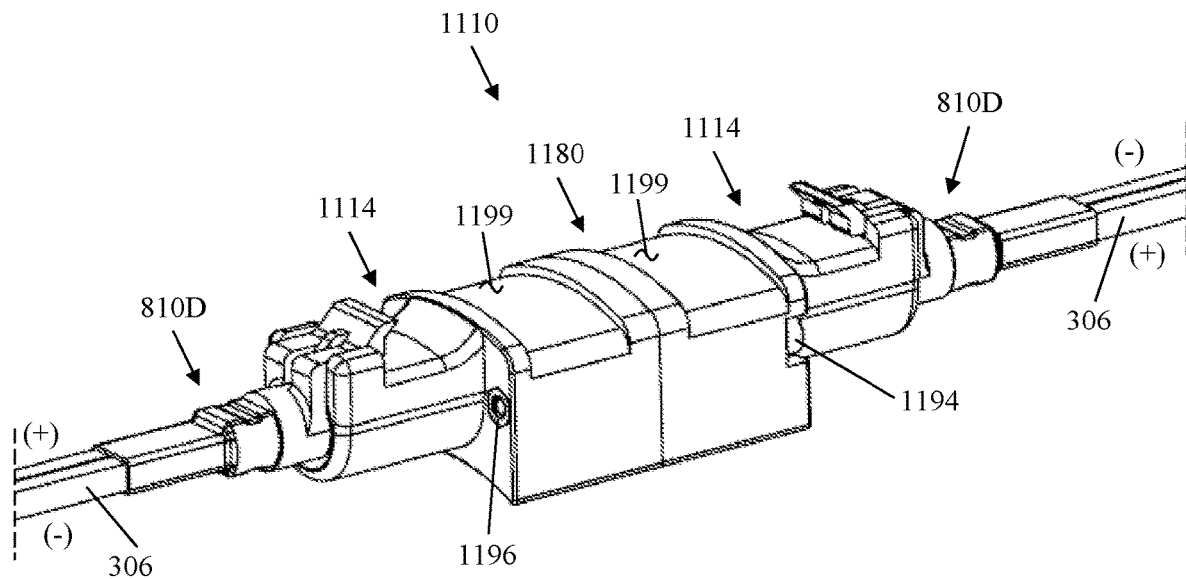
FIG. 100 is a perspective of another embodiment of an auxiliary port device according to the present disclosure, the auxiliary port device usable with the connectors of FIG. 91.
Figure 101:
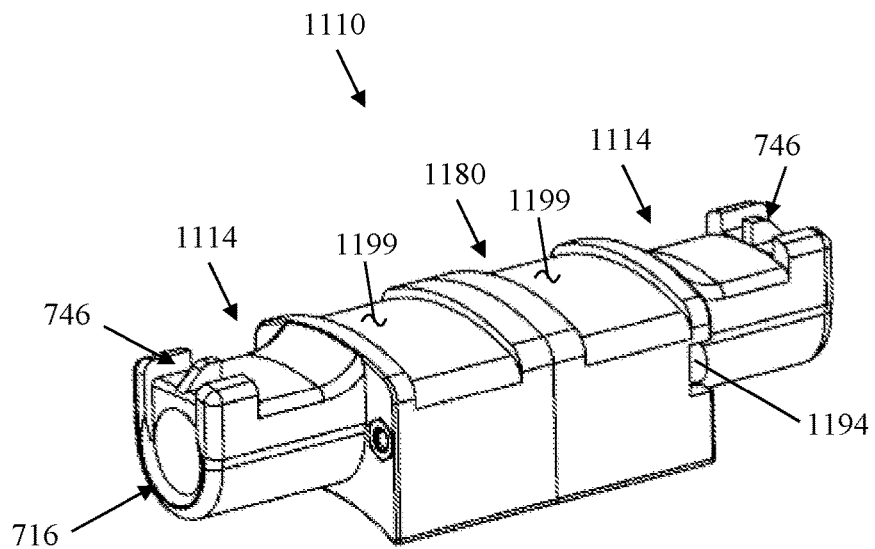
FIG. 101 is similar to FIG. 100, with the two electrical connectors of FIG. 91 removed from the auxiliary port device.
Figure 102:
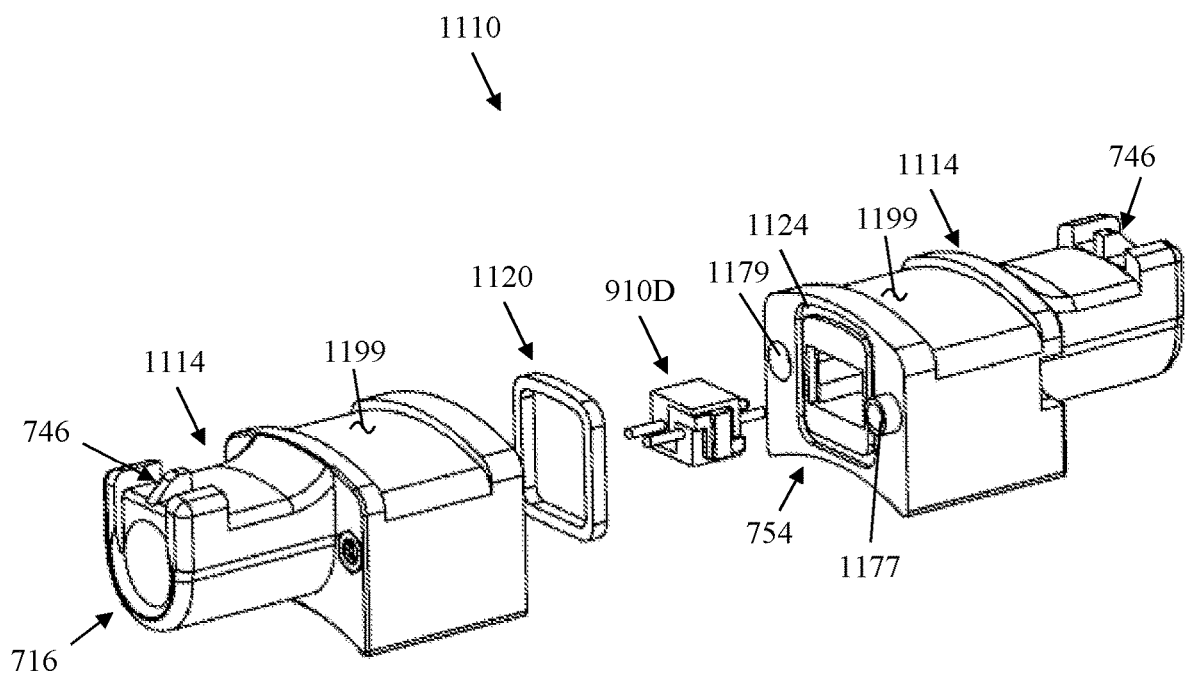
FIG. 102 is an exploded perspective of FIG. 101 with the adapter of FIG. 94.
Figure 103:
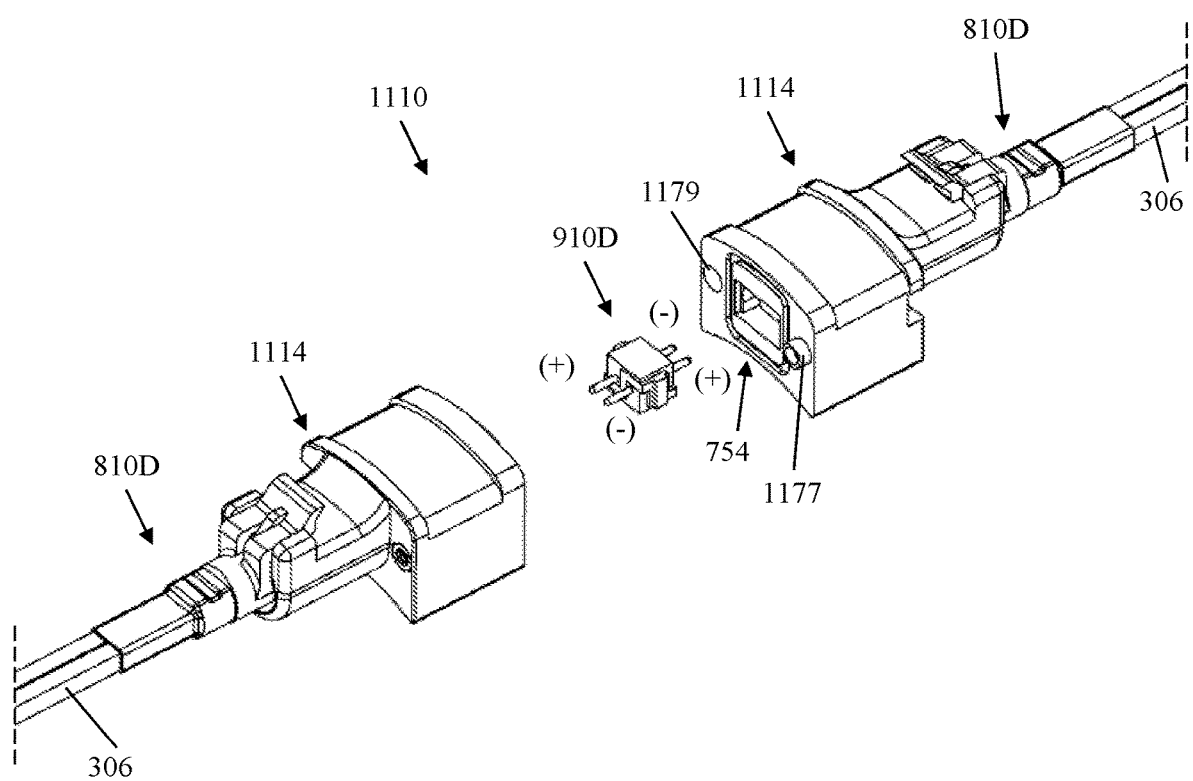
FIG. 103 is a partially exploded perspective of the auxiliary port device of FIG. 100.

In this embodiment, the first port housing 714A and the second port housing 714B are generally identical. The first and second port housings 714A, 714A are identical except for the arrangement of alignment projections 725 and alignment recesses 726 on each of the port housings (FIGS. 43A and 43B). Each port housing 714 includes at least one alignment projection 725 and at least one alignment recess 727 (broadly, one of the port housings includes the alignment projection and the other port housing includes the alignment recess) to facilitate the coupling and alignment of the first and second port housings together. Each alignment recess 627 is sized and shaped to receive an alignment projection 725 of the other port housing 714, when the first and second port housings are coupled together. In the illustrated embodiment, the alignment projections 725 are disposed radially outward of the alignment recesses 727 on the second port housing 714B and the alignment recesses are disposed radially outward of the alignment projections on the first port housing 714A. Other arrangements of the alignment projections and recesses are within the scope of the present disclosure. For example, the alignment projections and recesses can be arranged so that the first and second port housings are identical. An example of such an arrangement of the alignment projections 725 and the alignment recesses 725 is shown in FIG. 94. In this embodiment, the first and second port housings, each generally indicated at reference numeral 714', are identical.

Still referring to FIGS. 40-46, in this embodiment, the first and second port housings 714A, 714B each include a mounting bracket channel 745 (FIGS. 41A and 41B) for receiving a mounting bracket, such as the mounting bracket 144 described above.

Figure 46:
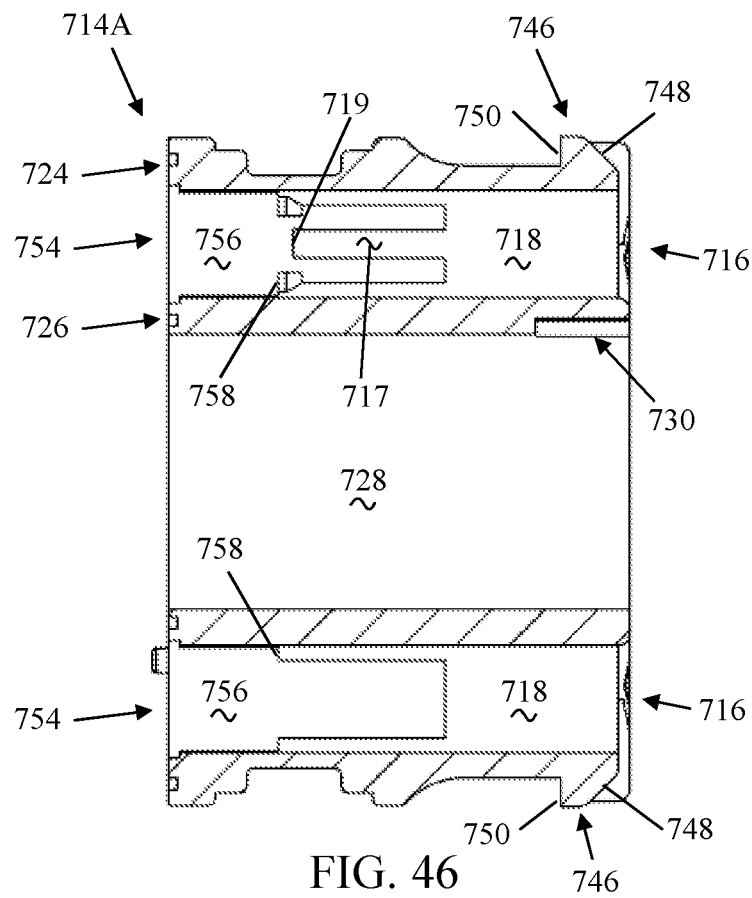
FIG. 46 is a vertical section of the first port housing of the multiport device of FIG. 40.
Figure 47:
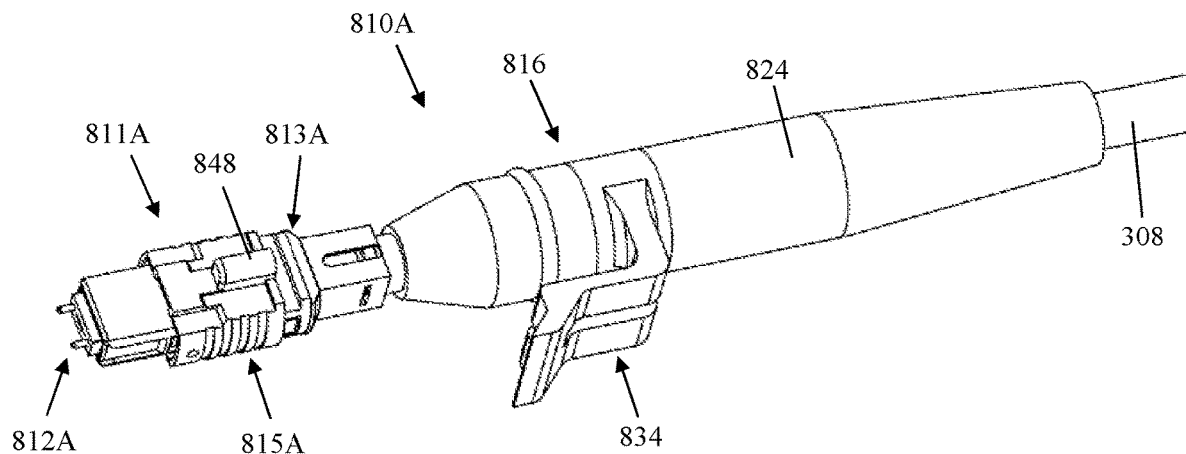
FIG. 47 is a perspective of one embodiment of an MPO connector, the MPO connector useable with the multiport device of FIG. 40.
Figure 48:
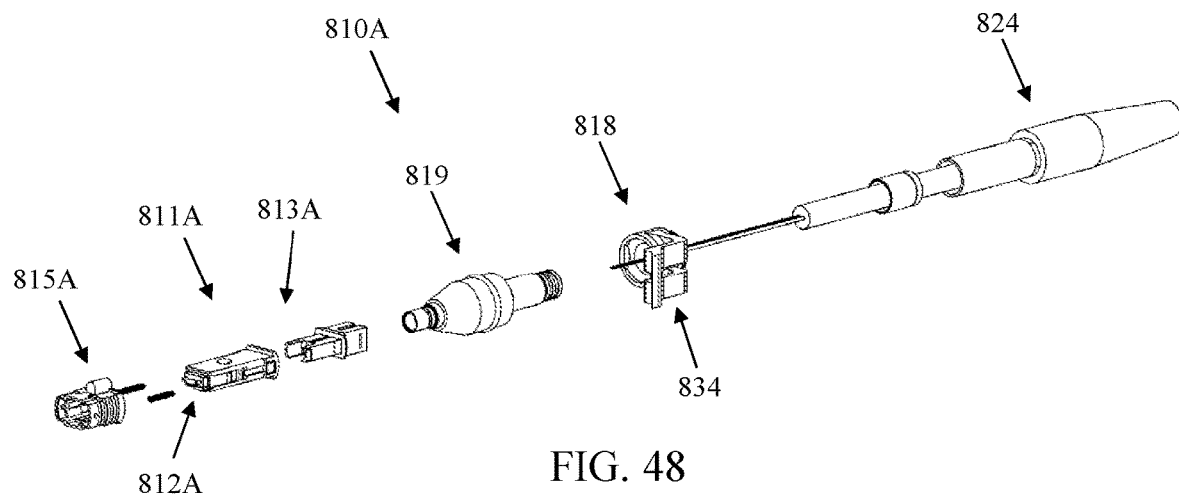
FIG. 48 is an exploded view of the connector of FIG. 47.
Figure 49:
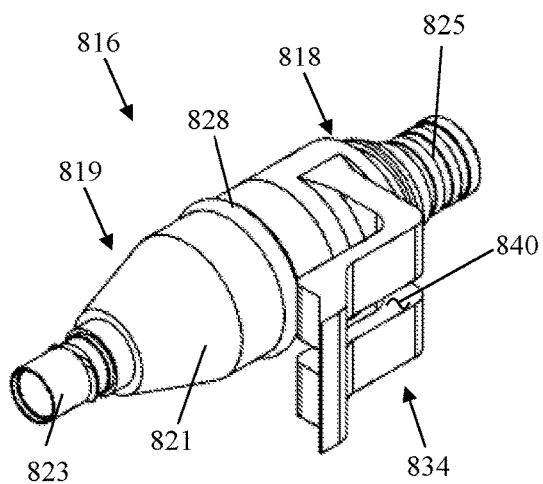
FIG. 49 is a perspective of a port engagement portion of the connector of FIG. 47.
Figure 50:
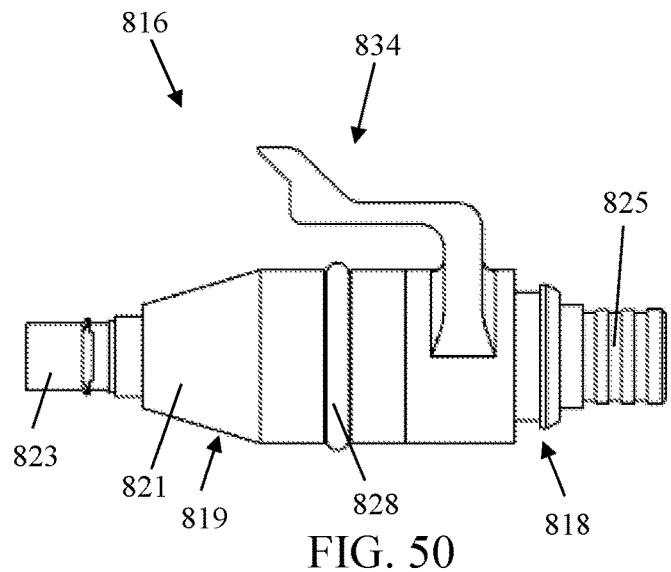
FIG. 50 is a side view thereof.

The ports 716 are configured to receive a connector 810 (FIGS. 47-93). Accordingly, the communication sockets 718 have a different size and shape than the communication sockets 118 of the multiport device 110. In addition, each port 716 of the multiport device 710 includes an alignment key channel 717 (FIG. 46). The alignment key channel 717 is generally parallel to the central longitudinal axis CLA and has an open outer end and a closed inner end. The alignment key channel 717 is sized and shaped to receive a rotational alignment key 848 (described in more detail below) of a connector 810. When the connector 810 is inserted into the port 716, the rotational alignment key 848 enters the alignment key channel 717 through the open outer end. Likewise, when the connector 810 is removed from the port 716, the rotational alignment key 848 leaves the alignment key channel 717 through the open outer end.

The receptacle receivers 754 are configured to receive an adapter 910 (FIGS. 57, 69, 75, 82, and 94-95). Accordingly, the receptacle sockets 756 have a different size and shape than the receptacle sockets 156 of the multiport device 110. In particular, the receptacle sockets 756 have a rectangular cross-sectional shape to the match the rectangular cross-sectional shape of the adapters 910. Each type of adapter 910 may have a different size and/or shape. Accordingly, it is understood the receptacles receivers 754 may have different configurations (e.g., the receptacle sockets 756 may have different size and shapes) depending upon the type of adapter 910 to which the first and second port housings 714A, 714B are configured to be coupled. For example, the receptacle receivers 754 of port housing 714A, 714B shown in FIGS. 42A and 42B has a different configuration than the receptacle receivers 754 of port housings 714' shown in FIG. 94. However, some of the adapters 910 may have the same size and shape. Accordingly, the multiport device 710, like the multiport device 110 described above, can be configured to receive different types of connectors 810 depending on the type of adapters 910 coupled to the first and second port housings 714A, 714B. For example, adapters 910A-C all have the same exterior size and shape and can be interchangeably coupled to the same receptacle receivers 754 shown in FIGS. 42A and 42B.

Figure 40:
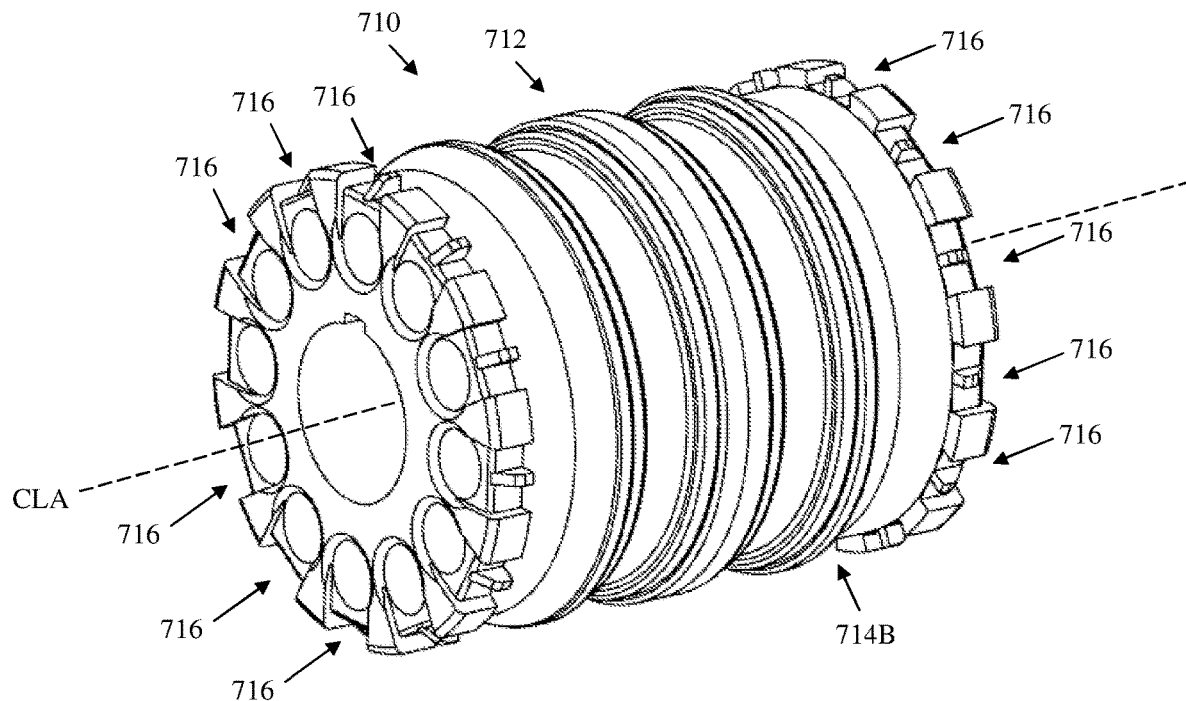
FIG. 40 is a perspective of a multiport device according to another embodiment of the present disclosure.
Figures 41A, 41B:
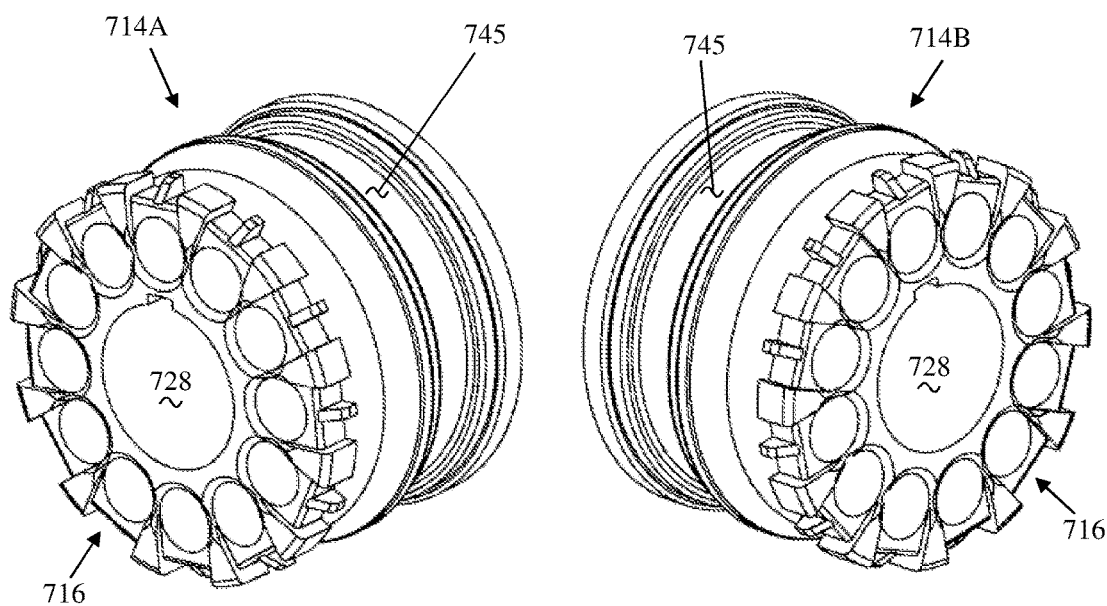
FIG. 41A is a front perspective of a first port housing of the multiport device of FIG. 40.
FIG. 41B is a front perspective of a second port housing of the multiport device of FIG. 40.
Figure 44:
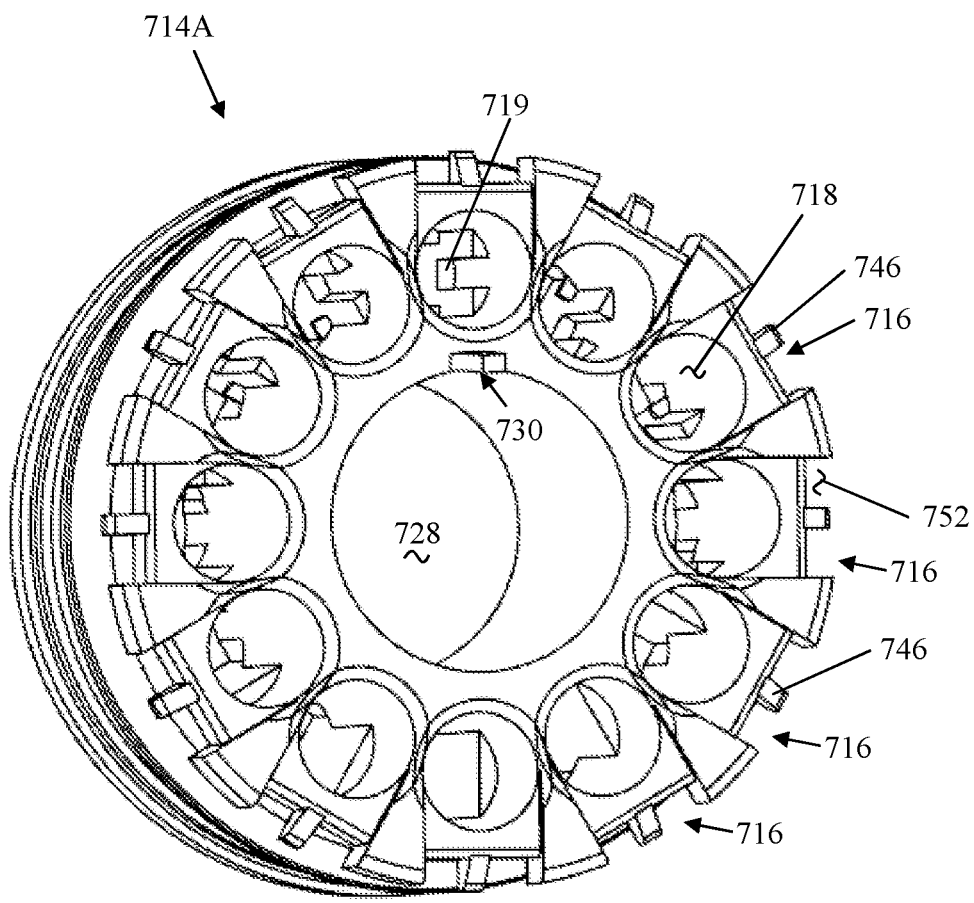
FIG. 44 is a front perspective of the first port housing of the multiport device of FIG. 40.
Figure 45:
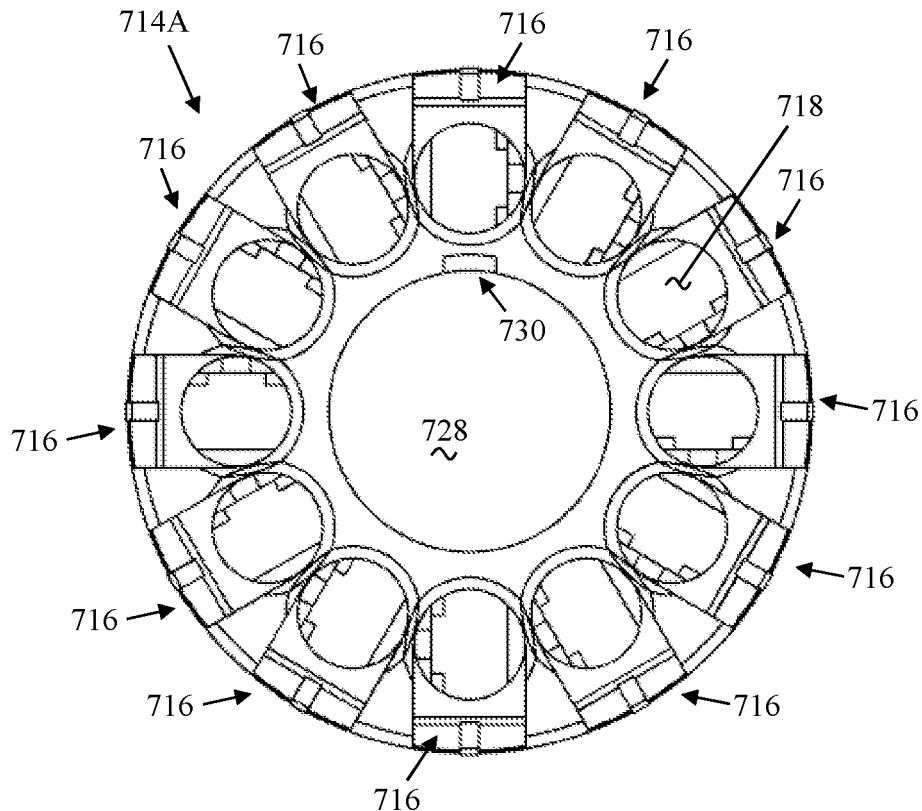
FIG. 45 is a front view thereof.

Referring to FIGS. 47-63, one embodiment of a connector useable with the multiport device 710 of FIG. 40 is generally indicated at reference numeral 810A. The connector 810A (e.g., a communication plug or a fiber optic plug) plugs into one of the ports 716 of the multiport device 710. In this embodiment, the connector includes a connector end assembly 811A. The connector end assembly 811A defines the connection end portion of the connector 810A. The connector end assembly 811A includes a ferrule assembly 812A (containing one or more ferrules) and a connector end housing 813A supporting the ferrule assembly (e.g., the ferrule assembly is received in the connector end housing). The ferrule assembly 812A (broadly, the connector end assembly 811A) defines a connection end of the connector 810A. Thus, the connector 810A is inserted ferrule assembly 812A first into one of the ports 716 of the multiport device 710 to plug or connect the connector to the port. In this embodiment, the connector end assembly 811A comprises a MPO connector end assembly. The connector end housing 813A comprises a MPO connector end housing and the ferrule assembly 812A comprises a MPO ferrule assembly. Thus, in this embodiment, the connector 810A may be referred to as a MPO connector (e.g., MPO optical connector). In this embodiment, the connector 810A is attached to an end of a fiber optic cable 308.

Figure 57:
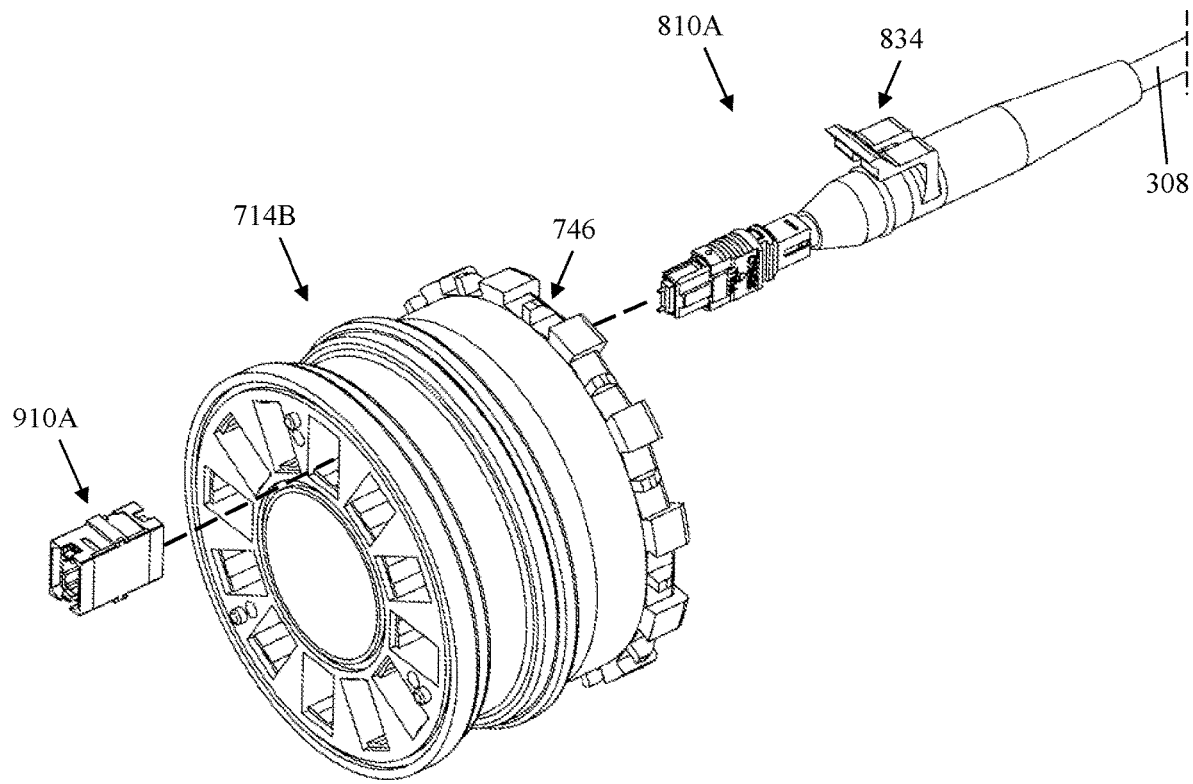
FIG. 57 is an exploded perspective of the MPO connector of FIG. 47, the second port housing of the multiport device of FIG. 40, and an adapter useable with the MPO connector of FIG. 47.
Figure 58:
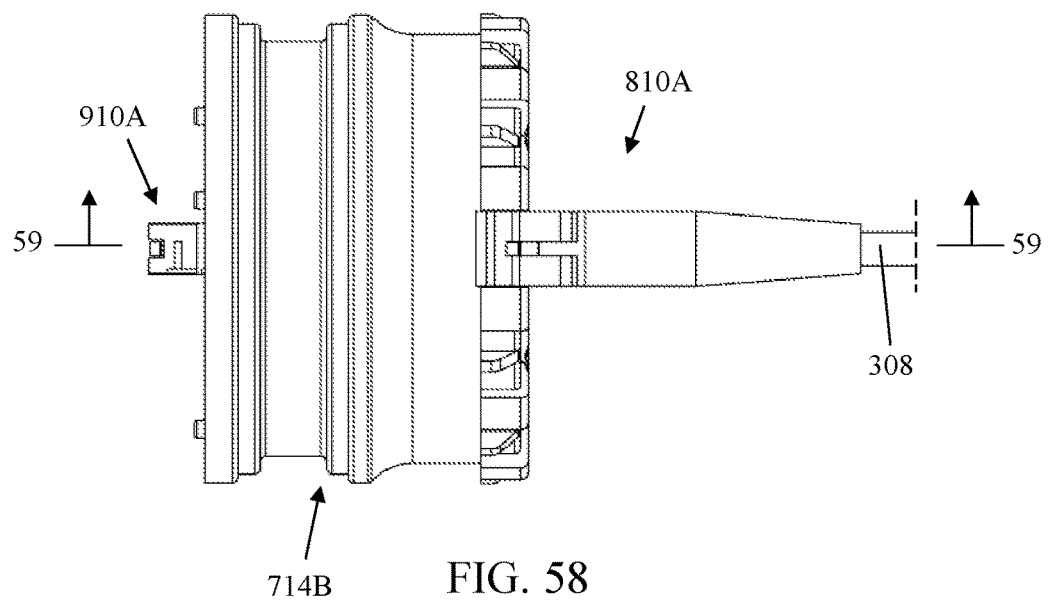
FIG. 58 is a top view of the MPO connector of FIG. 47 and the adapter of FIG. 57 attached to the second port housing of the multiport device of FIG. 40.
Figure 59:
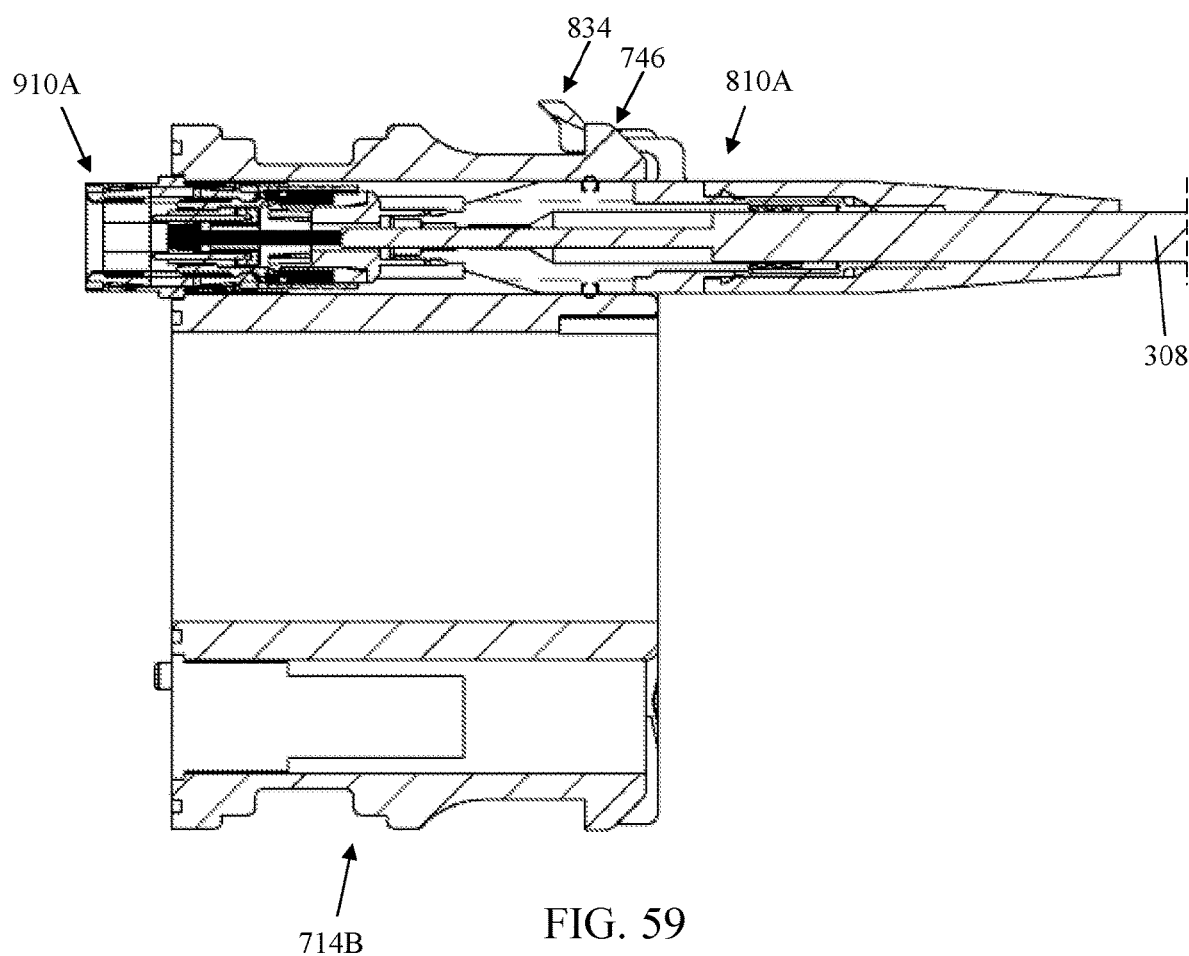
FIG. 59 is a section taken through line 59-59 of FIG. 58.
Figure 60:
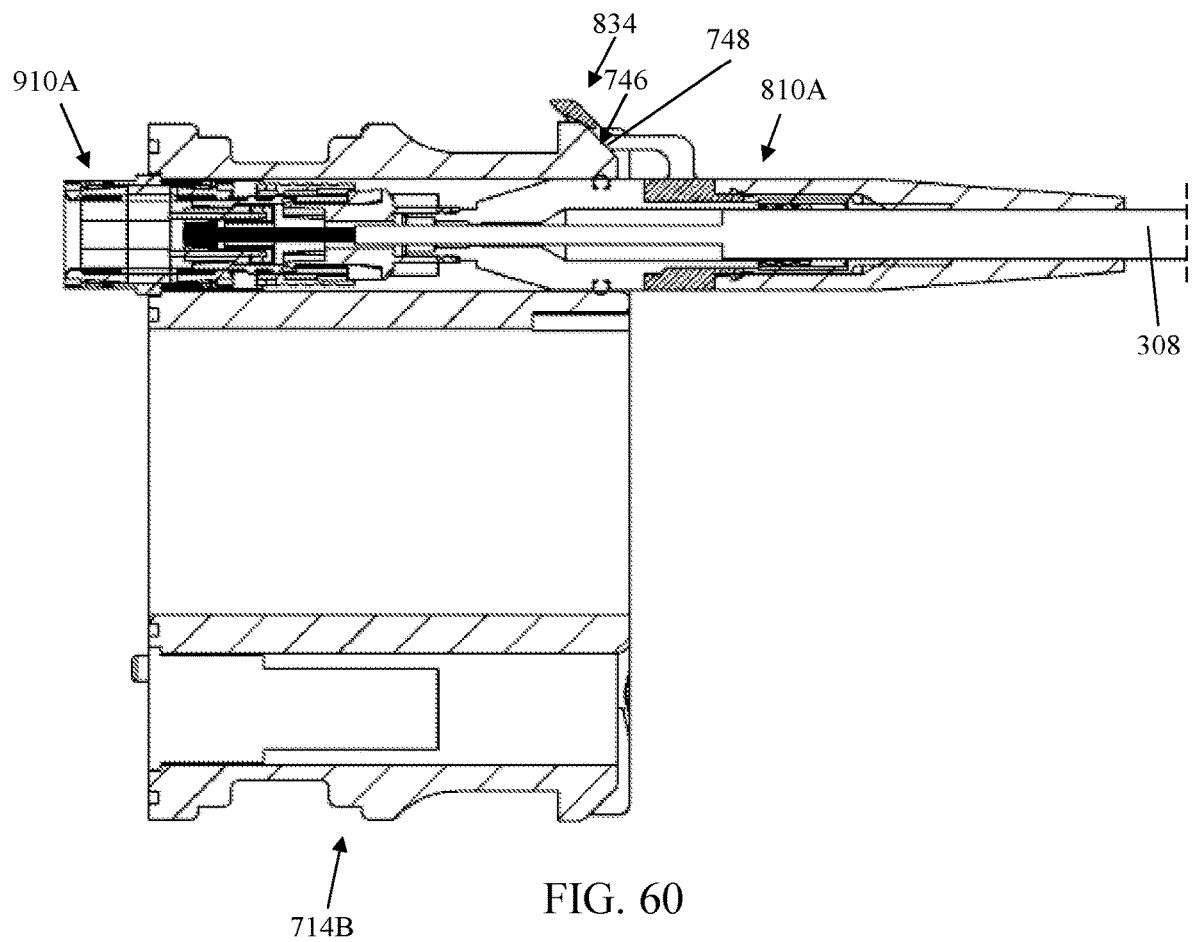
FIG. 60 is a section similar to FIG. 59, but showing a latch of the MPO connector of FIG. 47 being deflected as the connector is pushed into the second port housing of the multiport device of FIG. 40.
Figure 61:
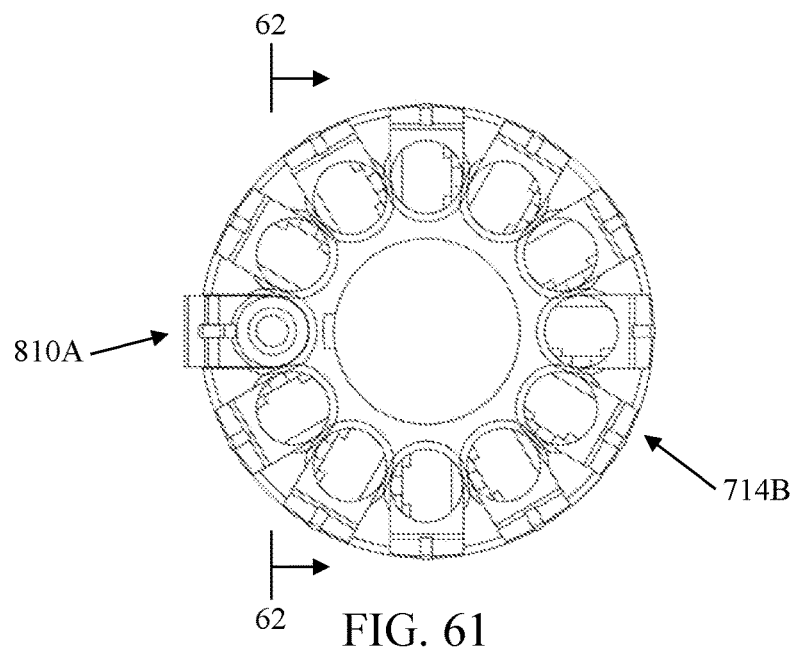
FIG. 61 is a front view of FIG. 58.
Figure 62:
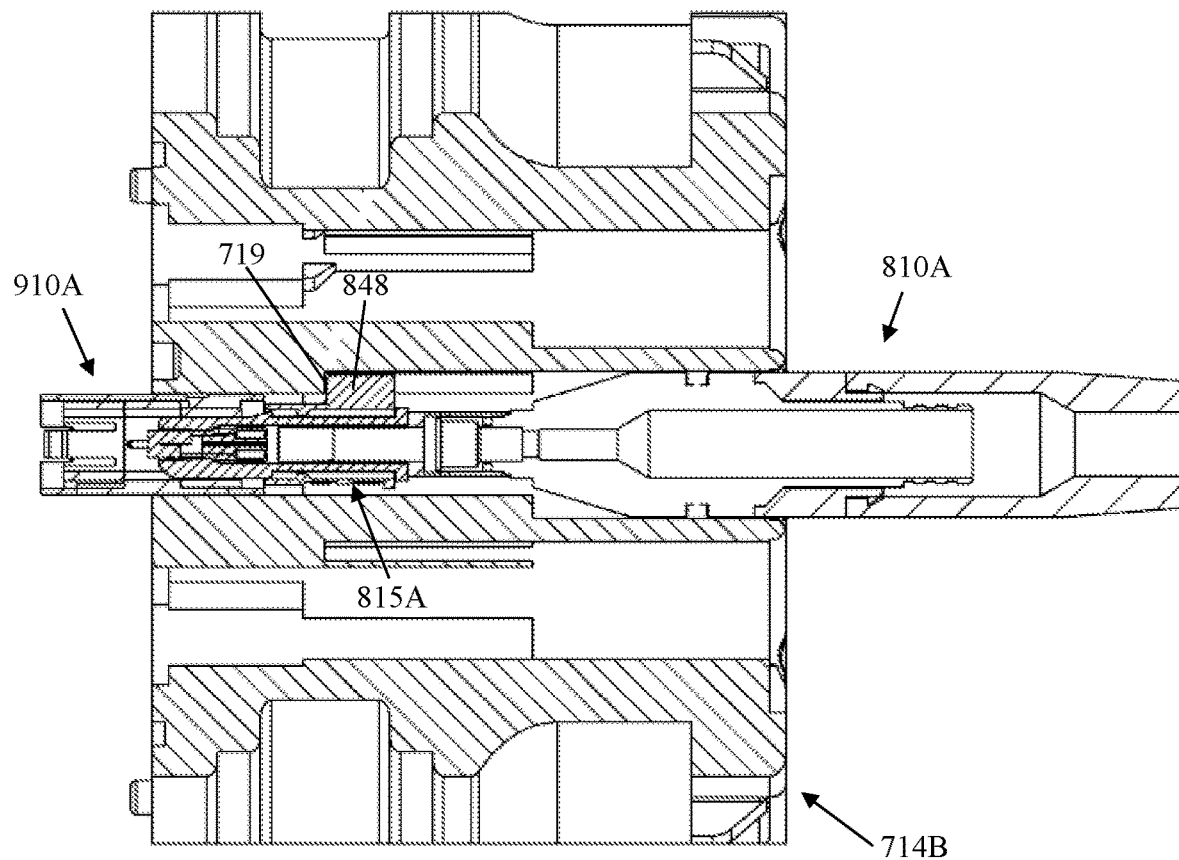
FIG. 62 is a section taken through line 62-62 of FIG. 61.

To go with the MPO connector 810A, the multiport assembly includes a corresponding adapter 910A (FIG. 57). Specifically, the adapter 910A comprises a MPO adapter (e.g., a MPO fiber optic adapter). The adapter 910A is of conventional or known construction and thus a detailed description is omitted herein. Generally, the adapter 910A receives ferrules assemblies 812A though either end such that the ferrule assemblies engage each other within the adapter to form the communication connection (e.g., fiber optic connection). The adapter 910A also includes structural features that allow latches to latch to the adapter, to secure the ferrule assembly 812A to the adapter. As mentioned above, the adapter 910A is receivable by the receptacle receivers 754 of the multiport device 710. Thus, when the both the adapter 910A and the connector 810A are coupled to the multiport device 710, the ferrule assembly 812A (e.g., a front end thereof) of the connector is disposed in the adapter, as shown in FIGS. 59 and 62.

Figure 55:
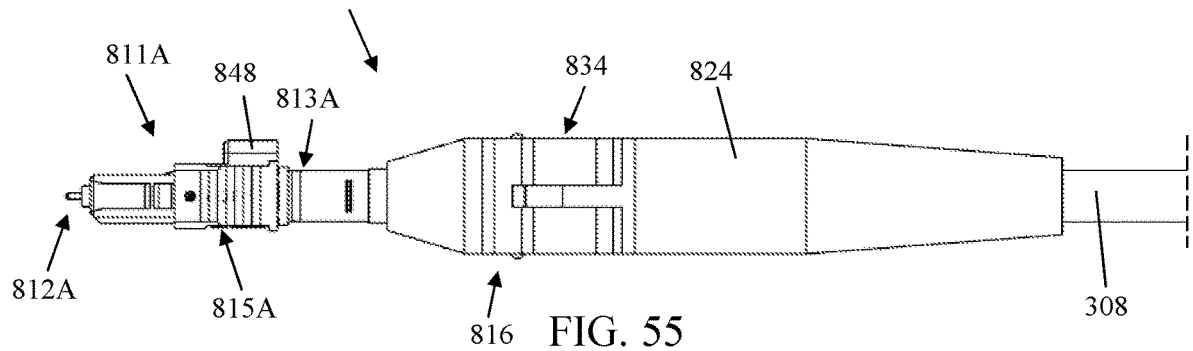
FIG. 55 is a top view thereof.
Figure 56:
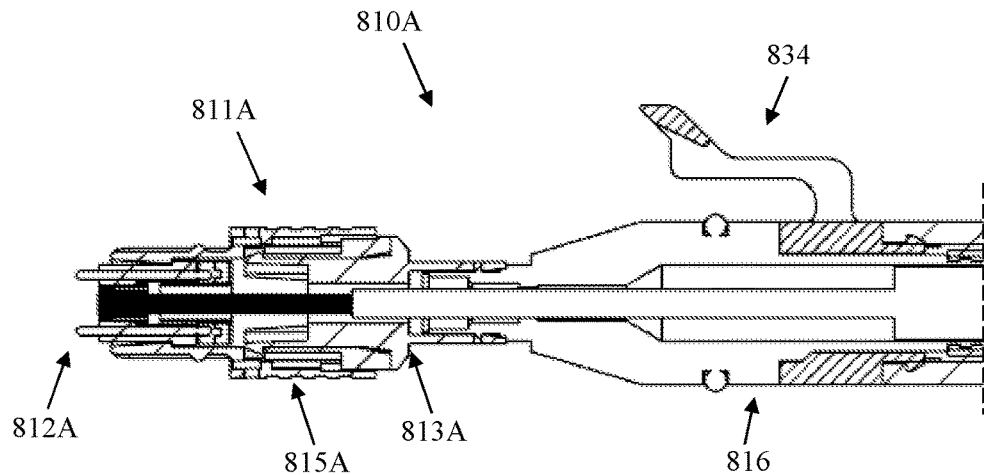
FIG. 56 is a vertical section thereof.
Figure 63:
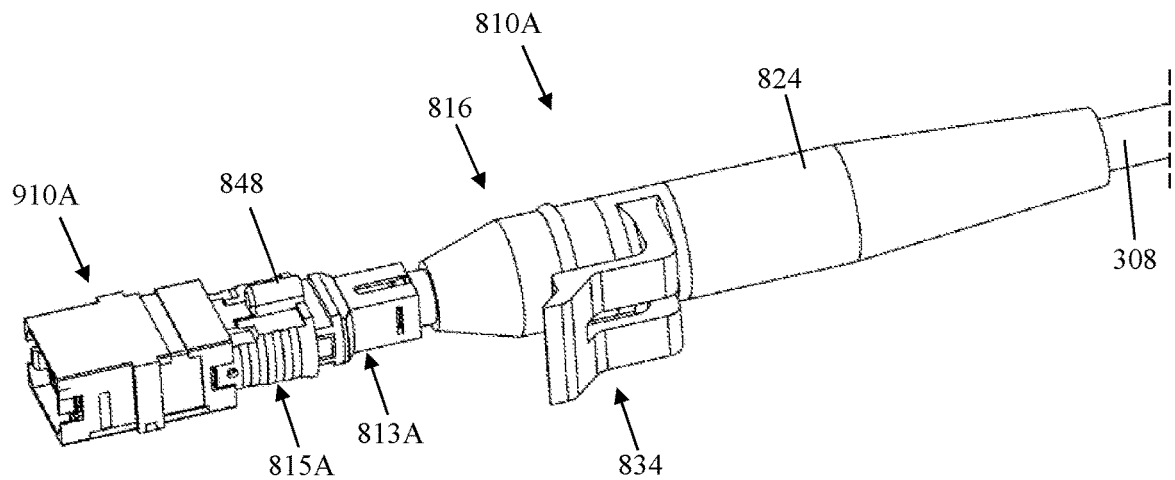
FIG. 63 is a perspective of the MPO connector of FIG. 47 attached to the adapter of FIG. 57.

The connector end assembly 811A is generally of conventional or known construction. Thus, the connector end hosing 813A and the ferrule assembly 812A are generally of conventional construction. In this embodiment, the connector end housing 813A includes a moveable outer housing 815A (broadly, the outer housing forms part of a latch mechanism). The outer housing 815A is generally of conventional construction and is configured to allow the latch arms of the adapter 910A to latch with the connector end assembly 813A, as shown in FIG. 63. In the blocking position, the outer housing 815A overlies the latch arms of the adapter 910A, preventing the latch arms from releasing the connector end assembly 813A. The outer housing 815A is yieldably biased (such as by one or more springs) to a blocking position (FIGS. 47 and 63) relative to the ferrule assembly 812A (broadly, the rest of the connector end assembly 811A). The outer housing 815A is movable (e.g., longitudinally slidable) relative to the ferrule assembly 812A from the blocking position to an unblocked position (FIGS. 55 and 62). The unblocked position is rearward of the blocked position. The connector end assembly 811A is configured to be operatively latched in an adapter 910A (e.g., a specific type of adapter) to make a communication connection to the ferrule assembly 812A (e.g., make a communication connection with another connector 810A). The outer housing 815A is configured to retain the connector end assembly 811A in the adapter 910A when in the blocking position. The outer housing 815A is configured to move relative to the ferrule assembly 812A from the blocking position to the unblocked position to unlatch the connector end assembly 811A from the adapter 910A.

Unlike conventional constructions, the connector end assembly 811A includes a rotational alignment key 848. The rotational alignment key 848 is configured to engage the port 716 to prevent rotation of the connector 810A relative to the port when the connector is plugged into the port of the multiport device 710. The rotational alignment key 848 is sized and shaped to be inserted into the alignment key channel 717 of one of the ports 716 of the multiport device 710, to ensure the connector 810A is in the correct orientation relative to the port. The rotational alignment key 848 is spaced apart from the connection end of the connector 810A along the longitudinal axis of the connector toward an opposite cable end of the connector. In the illustrated embodiment, the rotational alignment key 848 comprises a projection extending longitudinally. In this embodiment, the rotational alignment key 848 is mounted on (e.g., fixed to) the outer housing 815A.

Each port 716 of the multiport device 710 is configured to defeat one or more latches of a connector 810. Specifically, each port 716 of the multiport device 710 is configured to defeat the outer housing 815A of (e.g., associated with) the connector 810A. The port body 712 of the multiport device 710 is configured to engage the connector 810A to retain the movable outer housing 815A in the unblocked position when the connector is plugged into a port 716. Specifically, each port 716 can include one or more latch defeating elements to defeat or position the outer housing 815A in the unblocked position when the connector 810A is coupled to the port 716 and the ferrule assembly 812A is disposed in the adapter 910A. By defeating the outer housing 815A of the connector 810A, the connection end assembly 811A does not latch onto the adapter 910A. This way the connector 810A can be disconnected from the port 716 (e.g., the ferrule assembly 812A can be withdrawn from the adapter 910A). If the port 716 of the multiport device 710 did not defeat the outer housing 815A, the outer housing would secure the connector 810A to the communication port 910A, thereby preventing the connector from being able to withdraw the ferrule assembly 812A from the adapter (because the outer housing would not be accessible within the port). If not defeated, the outer housing 815A would otherwise automatically block the latch arms of the adapter 910A because the outer housing is biased in the blocking position (e.g., manual intervention is not required to have the latch connect to the adapter).

In this embodiment, the latching defeating element comprises the end surface 719 of each port 716 that defines the closed, inner end of the alignment key channel 717. As the connector 810A is inserted into the port 716, the end surface 710 engages the rotational alignment key 848 (FIG. 62), thereby preventing the rotational alignment key and outer housing 815A from continuing to move forward, toward the adapter 910A. As a result, the outer housing 815A moves rearward relative to the ferrule assembly 812A to the unblocked position as the connector 810A continues to be inserted into the port 716. Accordingly, when the connector 810A is coupled to the port 716, the outer housing 815A is in the unblocked position and doesn't allow the adapter 910A to latch with the connector end assembly 813A.

Referring to FIGS. 49-53, the connector 810A also includes a port engagement portion 816 that is attached to the connector end assembly 811A. The port engagement portion 816 is spaced apart from the connection end (e.g., ferrule assembly 812A) of the connector 810A along the longitudinal axis of the connector toward the opposite cable end of the connector (e.g., the end from which the cable 308 extends. The port engagement portion 816 includes a port coupling body 818 and a port insert body 819. The port coupling body 818 and port insert body 819 are connected together. The port insert body 819 includes a main or intermediate portion 821, a front post 823 extending forward from the main portion and a back post 825 extending rearward from the main portion. The front post 823 is attached to the connection end assembly 811A. The front post 823 may have different configurations (e.g., lengths) depending on the type of connection end assembly 811 attached to it. The back post 825 is used to mount the port coupling body 818 on the port insert body 819. The port insert body (and a portion of the port coupling body 818) is sized and shaped to be received by the opening of the port 716 (e.g., connector socket 718) of the multiport device 710 when the connector 810A is plugged into the port. Accordingly, the exterior of the port insert body 819 (and port coupling body 818) is sized and shaped to correspond to (e.g., generally match) the size and shape of the connector socket 718 of the ports 716. Preferably, the fit between the port engagement portion 816 and the connector socket 718 is relatively tight so as to inhibit lateral movement and twisting of the connector 810A in the multiport device 710, which could otherwise damage and/or impair the communication connection formed by the connector. The port engagement portion 816 (e.g., the port coupling body 818) extends out of the opening of the port 716 at the outer end of the port housing 714 when the connector 810A is coupled to the multiport device 710.

The connector 810A includes a seal 828 (e.g., an O-ring) configured to engage a port 716 of the multiport device 710 to form a fluid-tight seal with the multiport device to prevent the ingress of moisture and debris. The seal 828 is spaced apart from the connection end (e.g., ferrule assembly 812A) of the connector 810A along the longitudinal axis of the connector toward the opposite cable (e.g., rear) end. The seal 828 is disposed on the main portion 821. The main portion 821 defines an annular seal groove sized and shaped to receive the seal 828. The cable 308 extends rearward from the rear end (e.g., the back post 825) of the port engagement portion 816. A strain relief boot 824 is attached to the rear end portion of the port engagement portion 816 to support and strengthen the interface between the cable 308 and the connector 810A.

Figure 53:
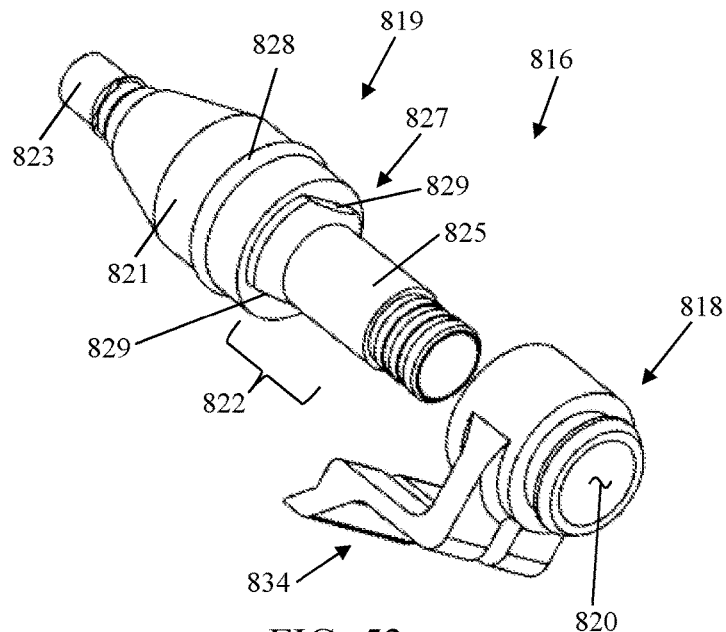
FIG. 53 is a forward-looking exploded view of the port engagement portion of FIG. 49.
Figure 54:
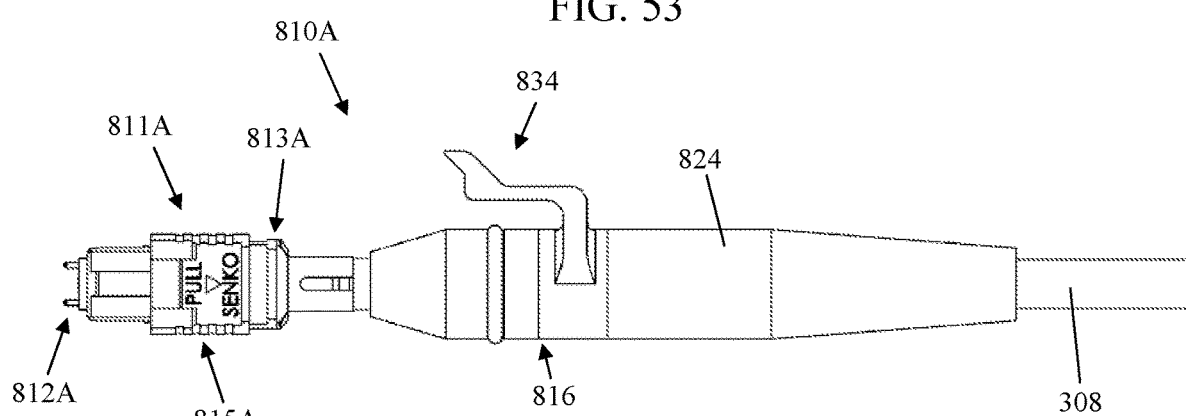
FIG. 54 is a side view of the MPO connector of FIG. 47.

The port coupling body 818 is configured to be supported by the port insert body 819 (e.g., by the back post 825). The port coupling body 818 (e.g., sleeve) defines a post passageway 820 that receives the back post 825 of the port insert body 819. The back post 825 extends through the post passageway 820. The port coupling body 818 extends circumferentially around the back post 825. The port coupling body 818 is supported on the back post 825 at a coupling body locating area 822 (FIG. 53). The coupling body locating area 822 is between the main portion 821 and the strain relief boot 824 (e.g., rear end of the back post 825). Accordingly, the port coupling body 818 is disposed between a front end of the strain relief boot 824 (which may inhibit the port coupling body from moving rearward off the back post 825) and a rear end of the main portion 821. The port engagement portion 816 (e.g., the main portion 821 of the port insert portion 819) forms an enlarged perimeter section of the connector 810A. The connector end assembly 811A defines a front perimeter section (e.g., connection end portion) of the connector 810A that has a smaller cross-sectional dimension than the enlarged perimeter section.

Figure 51:
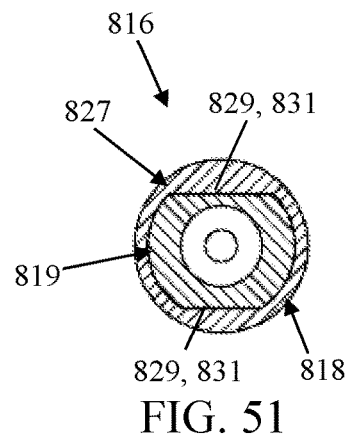
FIG. 51 is a cross-section thereof.
Figure 52:
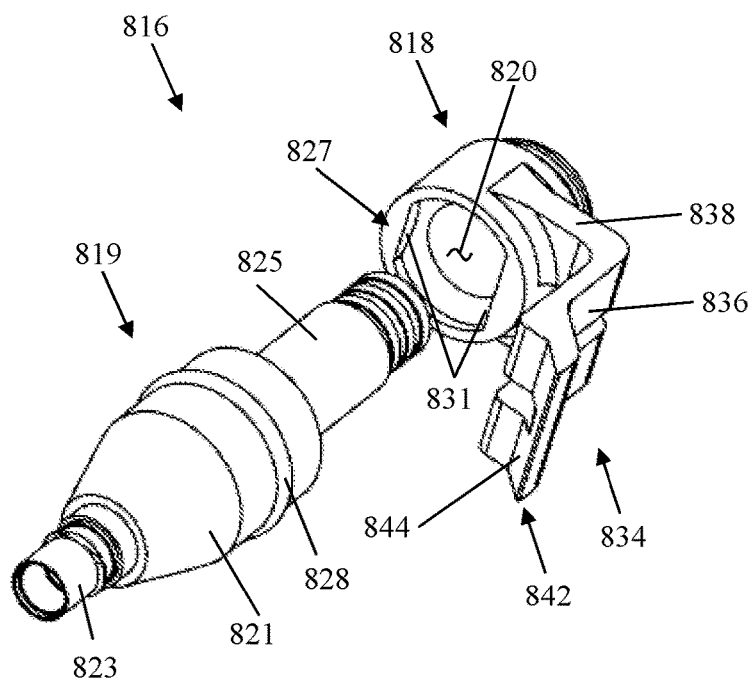
FIG. 52 is a rearward-looking exploded perspective of the port engagement portion of FIG. 49.

The port coupling body 818 and the port insert body 819 each include alignment keys 827 configured to engage each other to orient the two components relative to each other and to inhibit the two components from rotating relative to each other. In the illustrated embodiment, the port insert body 819 includes flats 829 on opposite sides thereof (FIG. 53) that engage corresponding flats 831 of the port coupling body 818 on opposite sides of the passageway 820 (FIG. 52) to inhibit rotation of the two component relative to each other. As shown in FIG. 51, the flats 829, 831 have different configurations (e.g., sizes, lengths) so that the port insert body 819 and port coupling body 818 can only be coupled together in one orientation.

Referring back to FIGS. 47-63, the port engagement portion 816 of the connector 810A includes a latch 834 (e.g., an overhead latch). The latch 834 of connector 810A is generally analogous (e.g., identical) to the latch 334 of the connector 310 and, thus, for ease of comprehension, where similar, analogous or identical parts are used, reference numerals "500" units higher are employed. Accordingly, unless clearly stated or indicated otherwise, the descriptions herein regarding the latch 334 of the connector 310 also apply to the latch 834 of connector 810A. For example, the deflection surface 748 of the latch retainer 746 engages the sloped surface 844 of the wedge engagement tip 842 to deflect the latch 834 as the connector 810A is mated with a port 716 of the multiport device 710, as show in FIGS. 59 and 60.

In this embodiment, the latch 834 is attached to the port coupling body 818. The latch 834 is spaced apart from the rotational alignment key 848 along the longitudinal axis of the connector 810A toward the cable end. The rotational alignment key 848 is at one (e.g., a first) circumferential alignment position about the longitudinal axis and the latch 834 is at another (e.g., a second) circumferential alignment position about the longitudinal axis. In the illustrated embodiment, the first and second circumferential alignment positions are about 90 degrees apart.

Figure 71:
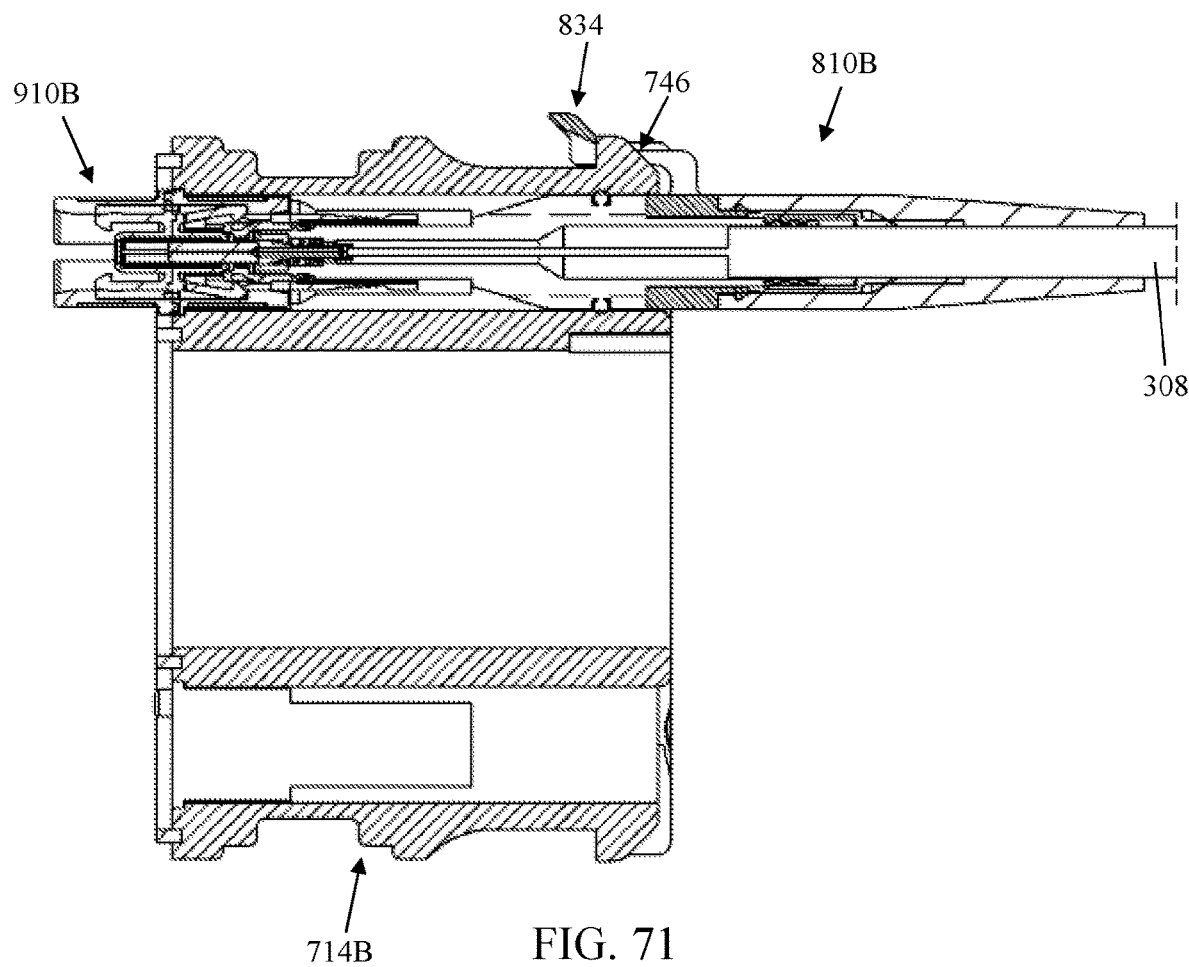
FIG. 71 is a section taken through line 71-71 of FIG. 70.
Figure 72:
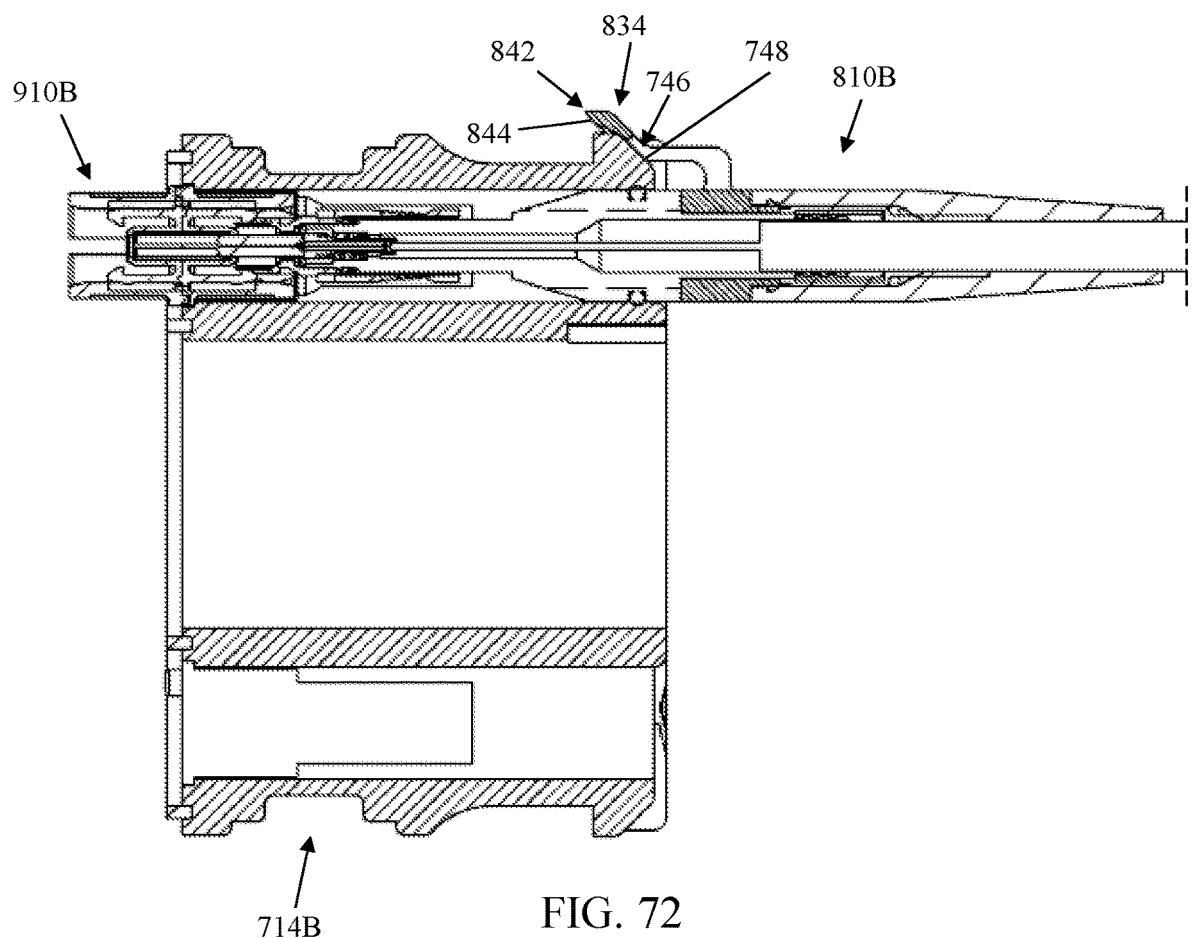
FIG. 72 is a section similar to FIG. 71, but showing a latch of the connector of FIG. 64 being deflected as the connector is pushed into a port housing of the multiport device of FIG. 40.
Figure 73:
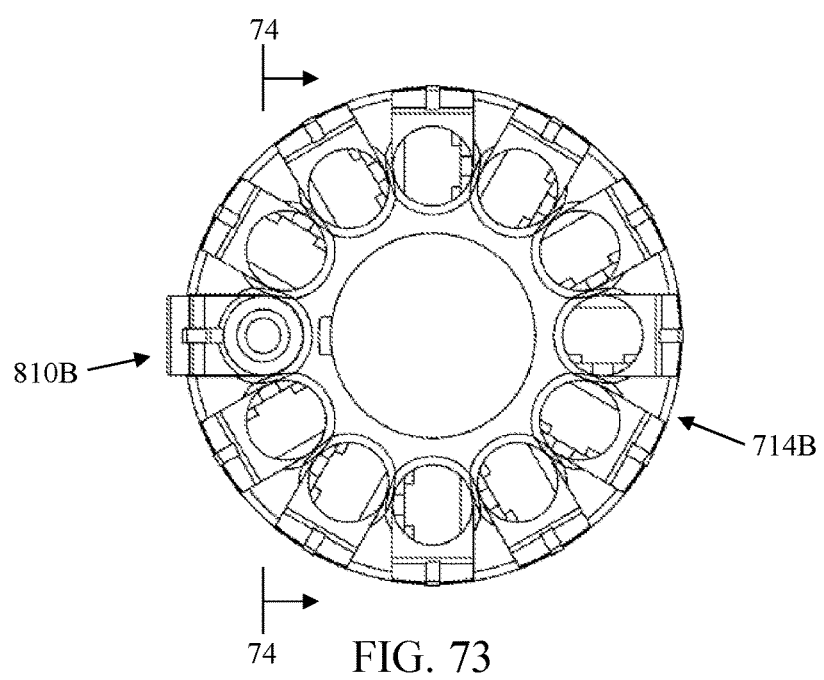
FIG. 73 is a front view of the SN connector and port housing of FIG. 70.
Figure 74:
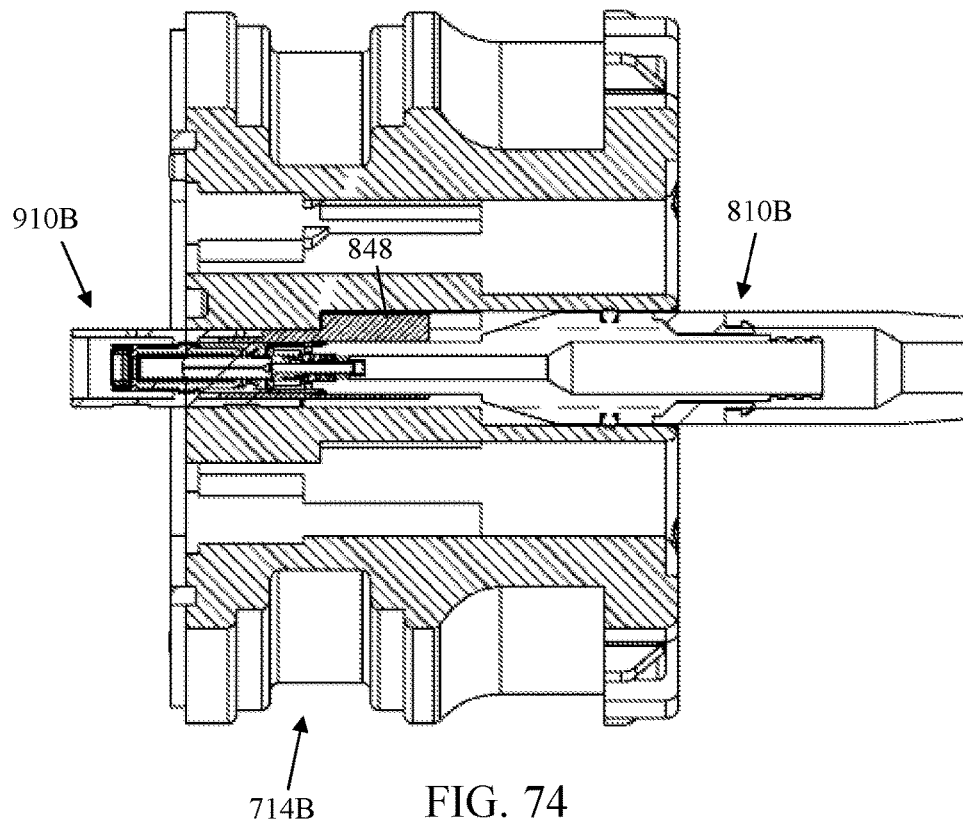
FIG. 74 is a section taken through line 74-74 of FIG. 73.
Figure 75:
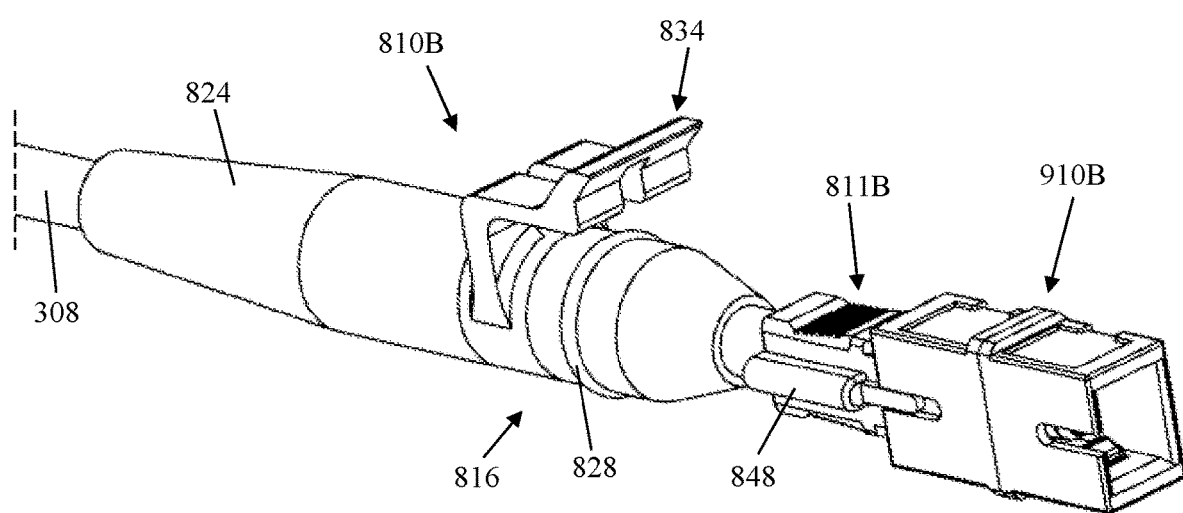
FIG. 75 is a perspective of the SN connector of FIG. 64 attached to the adapter of FIG. 69.
Figure 76:
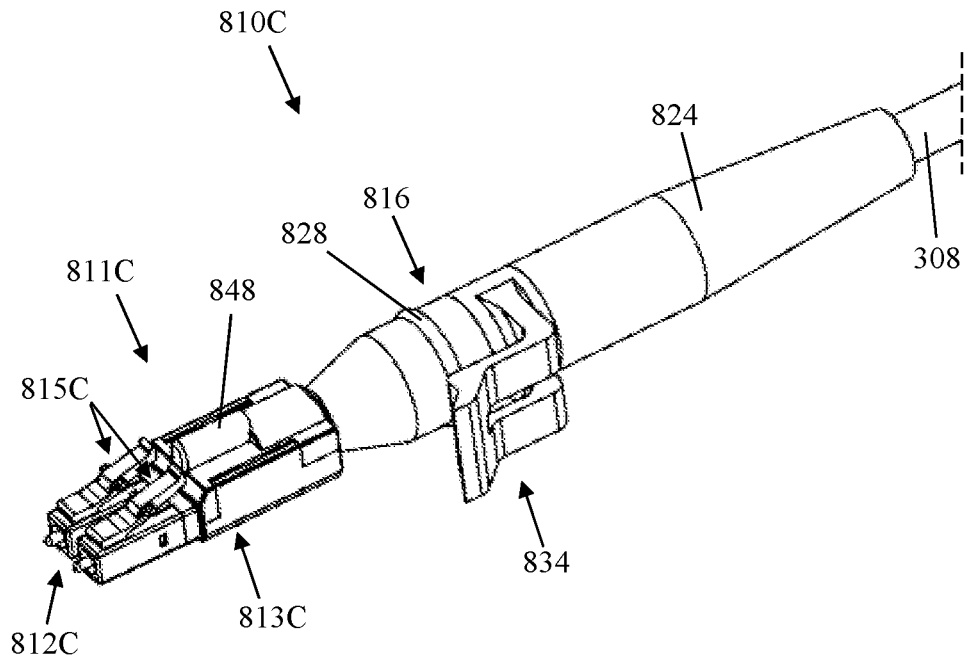
FIG. 76 is a perspective of an SN (duplex) connector.
Figure 77:
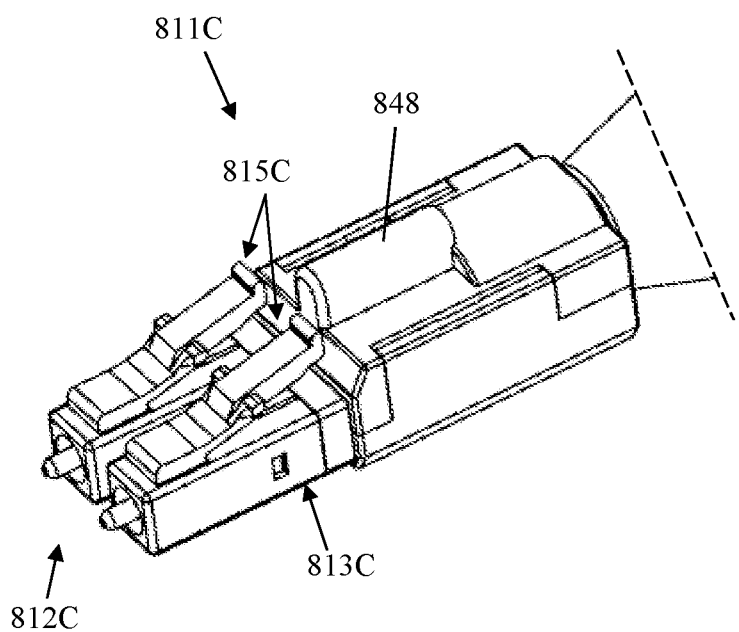
FIG. 77 is an enlarged, fragmentary perspective of a connection end of the connector of FIG. 76.
Figure 78:
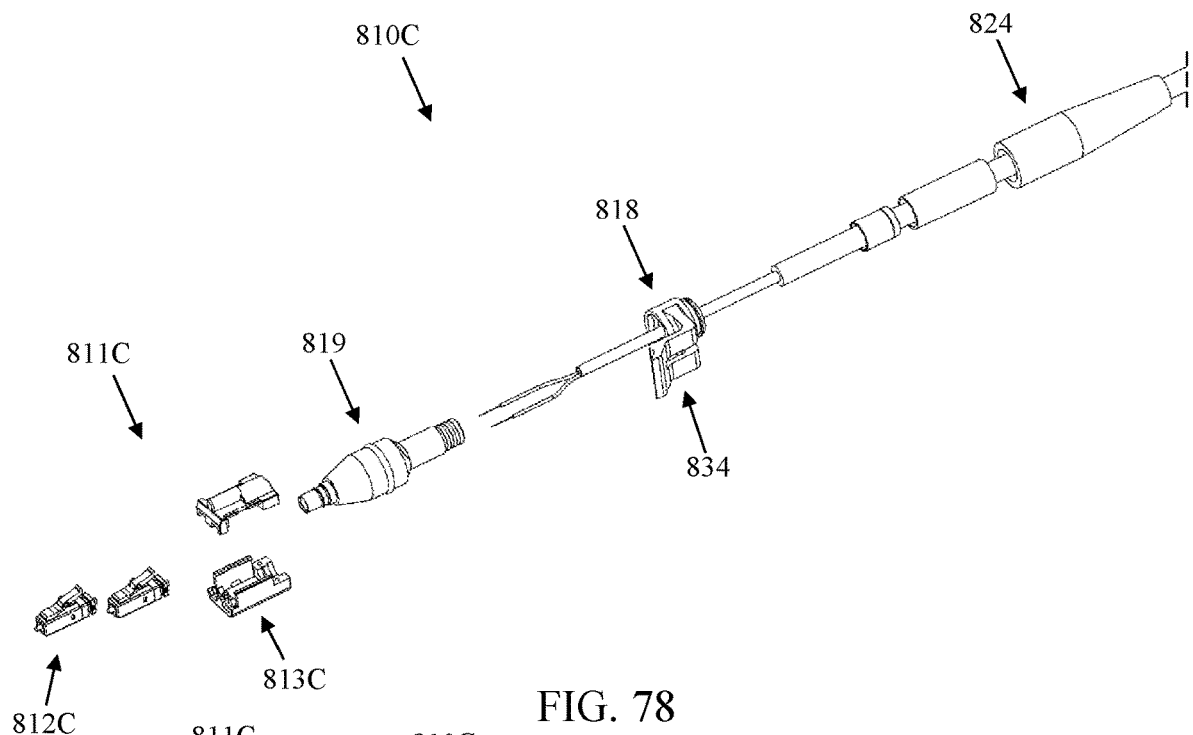
FIG. 78 is an exploded perspective of the SN connector of FIG. 76.
Figure 79:
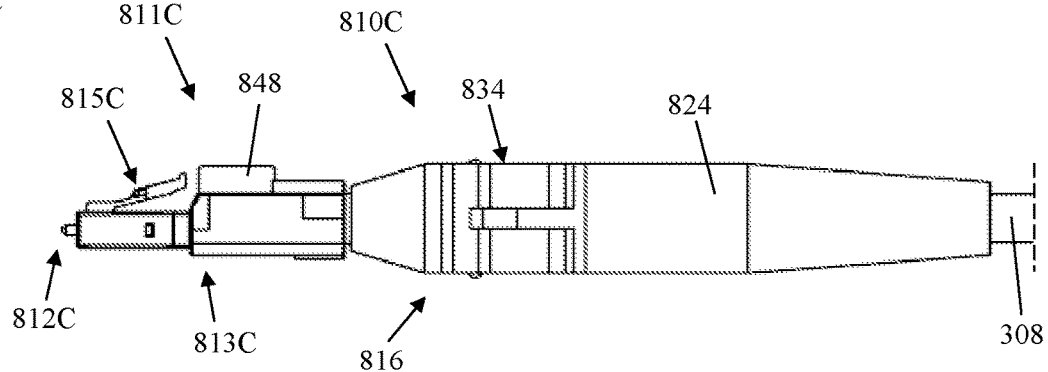
FIG. 79 is a side view of the SN connector of FIG. 76.
Figure 80:
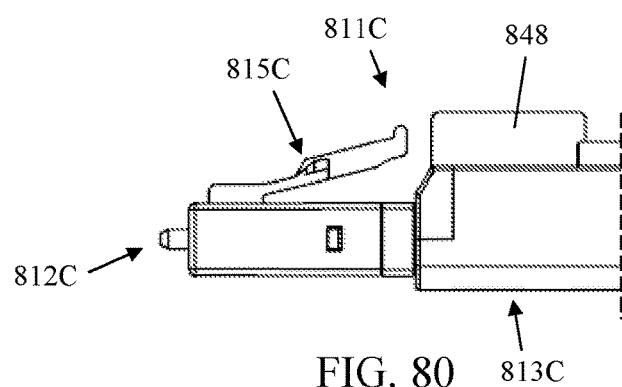
FIG. 80 is an enlarged, fragmentary view of FIG. 79.
Figure 81:
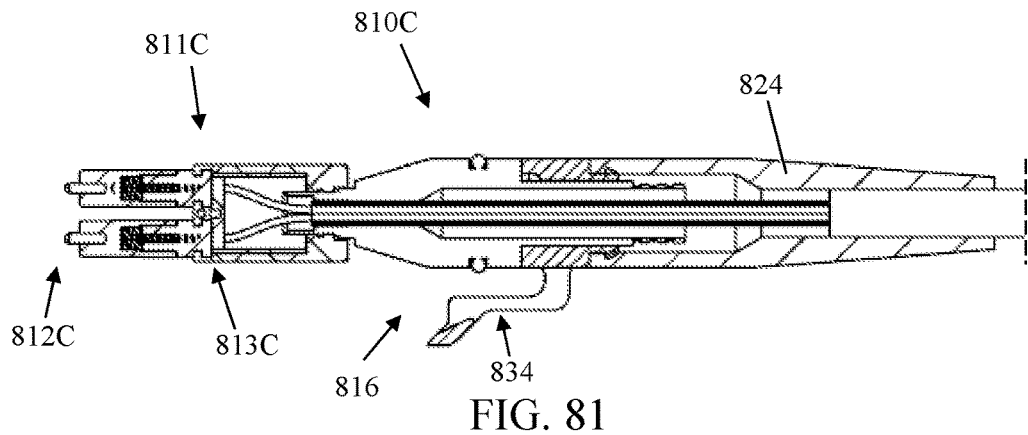
FIG. 81 is a vertical section of the connector of FIG. 76.

Referring to FIGS. 64-75, another embodiment of a connector according to the present disclosure is generally indicated at 810B. Connector 810B is generally analogous to connector 810A and, thus, for ease of comprehension, where similar, analogous or identical parts are used, identical reference numerals are employed. Accordingly, unless clearly stated or indicated otherwise, the descriptions herein regarding connector 810A also apply to connector 810B. For example, the deflection surface 748 of the latch retainer 746 engages the sloped surface 844 of the wedge engagement tip 842 to deflect the latch 834 as the connector 810B is mated with a port 716 of the multiport device 710, as shown in FIGS. 71 and 72.

In this embodiment, the connector end assembly 811B of the connector 810B comprises a SC connector end assembly. The connector end housing 813B comprises a SC connector end housing and the ferrule assembly 812B comprises a SC ferrule assembly. Thus, in this embodiment, the connector 810B may be referred to as a SC connector (e.g., SC optical connector).

Figure 64:
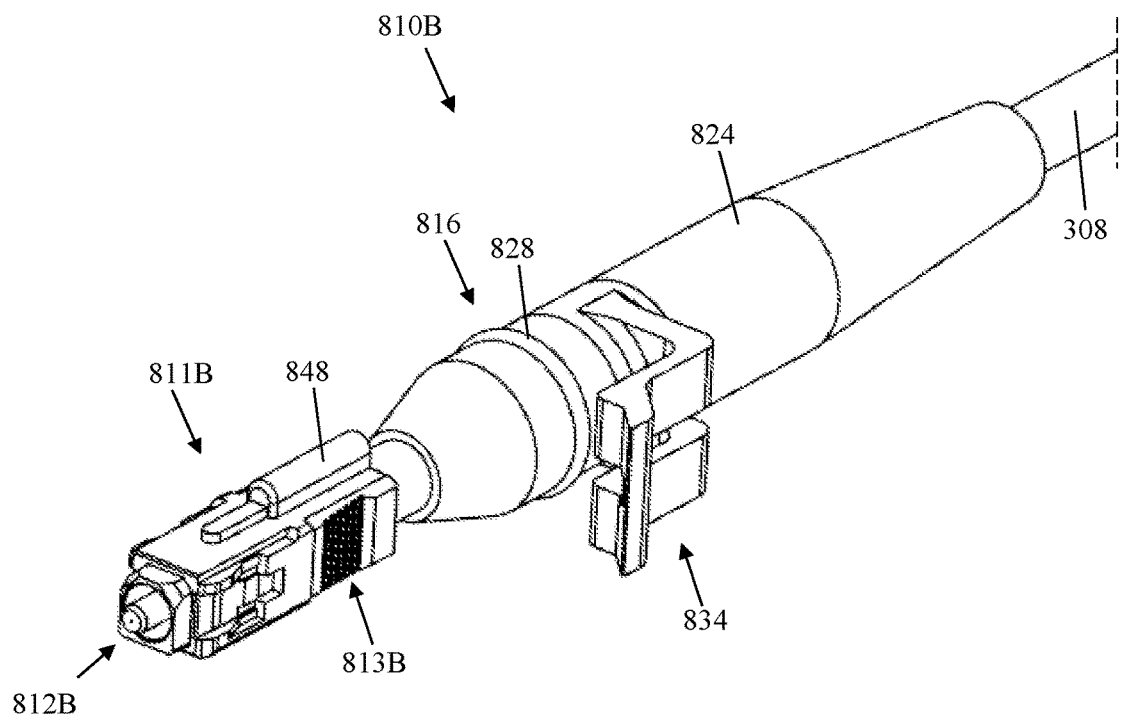
FIG. 64 is a perspective of an SC connector.
Figure 65:
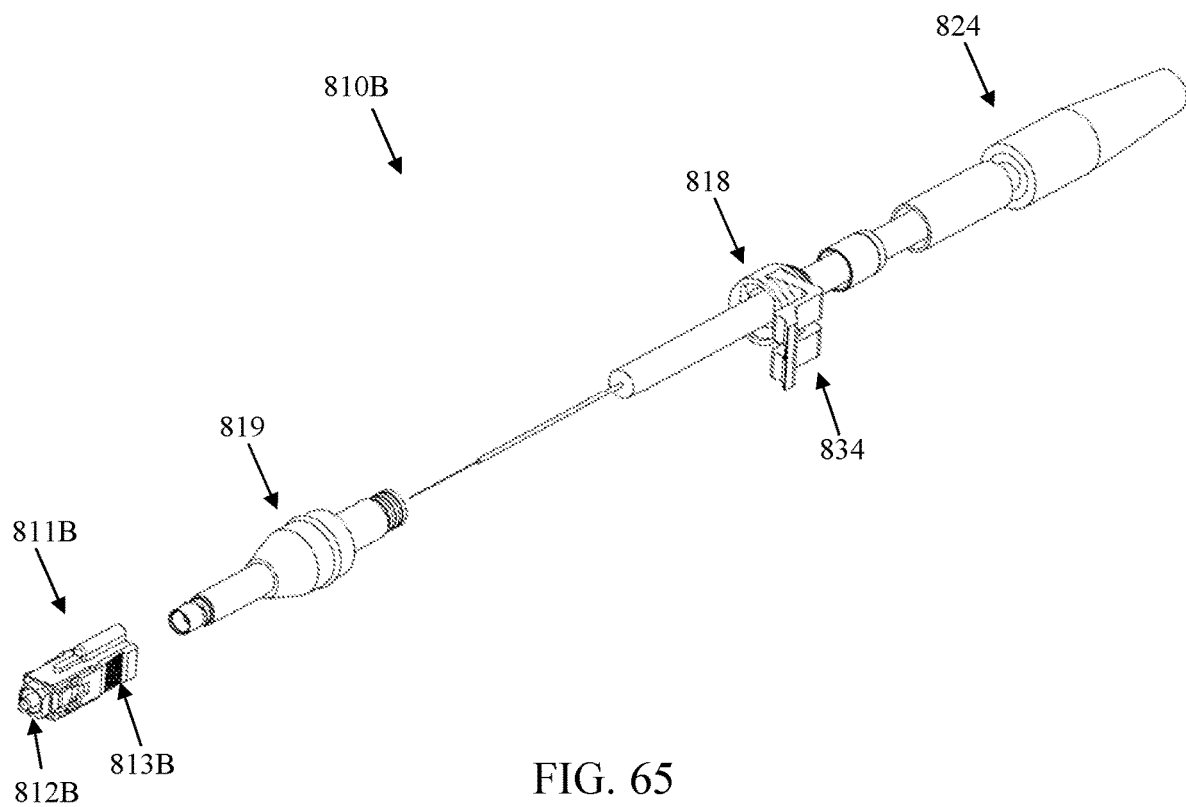
FIG. 65 is an exploded perspective of the SC connector of FIG. 64.
Figure 66:
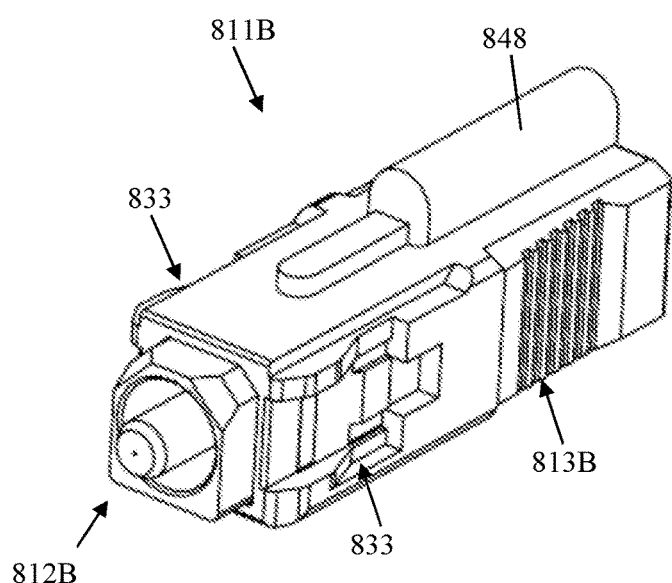
FIG. 66 is an enlarged perspective of an end portion of the SC connector of FIG. 64.
Figure 67:
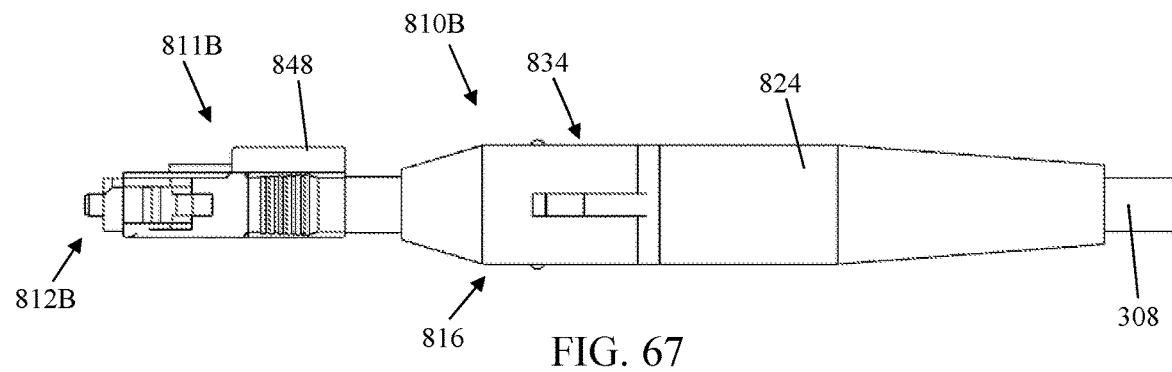
FIG. 67 is a top view of the connector of FIG. 64.
Figure 68:
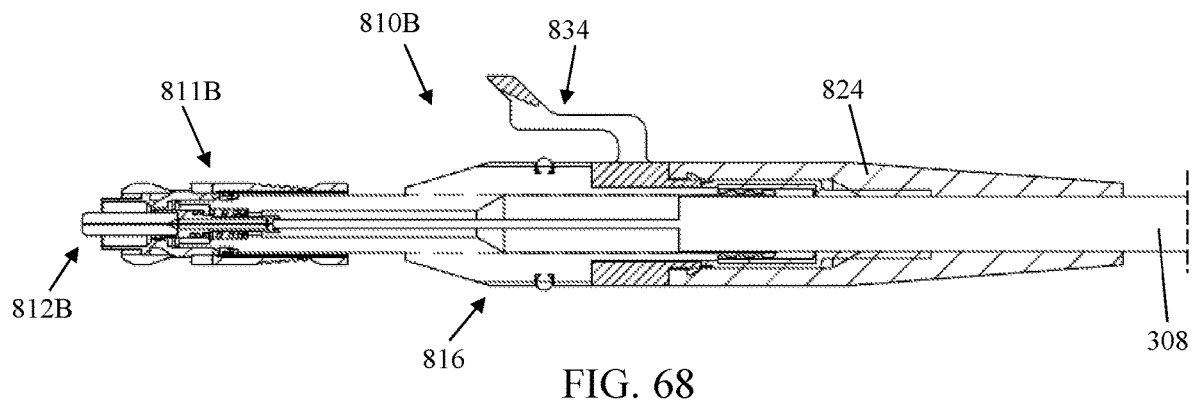
FIG. 68 is a vertical section of the connector of FIG. 64.
Figure 69:
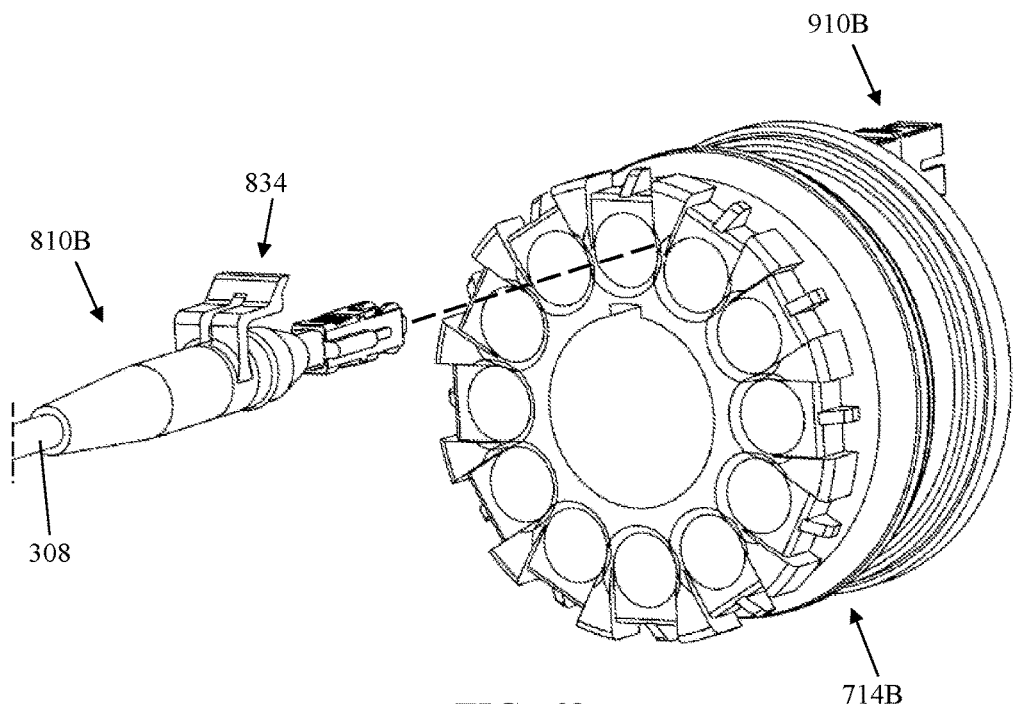
FIG. 69 is an exploded view of the SN connector of FIG. 64, a port housing of the multiport device of FIG. 40, and an adapter useable with the connector of FIG. 64.
Figure 70:
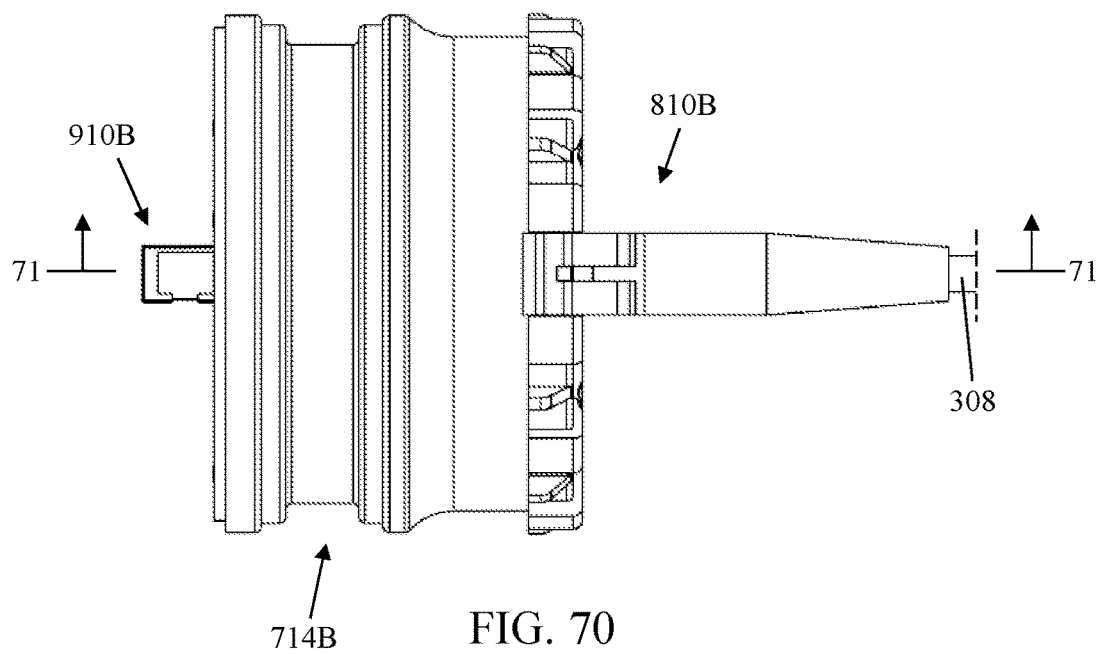
FIG. 70 is a top view of the SN connector of FIG. 64 and the adapter of FIG. 69 attached to a port housing of the multiport device of FIG. 40.

To go with the SC connector 810B, the multiport assembly includes a corresponding adapter 910B (FIG. 69). Specifically, the adapter 910B comprises a SC adapter (e.g., a SC fiber optic adapter). The adapter 910B is of conventional or known construction and thus a detailed description is omitted herein. Generally, the adapter 910B receives ferrule assemblies 812B though opposite ends of the adapter so that the ferrule assemblies operatively engage each other within the adapter to form the communication connection (e.g., fiber optic connection). The adapter 910B also includes structural features (e.g., internal latches) that allow it to latch to the connection end housing 813B, to secure the ferrule assembly 812B to the adapter. As mentioned above, the adapter 910B is receivable by the receptacle receivers 754 of the multiport device 710. Thus, when the both the adapter 910B and the connector 810B are coupled to the multiport device 710, the ferrule assembly 812B (e.g., a front end thereof) of the connector is disposed in the adapter, as shown in FIGS. 71 and 64.

The connector end assembly 811B is generally of conventional or known construction (except for the rotational alignment key 848). Thus, the connector end housing 813B and the ferrule assembly 812B are generally of conventional construction. In this embodiment, the connector end housing 813B includes one or more detents 833 (FIG. 66) that are configured to be engaged by the internal latches of the adapter 910B. Thus, in this embodiment, the connector end assembly 811B does not include a latch. In this embodiment, the latching and unlatching of the internal latches of the adapter 910B with the detents 833 occurs with application of a sufficient amount of manual force. For example, the user applies a sufficient amount of manual force to the connector 810B in a forward direction to insert the connector end housing 813B into the adapter 910B (to engage the latches with the detents 833). Likewise, the user applies a sufficient amount of manual force to the connector 810B in a rearward direction to remove the connector end housing 813B from the adapter 910B (to disengage the latches with the detents 833). The internal latches of the adapter 910B are resiliently biased toward the latching position, such that the latches are deflected (as a result of the application of the manual force) as the connector end housing 813B is inserted into or removed from the adapter. Otherwise, the adapter 910B generally operates and functions in a similar manner to adapter 910A.

Figure 84:
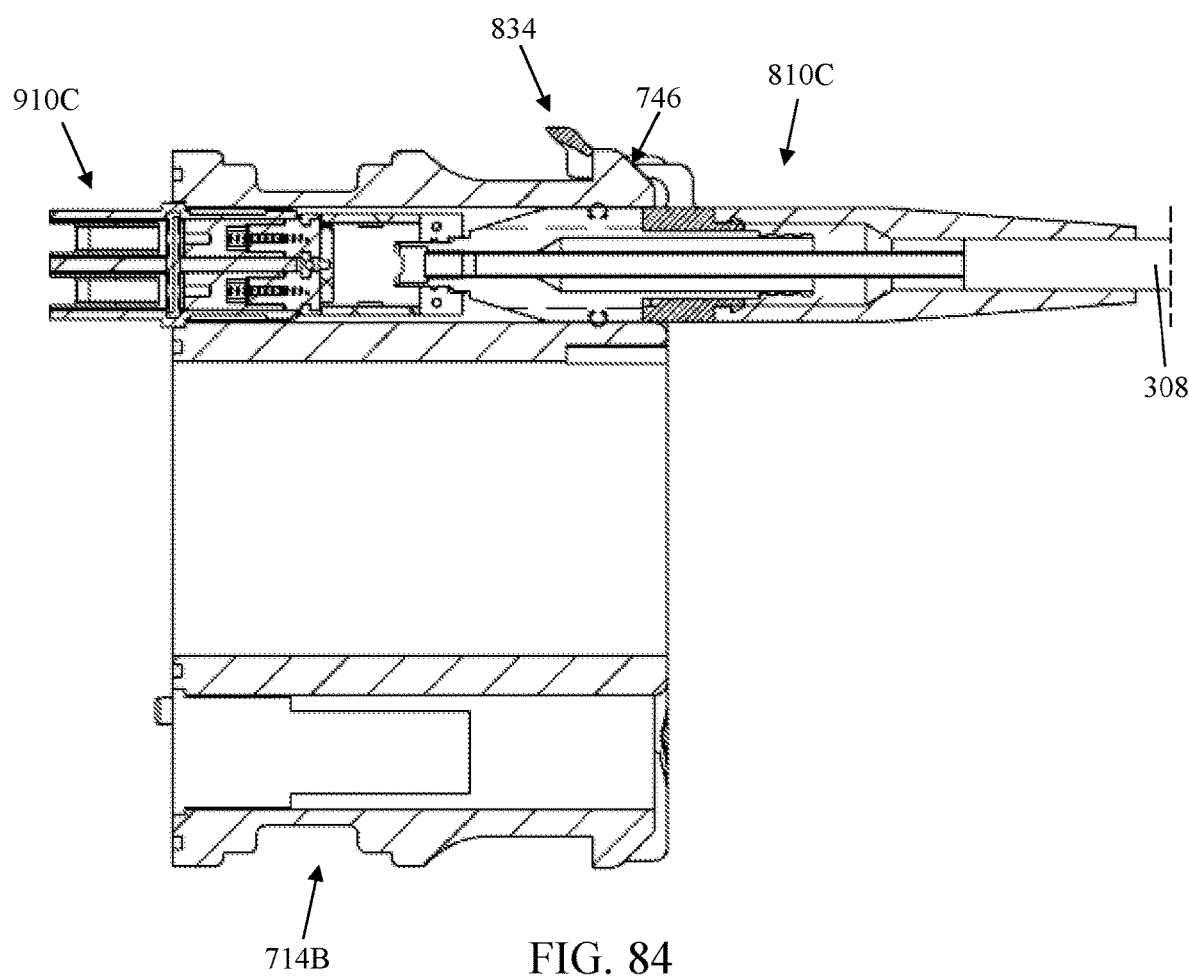
FIG. 84 is a section taken through line 84-84 of FIG. 83.
Figure 85:
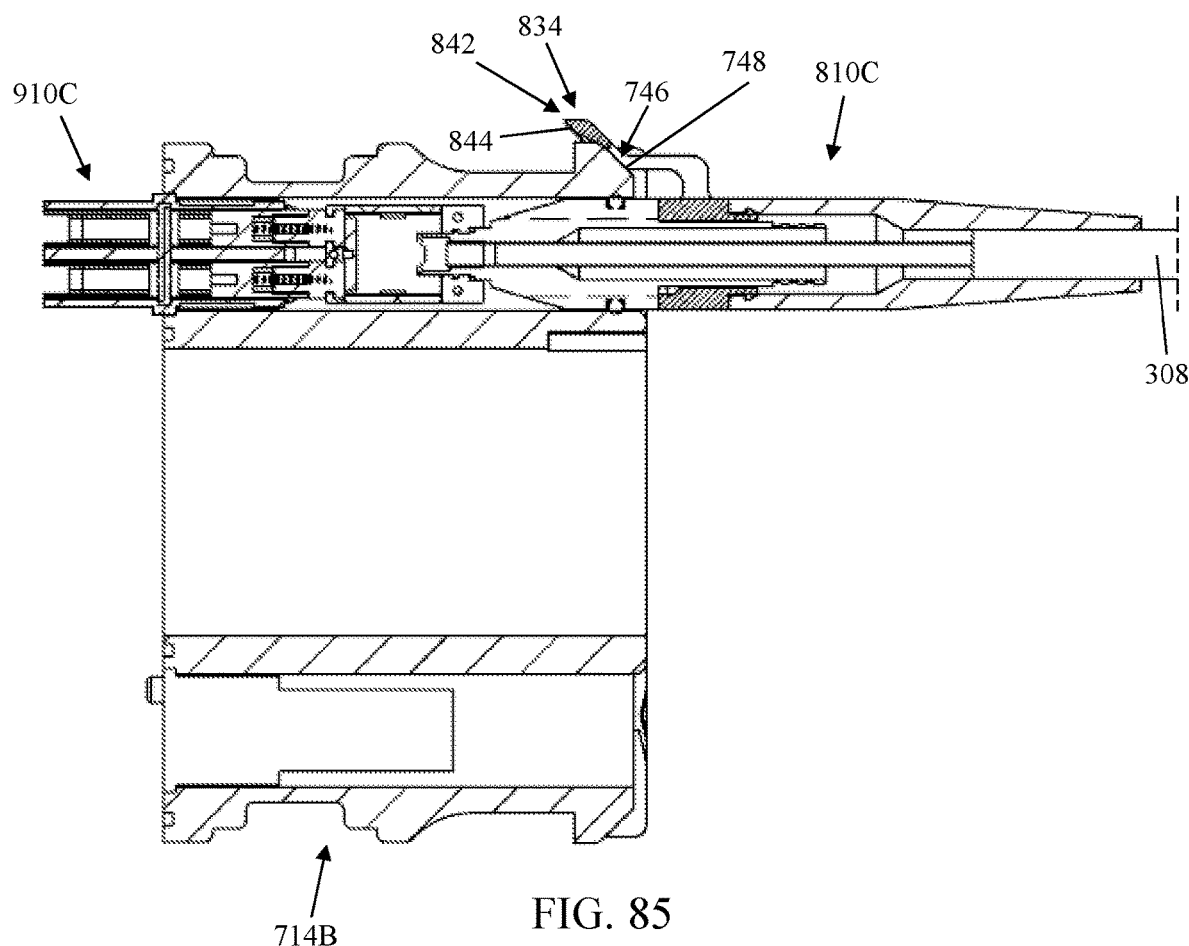
FIG. 85 is a section similar to FIG. 84, but showing a latch of the SN connector of FIG. 76 being deflected as the connector is pushed into a port housing of the multiport device of FIG. 40.
Figure 86:
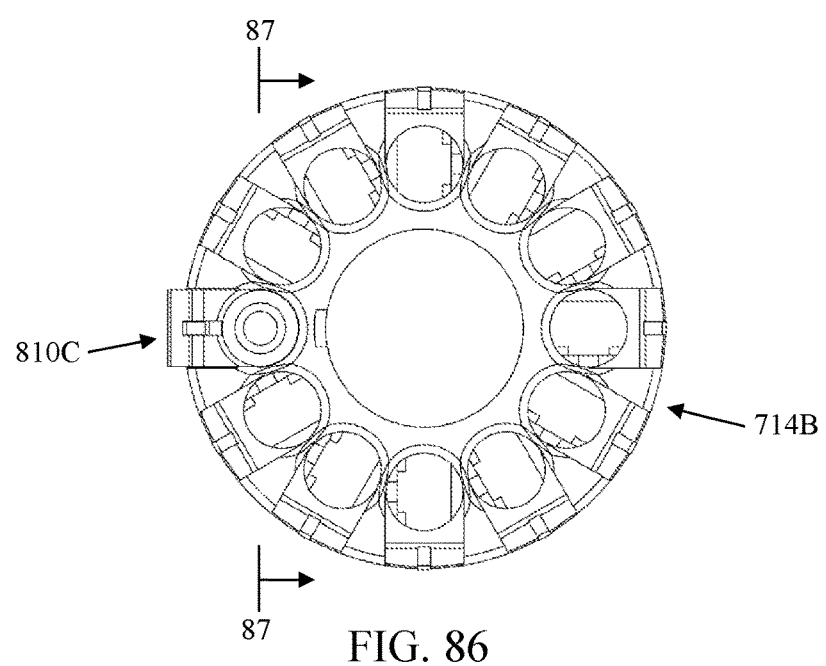
FIG. 86 is a front view of FIG. 83.

Referring to FIGS. 76-90, another embodiment of a connector according to the present disclosure is generally indicated at 810C. Connector 810C is generally analogous to connector 810A and, thus, for ease of comprehension, where similar, analogous or identical parts are used, identical reference numerals are employed. Accordingly, unless clearly stated or indicated otherwise, the descriptions herein regarding connector 810A also apply to connector 810C. For example, the deflection surface 748 of the latch retainer 746 engages the sloped surface 844 of the wedge engagement tip 842 to deflect the latch 834 as the connector 810C is mated with a port 716 of the multiport device 710, as shown in FIGS. 84 and 85.

In this embodiment, the connector end assembly 811C of the connector 810C comprises a SN (e.g., duplex LC) connector end assembly. The connector end housing 813C comprises a SN connector end housing and the ferrule assembly 812C comprises a SN ferrule assembly. Thus, in this embodiment, the connector 810C may be referred to as a SN connector (e.g., SN optical connector).

Figure 82:
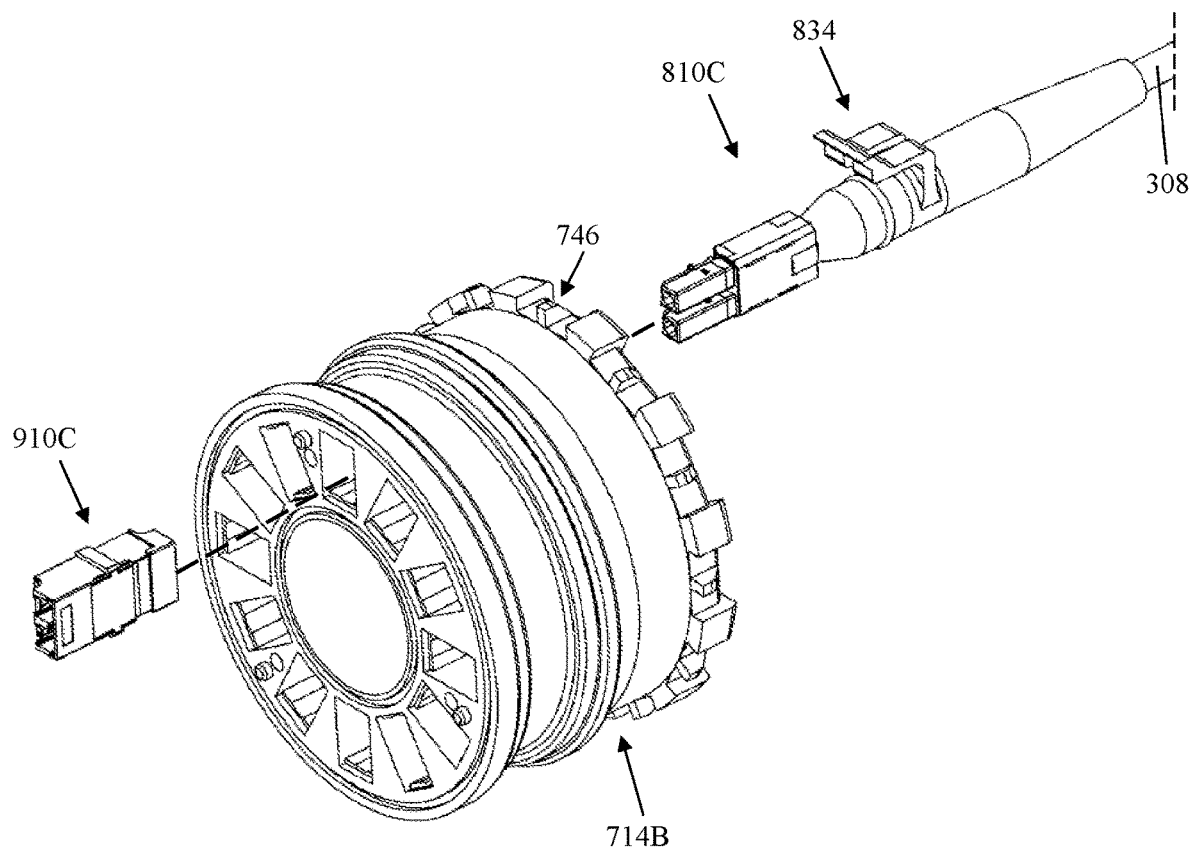
FIG. 82 is an exploded view of the SN connector of FIG. 76, a port housing of the multiport device of FIG. 40, and an adapter useable with the SN connector of FIG. 76.
Figure 83:
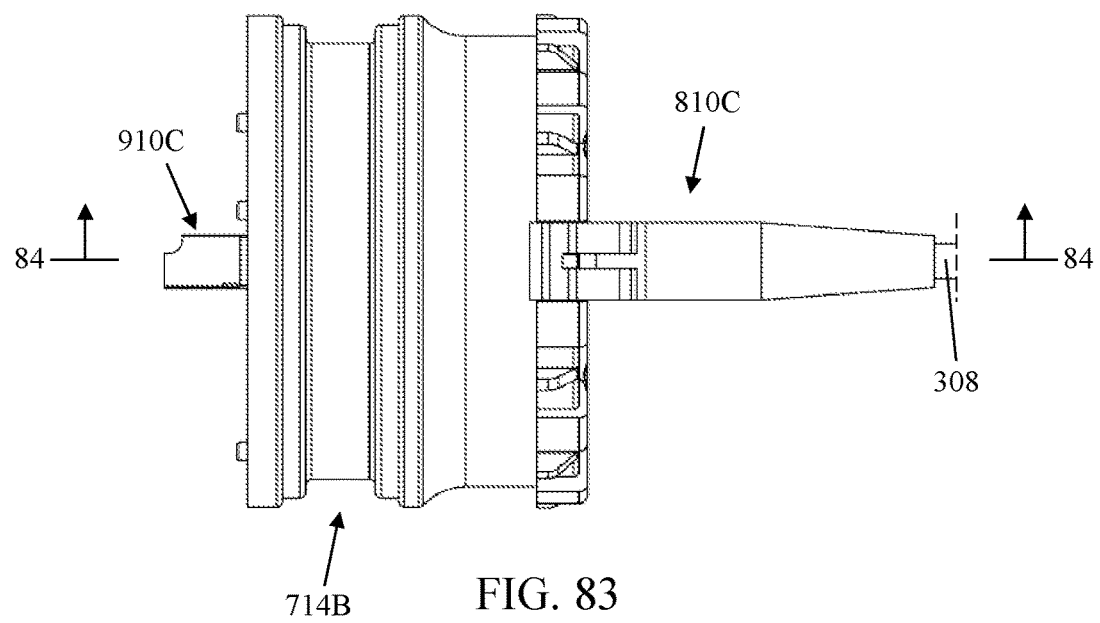
FIG. 83 is a top view of the SN connector of FIG. 76 and the adapter of FIG. 82 attached to a port housing of the multiport device of FIG. 40.
Figure 87:
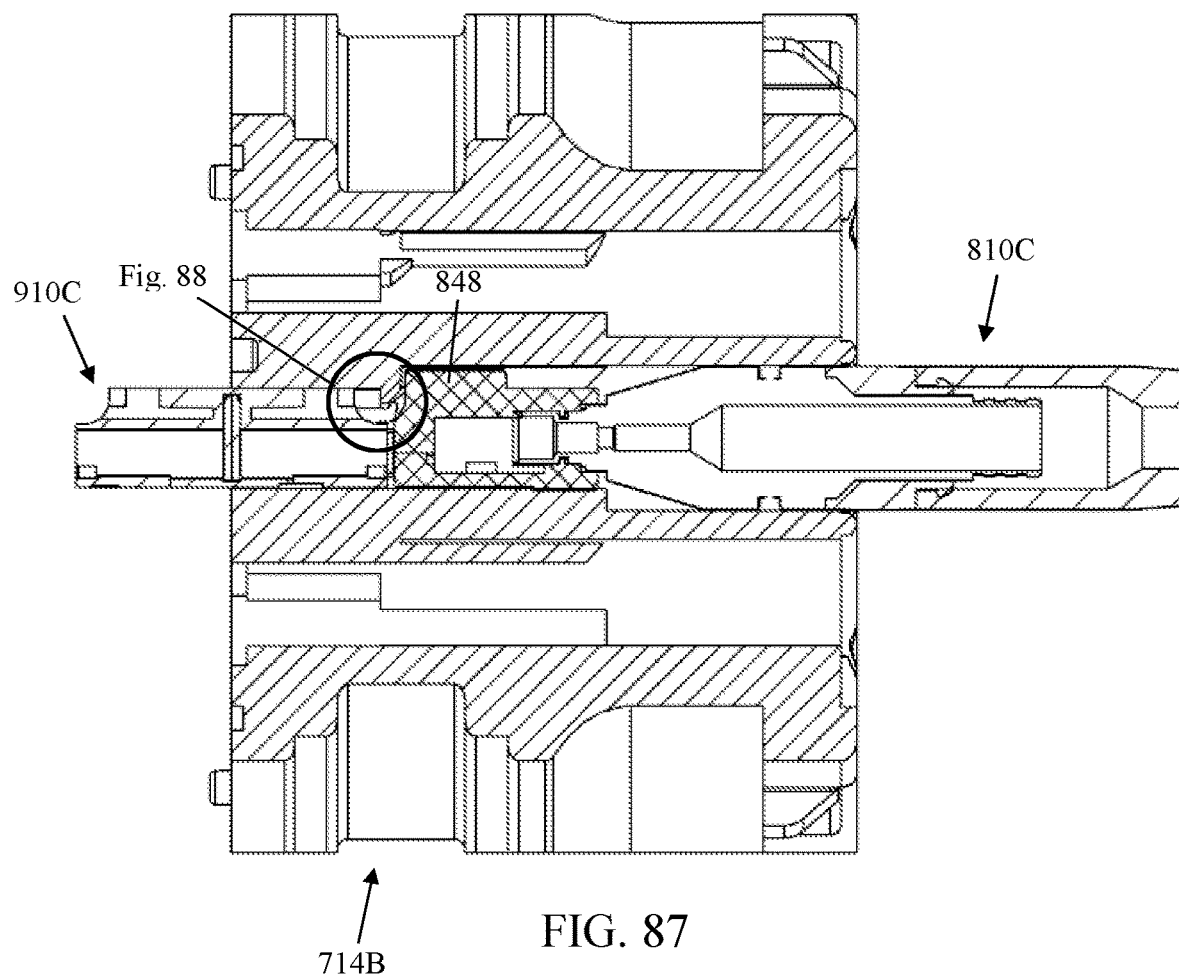
FIG. 87 is a section taken through line 87-87 of FIG. 86.

To go with the SN connector 810C, the multiport assembly includes a corresponding adapter 910C (FIG. 82). Specifically, the adapter 910C comprises a SN adapter (e.g., a SN fiber optic adapter). The adapter 910C is of conventional or known construction and thus a detailed description is omitted herein. Generally, the adapter 910C receives ferrules assemblies 812C though either end such that the ferrule assemblies engage each other within the adapter to form the communication connection (e.g., fiber optic connection). The adapter 910C also includes structural features (e.g., recesses) that allow latches to latch to the adapter, to secure the ferrule assembly 812C to the adapter. As mentioned above, the adapter 910C is receivable by the receptacle receivers 754 of the multiport device 710. Thus, when the both the adapter 910C and the connector 810C are coupled to the multiport device 710, the ferrule assembly 812C (e.g., a front end thereof) of the connector is disposed in the adapter, as shown in FIGS. 84 and 87.

Figure 88:
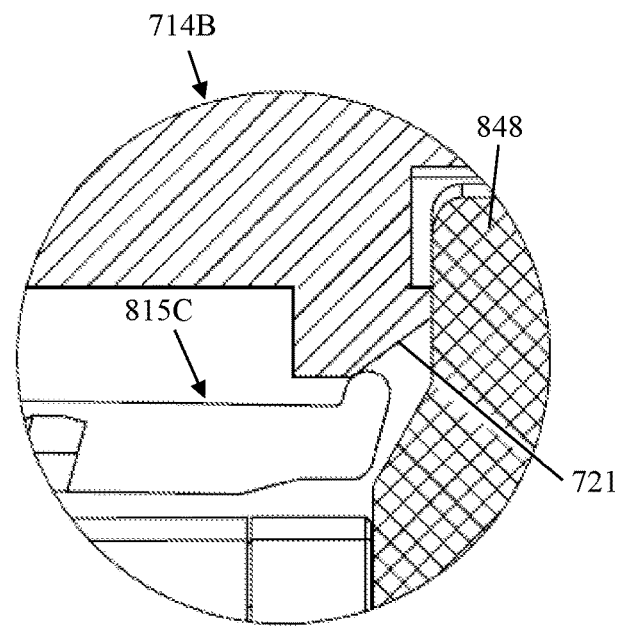
FIG. 88 is an enlarged fragment of FIG. 87, with the adapter of FIG. 82 hidden from view to reveal interior details.
Figure 89:
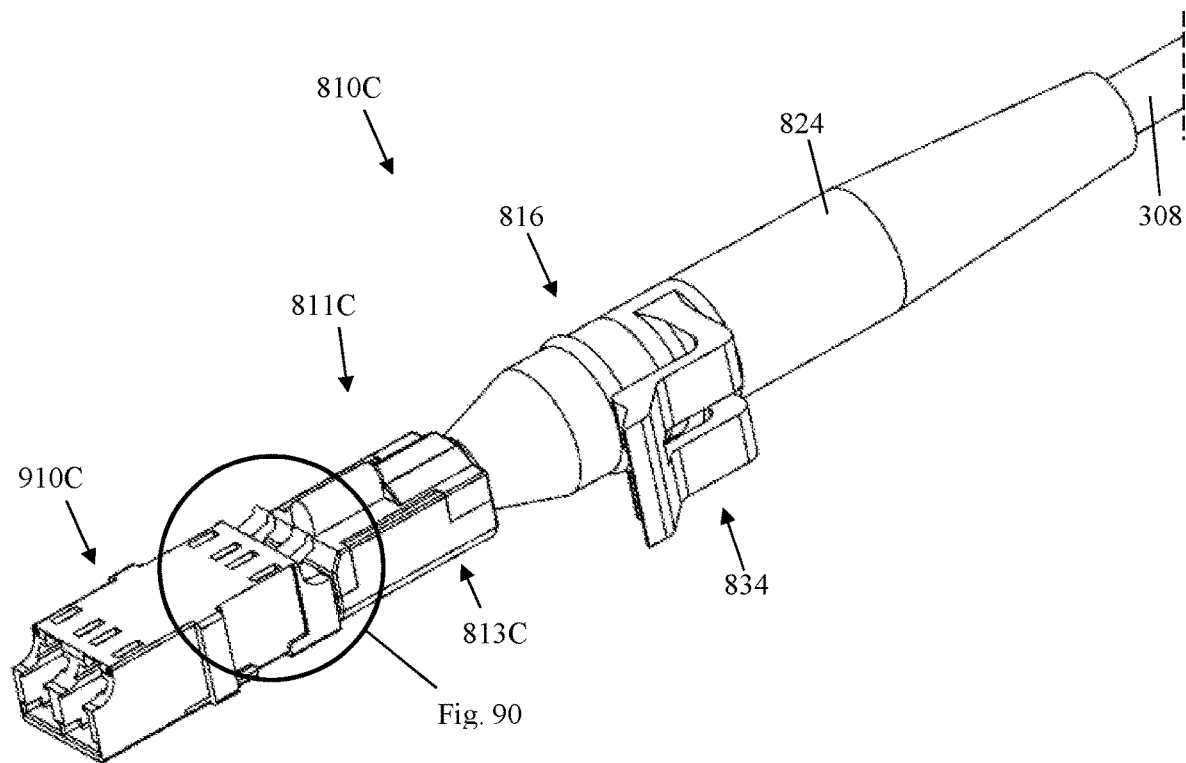
FIG. 89 is a perspective of the SN connector of FIG. 76 attached to the adapter of FIG. 82.
Figure 90:
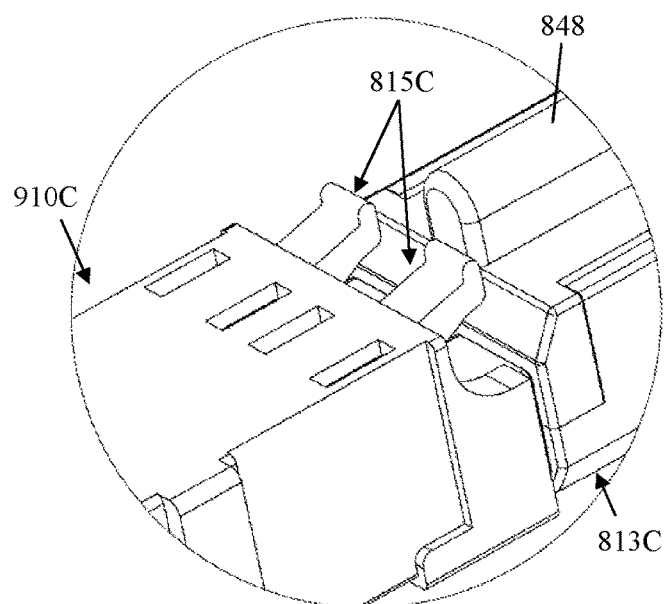
FIG. 90 is an enlarged fragment of FIG. 89.
Figure 91:
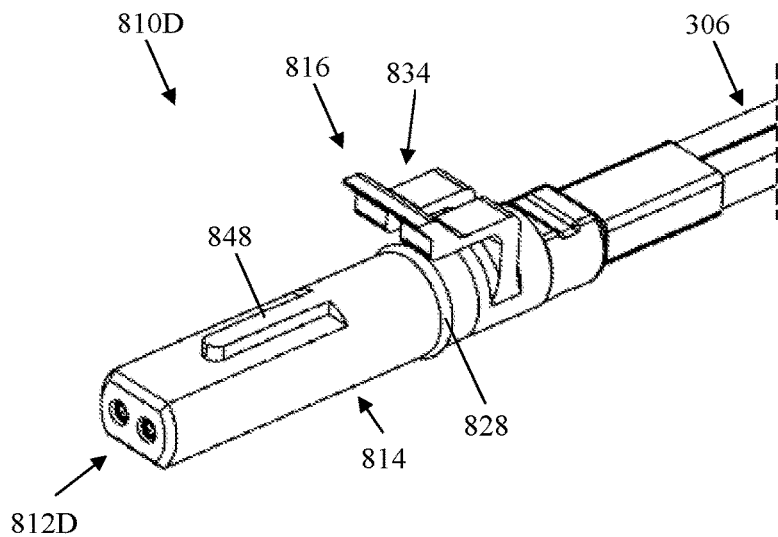
FIG. 91 is a front perspective of an electrical connector according to another embodiment of the present disclosure.
Figure 92:
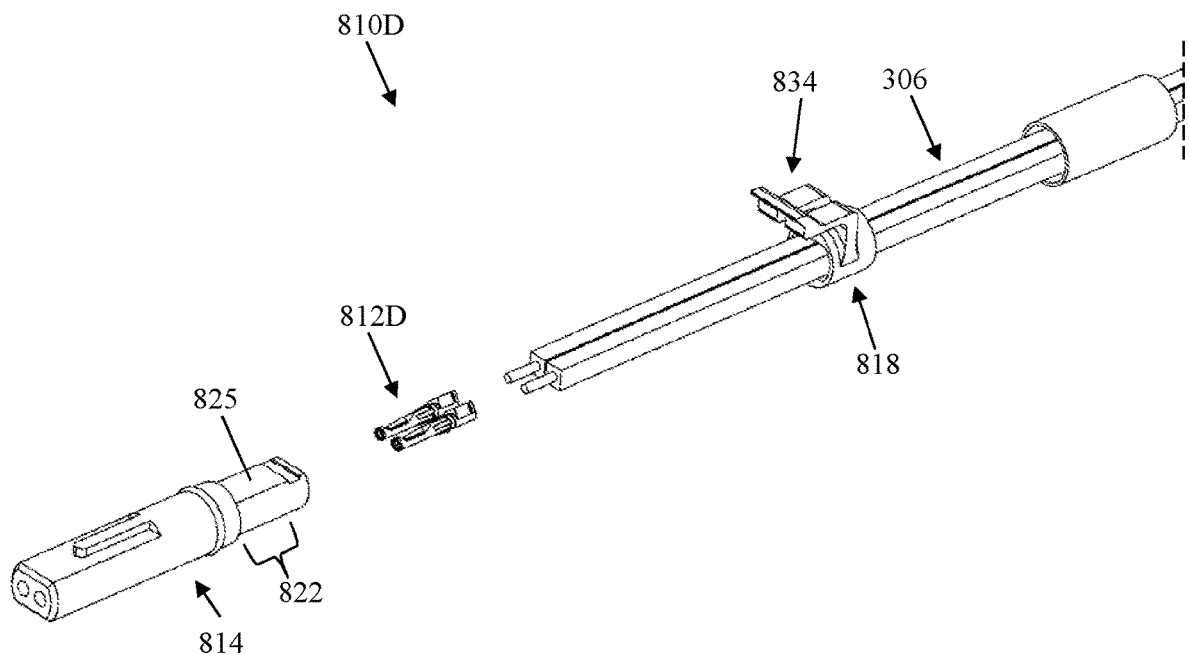
FIG. 92 is an exploded view of the electrical connector of FIG. 91.
Figure 93:
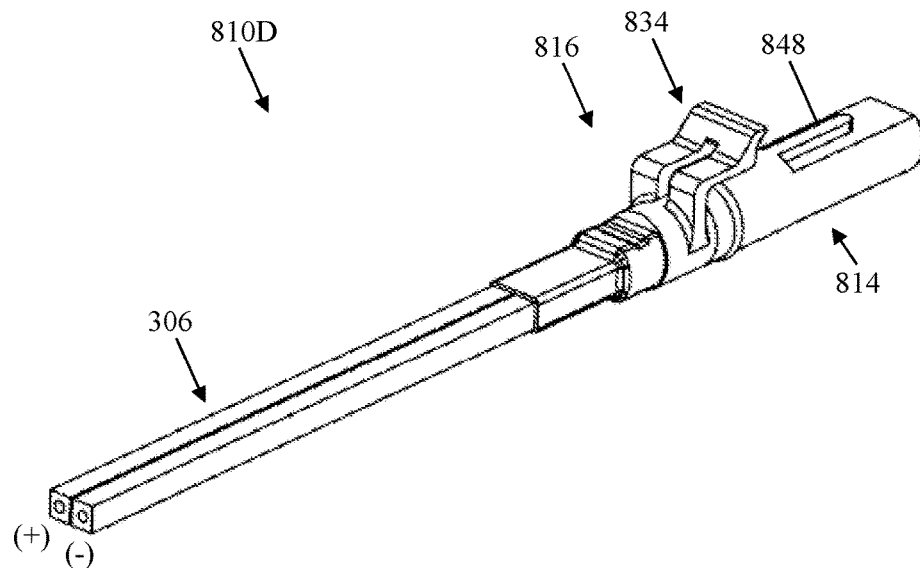
FIG. 93 is a rear perspective of the electrical connector of FIG. 91.

The connector end assembly 811C is generally of conventional or known construction (except for the rotational alignment key 848). Thus, the connector end housing 813C and the ferrule assembly 812C are generally of conventional construction. In this embodiment, the connector end housing 813C includes two moveable latches 815C (broadly, one or more latches). The latches 815C (broadly, a latch mechanism) are generally of conventional construction and are configured to latch onto the adapter 910C, as shown in FIGS. 89 and 90. The latches 815C are generally identical. The latches 815C are resiliently deflectable and yieldably biased to a latching position (FIGS. 89 and 90) relative to the ferrule assembly 812C (broadly, the rest of the connector end assembly 811C). The latches 815C are each movable (e.g., laterally deflectable) relative to the ferrule assembly 813C from the latching position to an unlatching position (FIG. 88). The unlatching position is inward or closer to the connector end housing 813C than the latching position. The connector end assembly 811C is configured to be operatively latched in an adapter 910C (e.g., a specific type of adapter) to make a communication connection to the ferrule assembly 812C (e.g., make a communication connection with another connector 810C). The latches 815C are configured to retain the connector end assembly 811C in the adapter 910C when in the latching position. The latch 815C is configured to move relative to the ferrule assembly 812C from the latching position to the unlatching position to unlatch the connector end assembly 811C from the adapter 910C.

As mentioned above, each port 716 of the multiport device 710 is configured to defeat the latches 815C of the connector 810C. The port body 712 of the multiport device 710 is configured to engage the connector 810C to retain the movable latches 815C in the unlatching positions when the connector is plugged into a port 716. As mentioned above, each port 716 can include one or more latch defeating elements to defeat or position the latches 815C in the unlatching position when the connector 810C is coupled to the port 716 and the ferrule assembly 812C is disposed in the adapter 910C. Broadly, each port 716 can includes one or more latch defeating elements to defeat the latches of different types of connectors 910. By defeating the latches 815C of the connector 810C, the latches (broadly, the connection end assembly 811C) do not latch onto the adapter 910C. This way the connector 810C can be disconnected from the port 716 (e.g., the ferrule assembly 812C can be withdrawn from the adapter 910C). If the port 716 of the multiport device 710 did not defeat the latches 815C, the latches would secure the connector 810C to the communication port 910C, thereby preventing the connector from being able to withdraw the ferrule assembly 812C from the adapter (because the latch would not be accessible within the port). If not defeated, the latches 815C would otherwise automatically latch onto the adapter 910C because the latches are biased in the latching position (e.g., manual intervention is not required to have the latch connect to the adapter).

In this embodiment, the latch defeating element comprises a ramp or sloped surface 721 (FIG. 88) of each port 716. The ramp 721 is arranged to engage the latches 815C of the connector 810C when the connector is inserted into and coupled to the port 716. In other embodiments, each port may include multiple ramps, one for each latch 815C of the connector 810C. As the connector 810C is inserted into the port 716, the ramp 721 engages the latches 815C (e.g., an outer, free end thereof), thereby pushing latches inward toward the connector end housing 813C (e.g., the unlatching position) as the connector is pushed further into the port. When the connector 810C is coupled to the port 716, the latches 815C are engaged by the ramp 721 and held in the unlatching position, thereby preventing the latches from coupling to the adapter 910C.

Referring to FIGS. 91-95, another embodiment of a connector according to the present disclosure is generally indicated at 810D. Connector 810D is generally analogous to connector 810A and, thus, for ease of comprehension, where similar, analogous or identical parts are used, identical reference numerals are employed. Accordingly, unless clearly stated or indicated otherwise, the descriptions herein regarding connector 810A also apply to connector 810D.

In this embodiment, the ferrule assembly 812D comprises an electrical contact assembly (containing one or more electrical ferrules or contacts). Thus, in this embodiment, the connector 810D may be referred to as an electrical connector (e.g., an electrical power plug). The connector 810D is attach to an end of an electrical cable 306. The connector 810D includes a connector housing 814 that supports the ferrule assembly 812D. The connector housing 814 extends along a longitudinal axis. The connector housing 814 extends from a front end portion to a rear end portion. The cable 306 extends rearward from the rear end portion. In the illustrated embodiment, the ferrule assembly 812D is disposed at the forward end of the connector housing 814 and within the connector housing. The ferrule assembly 812D (e.g., one or more electrical contacts) are exposed through the front end of the connector housing 814 for making a communication connection (e.g., an electrical connection). The seal 828 is disposed on the connector housing 814. The connector housing 814 defines an annular seal groove sized and shaped to receive the seal 828. In the embodiment, the port engagement portion 816 does not include a port insert body. Instead, the connector housing 814 includes a back post 825 to which the port coupling body 818 attaches. When attached, the port coupling body 818 extends along the longitudinal axis along a rear end portion (e.g., back post 825) of the connector housing 814. The back post 825 and the port coupling body 818 each have flats on opposite sides thereof that engage each other to inhibit rotation of the two components relative to each other and permit the port coupling body to be coupled to the connector housing 814 in only one orientation. In this embodiment, the rotational alignment key 848 and the latch 834 are both at the same circumferential alignment position about the longitudinal axis of the connector housing 814.

To go with the electrical connector 810D, the multiport assembly includes a corresponding adapter 910D (FIG. 95) and corresponding port housings 714' that have receptacle receivers 754 that receive the adapter 910D. In other embodiment, the adapter 910D may have a size and shape to be used with the communication receivers 754 of port housings 714A, 714B. In this embodiment, the adapter 910D comprises an electrical adapter (e.g., an electrical adapter or power adapter). The adapter 910D includes a body 912 supporting two or more electrical contacts or pins 914 (e.g., power pins). For example, in the illustrated embodiment, the adapter 910D includes four pins 914A-D, although more or fewer pins are within the scope of the present disclosure. The body 912 includes a first end portion and a second end portion spaced apart along a longitudinal axis. The adapter 910D includes at least one pin 914 (e.g., a first end pin) at the first end portion of the body and at least one pin (e.g., a second end pin) at the second end portion of the body. The body 912 is sized and shaped to be received by the receptacle receivers 754. The body 912 includes a perimeter extending circumferentially about the longitudinal axis along the longitudinal axis. The perimeter of the body 912 preferably has a perimeter footprint (e.g., a cross-sectional shape of the body) that corresponds with a perimeter footprint of other adapters, such as a standard SC adapter. This allows the adapter 910D and standard adapters to be interchangeable within port housings 714, 714'.

In the illustrated embodiment, the first pin 914A protrudes from the first end portion of the body 912 along a first pin axis. The first pin axis is parallel to the longitudinal axis. The second pin 914B protrudes from the first end portion of the body 912 along a second pin axis. The second pin axis is parallel to the longitudinal axis and is spaced apart from the first pin axis. The third pin 914C protrudes from the second end portion of the body 912 along the first pin axis. The fourth pin 914D protrudes from the second end portion of the body 912 along the second pin axis. One pin 914 on each end portion of the body 912 has a first polarity and the other pin on the same end portion of the body has a second polarity. The pins 914 of the same polarity on each end portion of the body 912 are communicatively (e.g., electrically) coupled together. For example, in the illustrated embodiment, the first and fourth pins 914A, 914D have a first polarity (e.g., a negative polarity) and the second and third pins 914B, 914C have a second polarity (e.g., a positive polarity).

Each set of pins 914 on an end portion of the body 912 is configured to be coupled to (e.g., electrically coupled to) the ferrule assembly 812D of a connector 810D, thereby forming an electrical connection between the adapter 910D and the connector (and between the two connectors coupled to each end of the adapter). Specifically, each pin 914 is received by (e.g., inserted into) one of the female electrical contacts of the ferrule assembly 812D. The adapter 910D does not include structural features (besides the pins 914 which form an interference fit with the electrical contacts of the ferrule assembly 812D) that latch to the connector 910D. According, the connector 810D does not include latches for latching onto the adapter 910D. Otherwise, the adapter 910D generally operates and functions in a similar manner to adapter 910A.

As is now apparent, the connectors 810 are similar to the connectors 310, and thus, were appropriate, the descriptions regarding the connectors 310 may also apply to the connectors 810 (e.g., connector 810A-D). The multiport devices 110, 710 of the multiport assemblies are configured to interchangeable mate with connectors 310, 810. These can be the same style (e.g., optical fiber, electrical, etc.) of connectors or different styles. For example, the multiport devices 110, 710 are configured to interchangeably mate with optical connectors 310, 810A-C (e.g., optical fiber connectors) and electrical connectors 810D. Specifically, the adapters 154, 754 of the multiport device 110, 710 are sized and shaped to selectively receive one of an optical fiber adapter 210A-C, 910A-C for forming an optical connection using a fiber optic connector 310, 810A-C or an electrical adapter 910D for forming an electrical connection using (e.g., with) an electrical connector 810D.

Referring to FIGS. 96-99, another embodiment of an auxiliary port device (broadly, a port device) of the present disclosure is generally indicated at reference numeral 1010. Auxiliary port device 1010 is generally analogous to auxiliary port device 510 and, thus, for ease of comprehension, where similar, analogous or identical parts are used, reference numerals "500" units higher are employed, except when the auxiliary port device 1010 includes similar, analogous or identical parts to that of the multiport device 710 in which case identical reference numerals to that of the multiport device are employed. Accordingly, unless clearly stated or indicated otherwise, the descriptions herein regarding the multiport device 710 and auxiliary port device 510 also apply to auxiliary port device 1010. This embodiment of the auxiliary port device 1010 is configured to be used with the multiport device 710 to expand the capacity of the multiport assembly. Accordingly, the auxiliary port device 1010 is configured to be used with connectors 810.

In this embodiment, the first and second port housings 1014 are similar to the first and second port housings 714 of the multiport device 710, except each port housing of the auxiliary port device 1010 only includes one port 716 and one receptacle receiver 754. Details of the ports 716 and receptacle receivers 754 are described above, and thus the details of these components of the auxiliary port device 1010 are not repeated here. Accordingly, like the multiport device 710, the auxiliary port device 1010 can also be configured to receive a particular type of connector 810 depending upon the adapter 910 coupled to the auxiliary port device. In the illustrated embodiment, a SC adapter 910B is coupled to the auxiliary port device 1010 to configure the auxiliary port device to receive SC connectors 810B, as shown. A MPO adapter 910A, SN adapter 910C, or electrical adapter 910D may be coupled to the auxiliary port device 1010 in other arrangements to receive MPO connectors 810A, SN connectors 810C, or electrical connectors 810D, respectively.

In this embodiment, the auxiliary port device 1010 includes a coupler 1092. The coupler 1092 is configured to releasably coupled the first and second port housings 1014 together. In the illustrated embodiment, the coupler 1092 comprises one or more bolts 1094 (e.g., screws, bolts) that extend through aligned openings in the port housings 1014 and that are secured with nuts 1096. Other configurations of the coupler 1092 are within the scope of the present disclosure. To facilitate the coupling of the first and second port housings 1014 together, each port housing includes an alignment projection 1077 and an alignment recess 1079 (broadly, one of the port housings includes the alignment projection and the other port housing includes the alignment recess). Each alignment recess 1079 is sized and shaped to receive an alignment projection 1077 of the other port housing 1014, when the first and second port housings are coupled together.

The auxiliary port device 1010 includes mounting structure 1080 configured to facilitate the mounting of the auxiliary port device on the multiport device 710. The mounting structure 1080 is defined by both the first and second port housings 1014. In the illustrated embodiment, the mounting structure 1080 comprises one or more recesses 1082 on each port housing 1014 that are each configured to receive a corresponding projection of a mounting bracket (not shown) that attaches or mounts the auxiliary port device on the multiport device 710. In addition, the mounting structure 1080 for each port housing 1014 also includes a mounting bracket channel 1099 for receiving a section of the mounting bracket. The mounting bracket for auxiliary port device 1010 may generally extend around the first and second port housing 1014, similar to mounting bracket 570. To further facilitate the mounting of the auxiliary port device 1010 on the multiport device 710, the first and second port housings 1014 also include an arcuate or curved bottom surface 1015 that generally matches the arcuate or curved exterior surface of the port housings 714 of the multiport device 710.

Referring to FIGS. 100-103, another embodiment of an auxiliary port device (broadly, a port device) of the present disclosure is generally indicated at reference numeral 1110. Auxiliary port device 1110 is generally analogous to auxiliary port device 1010 and, thus, for ease of comprehension, where similar, analogous or identical parts are used, reference numerals "100" units higher are employed, except when the auxiliary port device 1110 includes similar, analogous or identical parts to that of the multiport device 710 in which case identical reference numerals to that of the multiport device are employed. Accordingly, unless clearly stated or indicated otherwise, the descriptions herein regarding the multiport device 710 and auxiliary port device 1010 also apply to auxiliary port device 1110. In this embodiment, the mounting structure 1180 of the auxiliary port device 1110 includes mounting bracket channels 1199 but does not include recesses. In the illustrated embodiment, an electrical adapter 910D is coupled to the auxiliary port device 1110 to configure the auxiliary port device to receive electrical connectors 810D, as shown. A MPO adapter 910A, SN adapter 910B, or SC adapter 910C may be coupled to the auxiliary port device 1110 in other arrangements to receive MPO connectors 810A, SN connectors 810B, or SC connectors 810C, respectively.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

Other Statements of the Invention

The following are statements or features of invention described in the present disclosure. Although some of the following statements are not currently presented as claims, the statements are believed to be patentable and may subsequently be presented as claims. Associated methods corresponding to the statements or apparatuses or systems below, are also believed to be patentable and may subsequently be presented as claims. It is understood that the following statement may refer to and be supported by one, more than one or all of the embodiments described above.

A1. A multiport device for connecting communication connectors, the multiport device comprising: a first port housing including a plurality of first ports, each first port being configured to receive and couple to one of the connectors; and a second port housing including a plurality of second ports, each second port being configured to receive and couple to one of the connectors; wherein the first and second port housings are releasably coupled together, wherein when the first and second port housings are coupled together, the first and second ports are aligned with each other such that a communication connection is formed between first and second connectors when the first connector is coupled to one of the first ports and the second connector is coupled to one of the second ports corresponding to said one of the first ports.

A2. The multiport device of feature A1, further comprising a seal at an interface of the first and second port housings, the interface being formed when the first and second port housings are coupled together, the seal being configured to form a fluid tight seal at the interface.

A3. The multiport device of feature A2, wherein the seal is a first seal and wherein the multiport device further comprises a second seal at the interface, the second seal being configured to form a fluid tight seal at the interface.

A4. The multiport device of feature A3, wherein the first and second seals are concentrically arranged.

A5. The multiport device of feature A1, further comprising a coupler configured to releasably couple the first and second port housings together.

A6. The multiport device of feature A5, wherein the coupler comprises a fastener.

A7. The multiport device of feature A1, wherein the coupler is configured to engage the first and second port housings to prevent the first and second port housings from rotating relative to each other.

A8. The multiport device of feature A1, wherein the first and second port housings each have an outer end portion and an inner end portion spaced apart from the outer end portion.

A9. The multiport device of feature A8, wherein the inner end portions of the first and second port housings engage each other when the first and second port housings are coupled together.

A10. The multiport device of feature A9, wherein each first port has an outer opening at the outer end portion of the first port housing and a connector socket extending toward the inner end portion of the first port housing from the outer opening, and each second port has an outer opening at the outer end portion of the second port housing and a connector socket extending toward the inner end portion of the second port housing from the outer opening of said second port.

A11. The multiport device of feature A10, wherein the connector sockets of corresponding first and second ports align with each other when the first and second port housings are coupled together.

A12. The multiport device of feature A1, wherein the first and second port housings are identical.

B1. A multiport device for connecting connectors, each connector including a ferrule assembly, the multiport device comprising: a port housing including a port configured to receive and couple to a first connector of the connectors and a receptacle receiver sized and shaped for selectively receiving at least a portion of an adapter therein, the port and receptacle receiver being arranged such that when the first connector is coupled to the port and the adapter is received in the receptacle receiver, the ferrule assembly of the first connector is received by the adapter.

B2. The multiport device of feature B1, further comprising the adapter.

B3. The multiport device of feature B2, wherein the adapter is configured to receive one of a MPO ferrule assembly, a SC ferrule assembly, or a SN ferrule assembly.

B4. The multiport device of feature B2, wherein the adapter comprises one of a MPO fiber optic adapter, a SC fiber optic adapter, a SN fiber optic adapter, or an electrical adapter.

B5. The multiport device of feature B2, wherein the adapter includes a receptacle receiver anti-turning key configured to engage the receptacle receiver to inhibit the adapter from turning within the receptacle receiver.

B6. The multiport device of feature B5, wherein the receptacle receiver anti-turning key includes opposite flat exterior sides of the adapter.

B7. The multiport device of feature B1, further comprising a plurality of the adapters, wherein the plurality includes at least one MPO adapter, at least one SC adapter, and at least one SN adapter.

B8. The multiport device of feature B5, wherein said at least one MPO adapter, said at least one SC adapter, and said at least one SN adapter all have the same exterior size and shape.

B9. The multiport device of feature B2, wherein the port housing is a first port housing, the port is a first port, and the receptacle receiver is a first receptacle receiver, the multiport device further comprising a second port housing configured to couple to the first port housing, the second port housing including a second port configured to receive and couple to a second connector of the connectors and a second receptacle receiver sized and shaped for selectively receiving a portion of the adapter therein, the second port and second receptacle receiver being arranged such that when the second connector is coupled to the second port and the adapter is received in the second receptacle receiver, the ferrule assembly of the second connector is received by the adapter.

B10. The multiport device of feature B9, wherein a communication connection forms between the first and second connectors within the adapter when the first and second port housings are coupled together, the adapter is disposed in the first and second receptacle receivers, and the first and second connectors are coupled to the respective first and second ports.

B11. The multiport device of feature B2, wherein the adapter includes a connector anti-turning key configured to engage the connector to inhibit the connector from turning relative to the adapter.

B12. The multiport device of feature B11, wherein the connector anti-turning key includes opposite flat interior sides of the adapter.

B13. A multiport device kit for connecting connectors, the multiport device kit comprising: a first adapter configured for connectors of a first type; a second adapter configured for connectors of a second type; a first port housing including a first port configured to receive and couple to a first connector and a first receptacle receiver sized and shaped for selectively receiving a portion of either the first or second adapter therein; and a second port housing configured to couple to the first port housing, the second port housing including a second port configured to receive and couple to a second connector and a second receptacle receiver sized and shaped for selectively receiving a portion of either the first or second adapter therein, wherein the first and second receptacle receivers align with each other when the first and second port housings are coupled together such that only one of the first or second adapters can be received by the aligned first and second receptacle receivers.

C1. A port device for connecting to a connector having a movable latch yieldably biased in a latching position and movable to an unlatching position, the port device comprising: a port housing including a port configured to receive and couple to the connector, the port including a latch retainer configured to be engaged by the latch of the connector to secure the connector to the port, the latch retainer being configured to engage and deflect the latch toward the unlatching position as the connector is inserted in an insertion direction into the port.

C2. The port device of feature C1, wherein the latch retainer is disposed on an exterior of the port housing.

C3. The port device of feature C1, wherein the latch retainer includes a deflection surface that slopes outward as it extends in the insertion direction, the deflection surface configured to engage and deflect the latch of the connector.

C4. The port device of feature C3, wherein the latch retainer includes an end surface the is generally perpendicular to the insertion direction and is configured to engage the latch of the connector when the latch is in the latching position to secure the connector to the port.

C5. The port device of feature C1, wherein the port housing defines a latch channel disposed on an exterior of the port housing, the latch channel sized and shaped to receive the latch and permit the latch to move therein, the latch retainer disposed in the latch channel.

C6. The port device of feature C1, further comprising the connector.

C7. The port device of feature C1, wherein the port housing is configured to defeat a latch mechanism associated with the connector.

C8. A connector for being plugged into a port of a port device, the connector comprising: a ferrule assembly defining a connection end of the connector; and a port engagement portion spaced apart from the connection end of the connector along a longitudinal axis of the connector toward an opposite cable end of the connector, the port engagement portion including: a port insert body sized and shaped for being received in the port of the port device when the connector is plugged into the port; and a deflectable latch coupled to the port insert body and configured for latching engagement with the port device to releasably retain the connector in the port.

C9. The connector of feature C8, wherein the latch includes a latch base attached to the port insert body and an overhang latch arm attached to the latch base, the overhang latch arm is spaced apart from the port insert body and configured for the latching engagement with the port device.

C10. The connector of feature C9, wherein the overhang latch arm defines a slot sized and shaped to receive a portion of the port device for the latching engagement with the port device.

C11. The connector of feature C10, wherein the overhang latch arm includes a sloped surface at a free end portion of the overhang latch arm, the sloped surface being configured to engage the port device to deflect the latch as the connector is plugged into the port.

C12. The connector of feature C8, wherein the latch is deflectable between a latching position and an unlatching position.

C13. The connector of feature C8, further comprising a rotational alignment key spaced apart from the connection end of the connector along the longitudinal axis toward the opposite cable end, the rotational alignment key being configured to engage the port to prevent rotation of the connector relative to the port when the connector is plugged into the port.

C14. The connector of feature C8, further comprising a connector housing supporting the ferrule assembly, the port insert body extending circumferentially around the connector housing.

C15. The connector of feature C14, wherein the port insert body is longitudinally slidable along the connector housing.

C16. The connector of feature C15, the connector housing including a stop configured to engage the port insert body to limit the movement of the port insert body toward the connection end.

C17. The connector of feature C8, further comprising a seal spaced apart from the connection end of the connector along the longitudinal axis toward the opposite cable end, the seal configured to engage the port of the port device to form a fluid-tight seal with the port device.

C18. The connector of feature C8, further comprising a connector housing supporting the ferrule assembly, the port insert body of the port engagement portion configured to form a snap-fit connection with the connector housing to couple the port engagement portion to the connector housing.

D1. A multiport device for connecting connectors of different types, each connector including a ferrule assembly, the multiport device comprising: a port housing including a plurality of ports, each port configured to receive and couple to one of the connectors, the port housing including a plurality of identification insert mounts, each identification insert mount being disposed on an exterior of the port housing to align with and visually correspond to one of the plurality of ports; and a plurality of identification inserts, each identification insert including indicia identifying one type of the connector, each identification insert including an identification insert coupler configured to couple to one of the identification insert mounts corresponding to one of the plurality of ports to attach said identification insert to the port housing such that said identification insert provides a visual indication of the type of connector to be received by said one port of the plurality of ports.

D2. The multiport device of feature D1, wherein the connectors are optical connectors and the indicia identifies a MPO-type optical connector, a SC-type optical connector, or a SN-type optical connector.

D3. The multiport device of feature D1, wherein the plurality of identification inserts includes a first sub-set of identification inserts and a second sub-set of identification inserts, wherein the indicia of each identification insert of the first sub-set of identification inserts identifies a first type of connector, and wherein the indicia of each identification insert of the second sub-set of identification inserts identifies a second type of connector.

D4. The multiport device of feature D1, wherein the port housing is selectively configurable so that each port of the plurality of ports is configured to receive different types of the connector.

D5. The multiport device of feature D4, further comprising a plurality of adapters, each adapter corresponding to one type of the connectors, each adapter being selectively attachable to the port housing such that said adapter is associated with one of the plurality of ports and configures said one port to receive said one type of connector corresponding to said adapter.

D6. The multiport device of feature D4, wherein each adapter is configured to receive one of a MPO connector, a SC connector, or a SN connector.

D7. The multiport device of feature D4, wherein the plurality of adapters includes a first sub-set of adapters and a second sub-set of adapters, wherein each adapter of the first sub-set of adapters is configured to receive a first type of connector, and wherein each adapter of the second sub-set of adapters is configured to receive a second type of connector.

D8. The multiport device of feature D1, wherein the identification insert coupler of each identification insert is configured to form a snap-fit connection with said one of the identification insert mounts.

D9. The multiport device of feature D8, wherein the identification insert coupler of each identification insert includes a resiliently deflectable latch leg.

D10. The multiport device of feature D9, wherein the resiliently deflectable latch leg includes a detent.

D11. The multiport device of feature D10, wherein each identification insert mount includes a recess sized and shaped to receive the detent of the deflectable latch leg of the identification insert coupler of each identification insert.

D12. The multiport device of feature D8, wherein the identification insert coupler of each identification inset includes first and second resiliently deflectable latch legs.

D13. The multiport device of feature D1, wherein each identification insert includes a cap, the indicia disposed on the cap and the identification insert coupler extending from the cap.

D14. The multiport device of feature D13, wherein the cap defines a recess sized and shaped to receive an end of a tool to facilitate disconnecting the identification insert from said one of the identification insert mounts.

E1. An auxiliary port device for a multiport device, the auxiliary port device comprising: a first port housing including a first port, the first port configured to receive and couple to a first connector; a second port housing including a second port, the second port configured to receive and couple to a second connector, the first and second port housings being releasably coupled together, wherein when the first and second port housings are coupled together, the first and second ports are aligned with each other such that a communication connection is formed between the first and second connectors when the first connector is coupled to the first port and the second connector is coupled to the second port; and a mounting structure configured to facilitate mounting the auxiliary port on the multiport device.

E2. The auxiliary port device of feature E1, wherein the mounting structure is defined by both the first and second port housings.

E3. The auxiliary port device of feature E1, wherein the mounting structure comprises a seat configured to be received by a mounting bracket of the multiport device.

E4. The auxiliary port device of feature E1, wherein the mounting structure comprises one or more projections configured to be inserted into one or more corresponding slots in a mounting bracket of the multiport device.

E5. The auxiliary port device of feature E1, further comprising a seal at an interface of the first and second port housings, the interface formed when the first and second port housings are coupled together, the seal configured to form a fluid tight seal at the interface.

E6. The auxiliary port device of feature E1, further comprising a coupler configured to releasably couple the first and second port housings together.

E7. The auxiliary port device of feature E1, wherein the first and second port housings are identical.

E8. The auxiliary port device of feature E1, wherein one of the first and second port housings includes an alignment projection and the other one of the first and second port housings includes an alignment recess sized and shaped to receive the alignment projection when the first and second port housings are coupled together.

E9. The auxiliary port device of feature E1, wherein the first port housing includes a first receptacle receiver sized and shaped for selectively receiving a portion of an adapter therein, the first port and first receptacle receiver being arranged such that when the first connector is coupled to the first port and the adapter is received in the first receptacle receiver, an end of the first connector is received by the adapter, and wherein the second port housing includes a second receptacle receiver sized and shaped for selectively receiving a portion of the adapter therein, the second port and second receptacle receiver being arranged such that when the second connector is coupled to the second port and the adapter is received in the second receptacle receiver, an end of the second connector is received by the adapter.

E10. The auxiliary port device of feature E9, further comprising the adapter.

E11. The auxiliary port device of feature E10, wherein the first and second connectors are first and second optical connectors and the adapter is configured to receive one of a MPO-type optical connector, a SC-type optical connector, or a SN-type optical connector.

E12. The auxiliary port device of feature E1, wherein each of the first and second ports includes a latch retainer disposed on an exterior of the respective first or second port housing, each latch retainer being configured to be engaged by a latch of the respective first or second connector to secure said respective first or second connector to the respective first or second port, each latch retainer being configured to engage and deflect the latch of the respective first or second connector as said respective first or second connector is inserted in an insertion direction into said respective first or second port.

E13. The auxiliary port device of feature E12, wherein each latch retainer includes a deflection surface that slopes outward as it extends in the insertion direction, the deflection surface being configured to engage and deflect the latch of said respective first or second connector.

E14. The auxiliary port device of feature E1, wherein the first port housing includes a first identification insert mount disposed on an exterior of the first port housing to visually correspond to the first port, wherein the second port housing includes a second identification insert mount disposed on an exterior of the second port housing to visually correspond to the second port, the auxiliary port device further comprising a plurality of identification inserts, each identification insert including indicia identifying a connector type, each identification insert including an identification insert coupler configured to couple to the first or second identification insert mounts to attach said identification insert to the respective first or second port housing such that said identification insert provides a visual indication of the type of the respective first or second connector to be received by the respective first or second port.

E15. The auxiliary port device of feature E14, wherein the first and second connectors are first and second optical connectors and the indicia identifies a MPO-type optical connector, a SC-type optical connector, or a SN-type optical connector.

E16. The auxiliary port device of feature E1, further comprising a mounting bracket for mounting the first and second port housings on the multiport device.

F1. A connector for being plugged into a port of a port device, the port device further comprising an adapter of a defined type operatively aligned with and inboard of the port, the connector comprising: an connector end assembly defining a connection end of the connector, the connector end assembly comprising: a connector end housing, a ferrule assembly received in the connector housing, and a movable latch yieldably biased to a latching position relative to the ferrule assembly and movable relative to the ferrule assembly from the latching position to an unlatching position, the connector end assembly configured to be operatively latched in another adapter of the defined type separate from the port device to make a communication connection to the ferrule assembly, the movable latch being configured to retain the connector end assembly in said other adapter in the latching position and being configured to move relative to the ferrule assembly from the latching position to the unlatching position to unlatch the connector end assembly from said other adapter; and a port engagement portion spaced apart along a longitudinal axis from the ferrule assembly toward a cable end of the connector, wherein the connector is configured so that when the connector is plugged into the port of the port device: the ferrule assembly is received in the connector receptacle of the port device; the port engagement portion engages the port device to releasably retain the connector in the port; and the latch is held in the unlatching position.

F2. A connector for being plugged into a port of a port device, the connector comprising: a ferrule assembly defining a connection end of the connector; and a port engagement portion spaced apart from the connection end of the connector along a longitudinal axis of the connector toward an opposite cable end of the connector, the port engagement portion including: a port insert body sized and shaped for being received in an opening to the port when the connector is plugged into the port; and a rotational alignment element on the port insert body configured to provide a visual indication of rotational alignment of the connector with the port, the rotational alignment element being located outside of a connector socket of the port when the connector is plugged into the port.

F3. A connector for being plugged into a port of a port device, the connector comprising: a ferrule assembly defining a connection end of the connector; a rotational alignment key element spaced apart from the connection end of the connector along a longitudinal axis of the connector toward an opposite cable end of the connector; and a latch spaced apart from the rotational alignment key along a longitudinal axis of the optical fiber plug toward the opposite cable end, the latch being configured for latching with a latch retainer of the port device to releasably retain the adapter in the port.

F4. A port device configured to mate with connector comprising a movable latch yieldably biased to a latching position and movable relative to a remainder of the connector to an unlatching position, the port device comprising: a port body having an outer end portion and an inner end portion spaced apart from the outer end portion along an axis in a plug-in direction, the port body including a port including an opening through the outer end portion of the port body, the port extending along the axis from the opening in the plug-in direction, the port being configured so that the connector can be plugged into the port to mate the port device with the connector, the port body being configured to engage the connector to retain the movable latch in the unlatching position when the connector is plugged into the port.

F5. A port device configured to mate with a connector, the port device comprising: a port body having an outer end portion and an inner end portion spaced apart from the outer end portion along an axis in a plug-in direction, the port body defining a port including an opening through the outer end portion of the port body and a receptacle receiver that opens through the inner end portion of the port body, the port body further comprising a latch retainer adjacent the outer end portion; and an adapter retained in the receptacle receiver; wherein the port device is configured so that the optical fiber plug can be inserted through the opening in a plug-in direction to mate the port device with the optical fiber plug; wherein when the port device is mated with the connector, a ferrule assembly of the connector is received in the adapter, a port body of the optical fiber plug extends from the terminal port out of the opening, and a movable latch of the connector is configured to latch onto the latch retainer of the port body.

F6. A port device configured to interchangeably mate with an optical fiber connector and an electrical connector, the port device comprising: a port body having an outer end portion and an inner end portion spaced apart from the outer end portion along an axis in a plug-in direction, the port body defining a port including an opening through the outer end portion of the port body and a receptacle receiver that opens through the inner end portion of the port body, the receptacle receiver being sized and arranged for selectively receiving one of (i) an optical fiber adapter for forming an optical connection with the optical fiber connector and (ii) an electrical adapter for forming an electrical connection with the electrical connector, the port device further comprising a latch retainer configured to latch with a movable latch of each of the optical fiber connector and the electrical connector.

F7. A connector having a longitudinal axis, the connector comprising: one or more electrical contacts; a connector housing extending along the longitudinal axis and having a front end through which the one or more electrical contacts are exposed for making an electrical connection, the connector housing including a rotational alignment key at a circumferential alignment position about the longitudinal axis; a port coupling body extending along the longitudinal axis along a rear end portion of the connector housing; and a latch configured for latching with a port device, the latch extending radially from the port coupling body at said circumferential alignment position.

F8. An adapter for being received in a port device, the adapter comprising a body having a first end portion and a second end portion spaced apart along a longitudinal axis, the body comprising a perimeter extending circumferentially about the longitudinal axis along the longitudinal axis, the perimeter optionally having a perimeter footprint that corresponds with a perimeter footprint of a standard adapter, the adapter further comprising: a first power pin protruding from the first end portion of the body along a first pin axis parallel to the longitudinal axis, a second power pin protruding from the first end portion of the body along a second pin axis parallel to the longitudinal axis and spaced apart from the first pin axis; a third power pin protruding from the second end portion of the body along the first pin axis, and a fourth power pin protruding from the second end portion of the body along the second pin axis; wherein, optionally, the first and fourth power pins have a first polarity and the second and third power pins have an opposite second polarity.

F9. A port assembly for operatively connecting first and second electrical connectors, wherein the first and second electrical connectors are optionally adapted for use with a port device other than the port assembly that can interchangeably receive electrical adapters and fiber optic adapters for selectively enabling electrical connections and optical connections, the port comprising: an electrical adapter comprising a body extending along a longitudinal axis from a first end portion to a second end portion, the electrical adapter further comprising at least one first end electrical contact at the first end portion of the body and at least one second end electrical contact at the second end portion of the body; a first port housing having an outer end portion and an inner end portion spaced apart along the longitudinal axis, the first port housing having a first port extending longitudinally along the first port housing from the outer end portion toward the inner end portion, the first port housing being configured so that the first electrical connector can be plugged into the first port, the first port housing being configured to be operatively positioned at the first end portion of the body of the electrical adapter such that when the first electrical connector is plugged into the first port an electrical connection is made between the first electrical connector and the at least one first end electrical contact, the outer end portion of the first port housing having a latch retainer that is configured to latch with a movable latch of the first electrical connector to retain the first electrical connector in the first port; and a second port housing having an outer end portion and an inner end portion spaced apart along the longitudinal axis, the second port housing defining a second port extending longitudinally along the second port housing from the outer end portion toward the inner end portion, the second port housing being configured so that the second electrical connector can be plugged into the second port, the second port housing being configured to be operatively connected to the first port housing such that the second port housing is located at the second end portion of the body of the electrical adapter and such that when the second electrical connector is plugged into the second port an electrical connection is made between the second electrical connector and the at least one second end electrical contact, the outer end portion of the second port housing comprising a latch retainer that is configured to latch with a movable latch of the second electrical connector to retain the second electrical connector in the second port.

What is claimed is:

1. A multiport device for connecting electrical and/or optical connectors, the multiport device comprising:
   a first port housing including a plurality of first ports circumferentially spaced apart about a central longitudinal axis, each first port being configured to receive and couple to one of the connectors; and
   a second port housing including a plurality of second ports circumferentially spaced apart about the central longitudinal axis, each second port being configured to receive and couple to one of the connectors; and
   a seal at an interface of the first and second port housings, the interface being formed when the first and second port housings are coupled together, the seal being configured to form a fluid tight seal at the interface,
   wherein the first and second port housings are releasably coupled together, wherein when the first and second port housings are coupled together, the first and second ports are aligned with each other such that a communication connection is formed between first and second connectors when the first connector is coupled to one of the first ports and the second connector is coupled to one of the second ports corresponding to said one of the first ports,
   wherein a first seal and wherein the multiport device further comprises a second seal at the interface, the second seal being configured to form a fluid tight seal at the interface.

2. The multiport device of claim 1, wherein the first and second seals are concentrically arranged.

3. The multiport device of claim 1, further comprising a coupler configured to releasably couple the first and second port housings together.

4. The multiport device of claim 3, wherein the coupler comprises a fastener.

5. The multiport device of claim 3, wherein the coupler is configured to engage the first and second port housings to prevent the first and second port housings from rotating relative to each other.

6. The multiport device of claim 1, wherein the first and second port housings each have an outer end portion and an inner end portion spaced apart from the outer end portion.

7. The multiport device of claim 6, wherein the inner end portions of the first and second port housings engage each other when the first and second port housings are coupled together.

8. The multiport device of claim 7, wherein each first port has an outer opening at the outer end portion of the first port housing and a connector socket extending toward the inner end portion of the first port housing from the outer opening, and each second port has an outer opening at the outer end portion of the second port housing and a connector socket extending toward the inner end portion of the second port housing from the outer opening of said second port.

9. The multiport device of claim 8, wherein the connector socket of corresponding first and second ports align with each other when the first and second port housings are coupled together.

10. The multiport device of claim 1, wherein the first and second port housings are identical.

11. A multiport device for connecting electrical and/or optical connectors, the multiport device comprising:
    a first port housing including a plurality of first ports, each first port being configured to receive and couple to one of the connectors;
    a second port housing including a plurality of second ports, each second port being configured to receive and couple to one of the connectors; and
    a seal at an interface of the first and second port housings, the interface being formed when the first and second port housings are coupled together, the seal being configured to form a fluid tight seal at the interface,
    wherein the first and second port housings are releasably coupled together, wherein when the first and second port housings are coupled together, the first and second ports are aligned with each other such that a communication connection is formed between first and second connectors when the first connector is coupled to one of the first ports and the second connector is coupled to one of the second ports corresponding to said one of the first ports,
    wherein the seal is a first seal and wherein the multiport device further comprises a second seal at the interface, the second seal being configured to form a fluid tight seal at the interface.

12. The multiport device of claim 11, wherein the first and second seals are concentrically arranged.

13. A multiport device for connecting electrical and/or optical connectors, the multiport device comprising:
    a first port housing including a plurality of first ports, each first port being configured to receive and couple to one of the connectors; and
    a second port housing including a plurality of second ports, each second port being configured to receive and couple to one of the connectors;
    wherein the first and second port housings are releasably coupled together, wherein when the first and second port housings are coupled together, the first and second ports are aligned with each other such that a communication connection is formed between first and second connectors when the first connector is coupled to one of the first ports and the second connector is coupled to one of the second ports corresponding to said one of the first ports,
    wherein the first and second port housings each have an outer end portion and an inner end portion spaced apart from the outer end portion,
    wherein the inner end portions of the first and second port housings engage each other when the first and second port housings are coupled together,
    wherein each first port has an outer opening at the outer end portion of the first port housing and a connector socket extending toward the inner end portion of the first port housing from the outer opening, and each second port has an outer opening at the outer end portion of the second port housing and a connector socket extending toward the inner end portion of the second port housing from the outer opening of said second port.

14. The multiport device of claim 13, wherein the connector socket of corresponding first and second ports align with each other when the first and second port housings are coupled together.

* * * * *